US012790943B2

(12) United States Patent
Maclean et al.

(10) Patent No.: US 12,790,943 B2
(45) Date of Patent: Nov. 10, 2026

(54) DETERMINING FREQUENCY BAND SUITABILITY FOR COMMUNICATION

(71) Applicant: Raptor Data Limited, Aberdeen (GB)

(72) Inventors: Colin Maclean, Aberdeen (GB); Nancy Jayakumar, Aberdeen (GB); Gordon Cowie, Aberdeen (GB)

(73) Assignee: Raptor Data Limited, Aberdeen (GB)

( * ) Notice: Subject to any disclaimer, the term of this patent is extended or adjusted under 35 U.S.C. 154(b) by 0 days.

(21) Appl. No.: 18/402,870

(22) Filed: Jan. 3, 2024

(65) Prior Publication Data

US 2024/0151138 A1 May 9, 2024

Related U.S. Application Data

(63) Continuation of application No. 17/600,335, filed as application No. PCT/GB2020/050885 on Jan. 2, 2020, now Pat. No. 11,898,440.

(30) Foreign Application Priority Data

Apr. 3, 2019 (GB) ..................................... 1904676
Aug. 15, 2019 (GB) ..................................... 1911699
(Continued)

(51) Int. Cl.
*E21B 47/16* (2006.01)
*G10K 11/24* (2006.01)
(Continued)

(52) U.S. Cl.
CPC .............. *E21B 47/16* (2013.01); *G10K 11/24* (2013.01); *H04B 11/00* (2013.01); *H04L 27/103* (2013.01); *H04L 5/0064* (2013.01)

(58) Field of Classification Search
CPC .......... E21B 47/12; E21B 47/14; E21B 47/16; E21B 47/24; E21B 47/107; E21B 47/13;
(Continued)

(56) References Cited

U.S. PATENT DOCUMENTS 4,562,559 A 12/1985 Sharp et al.
9,556,727 B2 1/2017 Saulnier et al.
(Continued)

FOREIGN PATENT DOCUMENTS

CN 102257737 A * 11/2011 ............. H04B 1/707
EP 3056987 A1 8/2016
(Continued)

OTHER PUBLICATIONS

CN-102257737-A English Language Translation (Year: 2011).*
(Continued)

*Primary Examiner* — Steven Lim
(74) *Attorney, Agent, or Firm* — Banner & Witcoff, Ltd.

(57) ABSTRACT

An apparatus for determining a suitability of a frequency band for data communication with a node by way of a communication channel may be provided. The apparatus may comprise a receiver configured to receive first and second signals from the node by way of the communication channel, the first and second signals having frequencies within the frequency band. The apparatus may comprise processing circuitry communicatively coupled to the receiver, the processing circuitry being configured to determine a calibration function depending on the first signal, process the second signal depending on the calibration function, determine the suitability of the frequency band for data communication with the node by way of the communication channel depending on the processed second signal and output an indication of the said suitability. The processing circuitry may be configured to determine the suitability of the frequency band for data communication with the node depending on the processed second signal by comparison of the processed second signal to predetermined reference data.

13 Claims, 23 Drawing Sheets

(30) Foreign Application Priority Data

Aug. 15, 2019 (GB) ...................................... 1911700
Aug. 15, 2019 (GB) ...................................... 1911701

(51) Int. Cl.
*H04B 11/00* (2006.01)
*H04L 27/10* (2006.01)
*H04L 5/00* (2006.01)

(58) Field of Classification Search
CPC ......... E21B 47/20; E21B 47/22; G01V 1/003; G01V 1/50; G01V 2210/63; H04B 11/00; H04B 2001/6912; H04B 17/336; H04B 3/48; G08C 23/02; H04L 27/103; H04L 25/03834; H04L 1/0001; H04L 1/20; H04L 1/248; H04L 25/0202; H04L 25/0204; H04L 25/0224; H04L 25/0228; H04L 25/0288; H04L 43/08; H04L 43/0823
See application file for complete search history.

(56) References Cited

U.S. PATENT DOCUMENTS

| | | | |
|---|---|---|---|
| 9,670,773 B2 | 6/2017 | Croux | |
| 9,715,031 B2 | 7/2017 | Contant et al. | |
| 9,941,924 B2 | 4/2018 | Maclean et al. | |
| 11,898,440 B2 * | 2/2024 | Maclean | H04L 27/103 |
| 2003/0142586 A1 | 7/2003 | Shah et al. | |
| 2006/0114747 A1 | 6/2006 | Hentati et al. | |
| 2007/0127602 A1 | 6/2007 | Guey | |
| 2010/0098042 A1 | 4/2010 | Dent | |
| 2010/0135117 A1 | 6/2010 | McRory | |
| 2014/0266769 A1 | 9/2014 | van Zelm | |
| 2014/0269188 A1 | 9/2014 | van Zelm et al. | |
| 2015/0146872 A1 * | 5/2015 | Baek | G06F 11/08 380/270 |
| 2015/0349918 A1 | 12/2015 | Mijarez Castro et al. | |
| 2016/0043753 A1 | 2/2016 | Jungnickel et al. | |
| 2016/0327519 A1 | 11/2016 | Mayo et al. | |
| 2017/0167251 A1 | 6/2017 | Owen et al. | |
| 2017/0268331 A1 | 9/2017 | Lee et al. | |
| 2017/0335682 A1 | 11/2017 | Clark et al. | |
| 2018/0003044 A1 | 1/2018 | Kusuma et al. | |
| 2018/0139758 A1 * | 5/2018 | Sankar | H04W 72/0466 |
| 2018/0245461 A1 * | 8/2018 | Barak | G01V 11/002 |
| 2019/0007159 A1 * | 1/2019 | Dufour | E21B 47/12 |

FOREIGN PATENT DOCUMENTS

| | | | | |
|---|---|---|---|---|
| EP | 3166271 A1 | 5/2017 | | |
| EP | 3947907 A1 | 2/2022 | | |
| GB | 2281424 A | 3/1995 | | |
| GB | 2432912 A | 6/2007 | | |
| GB | 2544066 A | 5/2017 | | |
| RU | 2419996 C2 | 5/2011 | | |
| WO | WO-9907090 A1 * | 2/1999 | | H04B 1/707 |
| WO | 2011140264 A1 | 11/2011 | | |
| WO | 2015148477 A1 | 10/2015 | | |
| WO | 2017105398 A1 | 6/2017 | | |
| WO | 2017117516 A1 | 7/2017 | | |
| WO | 2018044471 A1 | 3/2018 | | |
| WO | 2020201762 A1 | 10/2020 | | |

OTHER PUBLICATIONS

Apr. 26, 2024 (SA) Examination Report—App. 521430473.
May 7, 2019 (GB) Search Report—App. 1904676.2.
Jun. 23, 2020 (PCT) International Search Report—App. PCT/GB2020/050885.
Aug. 1, 2024 (AE) Search Report and Office Action Summary—App. P6001924/2022.
Jan. 13, 2025 (AE) Search Report and Office Action Summary—App. P6001920/2022.
Jul. 4, 2025 (BR) Technical Examination Report—App. 112021019370-7.
2025 (SA) Examination Report—App. 522432395.

* cited by examiner

DETERMINING FREQUENCY BAND SUITABILITY FOR COMMUNICATION

BACKGROUND

A borehole or well may be drilled in the earth's subsurface in order to explore for or exploit underground resources such as underground oil, gas, shale or water. During such drilling it may be useful to acquire data from the borehole or well. For example, it may be useful to acquire data from drilling rig sensors to monitor and manage drilling operations, to record information relating to geological formations penetrated by the borehole, to generate operations statistics and performance benchmarks and to provide well planners with accurate historical operations performance data which can be referred to in future operations. Data may be communicated from sensors in the borehole or well to nodes closer to or at the surface. Such communications can be challenging to implement at the exploration site as they are typically remote (often offshore and hundreds or thousands of meters below sea level) and the environment can vary significantly in terms of the surrounding geological features and the thermal and mechanical properties of the materials present in an established well (such as the pipework (e.g. drill string, riser, etc.) and production tubing, casing, lining, mud, hydrocarbons (i.e. "product"), lubricants and seawater). Downhole conditions are also hostile with unstable, difficult communication conditions and high temperatures. Particularly when the borehole is being extended or becomes operational, frequency bands which may be open for communication may change, drift or fade dynamically over time as conditions within the borehole change. The high temperature environment also restricts hardware computational resources to low speed processors with small amounts of on-board memory.

For "in-well" communications, the communications medium is often solid—for instance, a drill string, a casing or a riser. Communications technologies based on transmission and reception of electromagnetic waves suffer disadvantages in providing in-well and underwater communications. Therefore, for in-well and many underwater applications, it is more usual to adopt acoustic telemetry, fluid pulse telemetry (which typically uses fluid pulse signals comprising pressure pulses that propagate within a column of drilling fluid or product (e.g. oil) inside a drill string), such as mud pulse telemetry (using pressure pulses that propagate within the column of drilling fluid inside the drill string) or product pulse telemetry (using pressure pulses that propagate within the column of extracted oil/gas or other product inside the drill string), or other ultrasonic communications technologies. In acoustic telemetry, for instance, an encoded sound wave may be generated by a suitable transmitter. The sound wave may then propagate along the pipework, casing and/or production tubing. A receiver may then extract the data from the signal. The transmitter may be located "downhole", while the receiver may be placed at or near the well head, at the surface or vice versa. Any portion of the drilling operation below the site of a wellhead may be referred to as "downhole".

The dynamically changing communication channel can lead to an approach in which data transmission is limited to a narrow band of frequencies at or near the centre of a single high frequency passband in an effort to maximise transmission success, with lower frequency bands which are more prone to environmental noise being avoided. However, this approach limits available data rates and provides no guarantee of reliable communication particularly because the high frequency passband can drift or fade over time as downhole conditions change.

Characteristics of the communication channel can change dynamically over time. This can give rise to difficulties in accurately and reliably communicating data between nodes by way of the channel.

BRIEF DESCRIPTION OF THE DRAWINGS

Examples are further described with reference to the accompanying drawings, in which.

DETAILED DESCRIPTION

Figure 1:
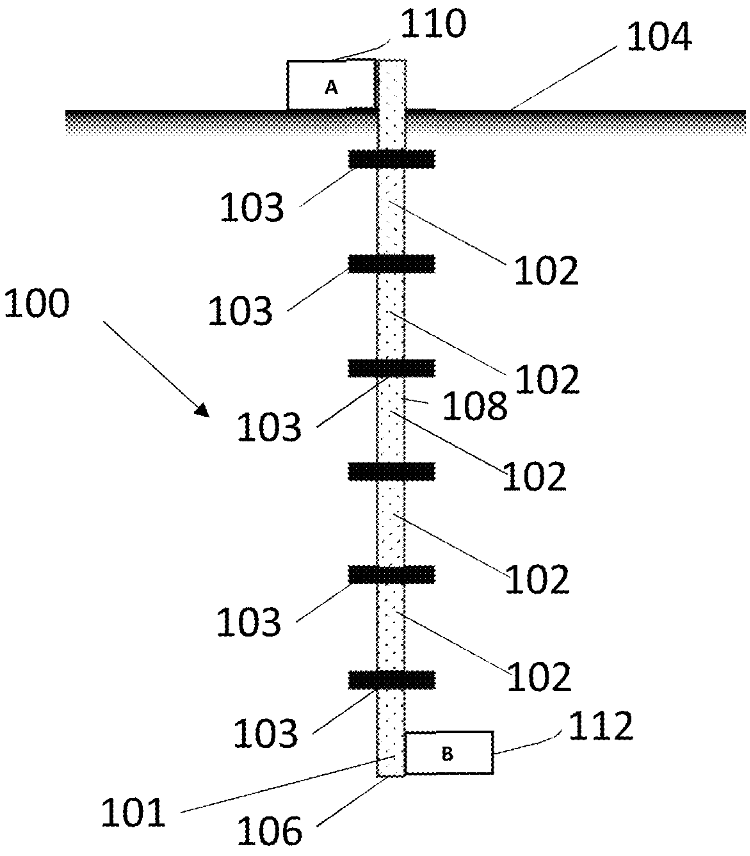
FIG. 1 schematically illustrates a drill string extending along borehole between first and second communications nodes.

Apparatus, methods and systems for determining the suitabilities of one or more frequency bands for data communication with a node by way of a communication channel are disclosed. Also disclosed are apparatus and methods for receiving communication signals. Also disclosed are apparatus and methods for transmitting communication signals. Also disclosed are computer program products, a non-transitory computer readable media and communication systems.

It may be that the communication channel is operable over one or more frequency bands. It may be that apparatus is provided comprising a receiver, such as an acoustic receiver, to receive, for each of one or more frequency bands of the communication channel, first and second signals from the node by way of the communication channel. It may be that the communication channel extends longitudinally down a borehole or wellbore, extending at least between the receiver of the apparatus and the node. It may be that for each of the one or more frequency bands the first and second signals have frequencies within the respective frequency band. It may be that the receiver is operable over the one or more frequency bands. It may be that the apparatus comprises processing circuitry communicatively coupled to the receiver. It may be that, for each of the one or more frequency bands, the processing circuitry is to determine a respective calibration function depending on the respective first signal. It may be that, for each of the one or more frequency bands, the processing circuitry is to process the respective second signal depending on the respective calibration function. It may be that, for each of the one or more frequency bands, the processing circuitry is to determine the suitability of the frequency band for data communication with the node by way of the communication channel depending on the respective processed second signal. It may be that the second signal is based on predetermined reference data. It may be that the second signal is based on encoded predetermined reference data, for example based on predetermined reference data encoded depending on one or more codes, such as one or more spread spectrum codes such as one or more chirp codes. It may be that the second signal is based on predetermined reference data encoded depending on one or more time variant codes, such as one or more time variant spread spectrum codes. For example, it may be that the second signal is based on predetermined reference data encoded depending on any of: a chirp code; a linear chirp code; a nonlinear chirp code; a frequency hopping spread spectrum sequence; a direct sequence spread spectrum code. It may be that the processing circuitry is configured to determine the suitability of the frequency band for data communication with the node depending on the respective processed second signal by comparison of the respective processed second signal to predetermined reference data. It may be that the processing circuitry is configured to further process the second signal by decoding the second signal, for example depending on the one or more (e.g. time variant) codes which may be stored at the apparatus, such that the processed second signal which is compared to the predetermined reference data has been decoded. For example, it may be that the processing circuitry is configured to process the second signal further by pulse compression such that the processed second signal which is compared to the predetermined reference data has been pulse compressed. It may be that the one or more codes, or reference data from which they are derivable, are stored at the apparatus. It may be that the predetermined reference data, or data from which it is derivable, is stored at the apparatus.

The second signal based on the predetermined reference data may be part of a dedicated calibration sequence, or it may be part of a payload data signal. It may be that, for each of the one or more frequency bands, the processing circuitry is to output an indication of the said suitability, for example to a memory or to a transmitter for transmission to the node. It may be that the apparatus comprises a transmitter, such as an acoustic transmitter. It may be that the processing circuitry is communicatively coupled to the transmitter. It may be that the transmitter is operable over one or more frequency bands of the communication channel.

It may be that the first signal(s) comprise calibration signal(s) for determining the respective calibration function(s). It may be that, for the or each of the said frequency bands, the calibration function depends on one or more characteristics (e.g. noise characteristics, attenuation characteristics or noise and attenuation characteristics) of the communication channel in the respective frequency band. It may be that, for the or each of the frequency bands, the respective calibration function is indicative of the effect of the communication channel on the corresponding second signal. It may be that the calibration signal(s) are based on predetermined calibration signal(s). It may be that the calibration signal(s) are encoded based on the predetermined calibration signal(s). It may be that the predetermined calibration signal(s) comprise one or more codes. It may be that the calibration signal(s) comprise calibration data encoded based on a said code. It may be that the calibration data comprises a constant or time varying amplitude. It may be that the calibration data is known to the apparatus, for example it may be that the calibration data is stored in a memory of the apparatus. It may be that the predetermined calibration signal(s), or predetermined calibration data from which the predetermined calibration signal(s) are derivable, are stored at a memory of the node. It may be that the predetermined calibration signal(s), or predetermined calibration data from which the predetermined calibration signal(s) are derivable, are stored at a memory of the apparatus. It may be that the processing circuitry is configured to determine the calibration function(s) based on the received calibration signal(s) and the predetermined calibration signal(s) or predetermined calibration data stored at the apparatus. It may be that the processing circuitry is configured to determine the respective calibration function(s) by determining the effect of the communication channel on the respective first signals. It may be that the processing circuitry is configured to determine the calibration function(s) by decoding the received calibration signal(s), for example based on the predetermined calibration signal(s) or predetermined calibration data stored at the apparatus, and determining the calibration function(s) based on the decoded calibration signal(s). It may be that the predetermined calibration signal(s) comprise a code, such as a time variant code, such as a time variant spread spectrum code. For example, it may be that the predetermined calibration signal(s) comprise (e.g. calibration data encoded based on) a spread spectrum code, such as a chirp code, a linear chirp code, a nonlinear chirp code, a frequency hopping spread spectrum sequence or a direct sequence spread spectrum code.

It may be that apparatus is provided comprising a receiver, a transmitter and processing circuitry communicatively coupled to the receiver and the transmitter, the processing circuitry to cause the transmitter to transmit to the node, by way of the communication channel, for each of one or more frequency bands of the communication channel, first and second signals each comprising frequencies in the respective frequency band. It may be that the first signal comprises a calibration signal. It may be that the calibration signal is based on a predetermined calibration signal. It may be that the predetermined calibration signal comprises one or more codes. It may be that the calibration signal comprises calibration data encoded based on a said code. It may be that the calibration data comprises a constant or time varying amplitude. It may be that the calibration data is known to the node, for example it may be that the calibration data is stored in a memory of the node. It may be that the second signal comprises predetermined reference data. It may be that the second signal comprises encoded predetermined reference data, such as predetermined reference data encoded based on one or more codes. It may be that the one or more codes are time variant codes, such as time variant spread spectrum codes. It may be that the one or more codes are spread spectrum codes, such as one or more chirp codes, linear chirp codes, nonlinear chirp codes, frequency hopping spread spectrum sequences or direct sequence spread spectrum codes. It may be that the receiver is to receive, by way of the communication channel, an indication from the node of the suitability of the frequency band for data communication with the node.

It may be that the processing circuitry is to cause the apparatus to selectively process payload data signals from, or selectively transmit payload data signals to, the node in one or more of the said one or more frequency bands determined or indicated to be suitable for data communication with the node by way of the communication channel. It may be that the processing circuitry is to cause the apparatus to selectively process calibration signals from, or selectively transmit calibration signals to, the node, by way of the communication channel, in the said one or more of the said one or more frequency bands determined or indicated to be suitable for data communication with the node by way of the communication channel. It may be that the processing circuitry is to provide an output depending on the processed payload data signals. It may be that the processing circuitry is to cause the apparatus to selectively discard received payload data signals or received calibration signals, or to selectively not transmit payload data signals or calibration signals, in frequency bands not determined or indicated to be suitable for data communication with the node by way of the communication channel. It may be that the processing circuitry is configured to process the received calibration signals to determine respective calibration functions for each of the said one or more suitable frequency bands and to process the payload data signals in the said suitable frequency bands in dependence on the respective calibration functions.

It has been discovered that, when received data signals are processed in dependence on calibration signals to equalise or whiten the effect of the communication channel on the received data signals, additional noise factors become apparent. That is, when the received data signals contain noise, the data signals processed in dependence on the calibration functions may comprise an associated noise factor. It has also been discovered that by determining, for each of the frequency bands, the suitability of the frequency band for data communication with the node depending on the respective second signal processed depending on a calibration function which itself depends on the received corresponding first signal, the second signal being based on predetermined reference data, a more accurate determination of the suitability of the frequency band for data communication with the node can be determined, particularly because the noise factor which would be associated with the whitening or equalisation of a data signal communicated with the node on that frequency band is taken into account in the determination. By selectively transmitting calibration and data signals to, or selectively processing calibration and data signals from, the node on one or more frequency bands determined or indicated to be suitable for data communication with the node in this way, more reliable communications with greater data communication rates can be achieved.

It will be understood that the first and second signals may be transmitted or received in any order. For example, the first signals may be transmitted or received before the second signals or the second signals may be transmitted or received before the first signals. Alternatively, the first and second signals may be transmitted or received simultaneously with each other or the first and second signals may at least partially overlap each other in the time domain.

Apparatus for receiving communication signals by way of a communication channel may be provided. It may be that the apparatus comprises a receiver configured to, for each of one or more frequency bands in respect of which the communication channel is operable, receive calibration and data signals by way of the communication channel. It may be that the receiver is operable over the said plurality of frequency bands. It may be that the calibration and data signals depend on a common code. It may be that the apparatus comprises processing circuitry communicatively coupled to the receiver. It may be that the processing circuitry is configured to process the received calibration signal to determine a calibration function such that the calibration function depends on the common code by way of the dependency of the received calibration signal on the common code. It may be that the processing circuitry is configured to process the received calibration signal to determine the calibration function without removing a dependency of the received calibration signal on the common code. For example, it may be that the processing circuitry is configured to determine the calibration function by determining an inverse of a frequency domain representation of the received calibration signal, for example without removing a dependency of the received calibration signal on the common code. It may be that the processing circuitry is configured to process the received data signal in dependence on the calibration function. It may be that the processing circuitry is configured to process the respective received data signal in dependence on the corresponding calibration function by convolving the respective received data signal with the corresponding calibration function. It may be that the convolution is performed in the frequency domain by multiplication of a frequency domain representation of the received data signal with a frequency domain calibration function. The processing circuitry may be configured to process the respective received data signal in dependence on the corresponding calibration function to thereby decode the received data signal and compensate for effects of the communication channel thereon, for example without prior knowledge of the common code.

A method of receiving communication signals by way of a communication channel may be provided. It may be that the method comprises receiving, for each of one or more frequency bands in respect of which the communication channel is operable, calibration and data signals by way of the communication channel, the calibration and data signals depending on a common code. It may be that the method comprises determining a calibration function based on the received calibration signal such that the calibration function depends on the common code by the dependency of the received calibration function on the common code. It may be that the method comprises processing the received calibration signal to determine the calibration function without removing the dependency of the received calibration signal on the common code. For example, it may be that the method comprises determining the calibration function by determining an inverse of a frequency domain representation of the received calibration signal, for example without removing a dependency of the received calibration signal on the common code. It may be that the method comprises processing the received data signal in dependence on the calibration function. It may be that the method comprises processing the respective received data signal in dependence on the corresponding calibration function by convolving the respective received data signal with the corresponding calibration function. It may be that the convolution is performed in the frequency domain by multiplication of a frequency domain representation of the received data signal with a frequency domain calibration function. The method may comprise processing the respective received data signal in dependence on the corresponding calibration function to thereby decode the received data signal and compensate for effects of the communication channel thereon, for example without prior knowledge of the common code.

It may be that the calibration function is provided with information for decoding the received data signal, such as information concerning the common code, from the calibration signal. It may be that the calibration function is implicitly provided with information concerning the common code for decoding the data signal from the calibration signal. The calibration function may be implicitly provided with the said information in the sense that the common code is not explicitly determined from the calibration signal, but that information concerning the common code is contained within the calibration function derived therefrom. Thus, the received data signal can be decoded without prior knowledge of the common code by processing the received data signal depending on the calibration function. It will be understood that the calibration function may also be provided with information regarding the effects of the communication channel on the calibration signal by way of the calibration signal, such that processing the received data signal by way of the calibration function also compensates for effects of the communication channel thereon.

A method of transmitting communication signals by way of a communication channel may be provided. It may be that the method comprises transmitting, for each of one or more frequency bands in respect of which the communication channel is operable, calibration and data signals by way of the communication channel, the calibration and data signals depending on a common code. It may be that the calibration and data signals are discrete from each other in time. It may be that the method comprises receiving indications of qualities of one or more frequency bands of the communication channel. It may be that the method comprises selectively pre-emphasising calibration and data signals in one or more of the frequency bands of the communication channel depending on the received quality indications. It may be that the method comprises selectively pre-emphasising the calibration and data signals in the said one or more frequency bands by selectively adjusting the common codes on which they depend, for example by adjusting the time bandwidth products thereof. It may be that the method comprises transmitting the selectively pre-emphasised calibration and data signals by way of the communication channel, for example to a node.

Apparatus for transmitting communication signals by way of a communication channel may be provided. It may be that the apparatus comprises a transmitter configured to transmit, for each of one or more frequency bands in respect of which the communication channel is operable, calibration and data signals by way of the communication channel. It may be that the apparatus comprises processing circuitry communicatively coupled to the transmitter. It may be that the processing circuitry is configured to generate the calibration and data signals, the calibration and data signals depending on a common code. It may be that the processing circuitry is configured to cause transmission of the calibration and data signals by way of the communication channel by the transmitter. It may be that the transmitter is operable over the said frequency bands. It may be that the apparatus comprises a receiver operable to receive signals by way of the communication channel. It may be that the receiver is operable over the said frequency bands. It may be that the receiver is configured to receive indications of qualities of one or more frequency bands of the communication channel from a node. It may be that the processing circuitry is communicatively coupled to the receiver. It may be that the processing circuitry is configured to selectively pre-emphasise calibration and data signals in one or more of the frequency bands of the communication channel depending on the received quality indications. It may be that the processing circuitry is configured to selectively pre-emphasise the calibration and data signals in the said one or more frequency bands by selectively adjusting the common codes on which they depend, for example by selectively adjusting the time bandwidth products thereof. It may be that the processing circuitry is configured to cause the transmitter to transmit the selectively pre-emphasised calibration and data signals by way of the communication channel, for example to the node.

It may be that the communication channel is operable over a plurality of frequency bands. It may be that the communication channel extends longitudinally down a borehole or wellbore, extending at least between first and second nodes. It may be that one or both of the first and second nodes comprise the apparatus for receiving communication signals by way of the communication channel, the apparatus for transmitting communication signals by way of the communication channel or both. It may be that, for each of the one or more frequency bands, the calibration and data signals have frequencies within the respective frequency band. It may be that the calibration function further depends on a transfer function of the communication channel, for example at least in the said frequency band.

It may be that at least one or more frequency or amplitude characteristics of the calibration and data signals depend on the common code. It may be that the common code is a time variant code. It may be that the common code is a spread spectrum code, such as a chirp code, a linear chirp code, a non-linear chirp code, a direct sequence spread spectrum code or a frequency hopping spread spectrum sequence.

It may be that the frequency bands are frequency bands of a plurality of predetermined (for example empirically) candidate frequency passbands of the communication channel. It may be that the frequency bands of the plurality of frequency bands are defined by the frequency ranges spanned by the respective calibration signal frequencies, by the frequency ranges spanned by the respective data signal frequencies or by overlapping frequency ranges spanned by both the respective calibration and data signal frequencies.

Apparatus may be provided comprising a receiver to receive a communication signal by way of a communication channel. It may be that the communication signal comprises a calibration signal encoded based on a first code and a data signal encoded based on a second code different from the first code. It may be that the encoded calibration and data signals at least partially overlap each other in the frequency domain. It may be that the encoded calibration and data signals at least partially overlap each other in the time domain. It may be that the data signal comprises a bit sequence. It may be that the apparatus further comprises processing circuitry communicatively coupled to the receiver. It may be that the processing circuitry is configured to: process the received communication signal depending on the first and second codes to thereby determine decoded calibration and data signals, the decoded calibration and data signals being discriminated from each other. It may be that the processing circuitry is configured to process the decoded calibration signal to determine a calibration function relating to the communication channel. It may be that the processing circuitry is configured to process the decoded data signal depending on the calibration function.

Apparatus may be provided comprising a transmitter to transmit a communication signal by way of a communication channel. It may be that the apparatus comprises processing circuitry communicatively coupled to the transmitter. It may be that the processing circuitry is configured to cause generation of the communication signal, the communication signal comprising a calibration signal encoded based on a first code and a data signal encoded based on a second code, the encoded calibration and data signals at least partially overlapping in the time domain and at least partially overlapping in the frequency domain. It may be that the processing circuitry is configured to cause transmission of the communication signal by the transmitter. It may be that the first code is different from the second code such that the calibration and data signals can be discriminated from each other. It may be that the data signal comprises a bit sequence.

A method of receiving a communication signal may be provided. It may be that the method comprises receiving a communication signal by way of a communication channel, the communication signal comprising a calibration signal encoded based on a first code and a data signal encoded based on a second code different from the first code, the encoded calibration and data signals at least partially overlapping each other in the frequency domain and at least partially overlapping each other in the time domain. It may be that the method comprises processing the received communication signal in dependence on the first and second codes to determine decoded calibration and data signals, the decoded calibration and data signals being discriminated from each other. It may be that the method comprises processing the decoded calibration signal to determine a calibration function relating to the communication channel. It may be that the method comprises processing the decoded data signal depending on the calibration function.

A method of transmitting a communication signal may be provided. The method may comprise causing generation of a communication signal comprising a calibration signal encoded based on a first code and a data signal encoded based on a second code, the encoded calibration and data signals at least partially overlapping each other in the time domain and at least partially overlapping each other in the frequency domain. The method may comprise causing transmission of the communication signal. It may be that the first code is different from the second code such that the calibration and data signals can be discriminated from each other.

The first and second codes may be time variant codes. The first and second codes may have frequencies or amplitudes which are time variant. It may be that the first code varies as a function of time differently from the second code. The first and second codes may be spread spectrum codes such as any of: chirp codes; linear chirp codes; non-linear chirp codes; direct sequence spread spectrum codes; frequency hopping spread spectrum sequences. The first code may be orthogonal to the second code. For example, it may be that the first and second codes are strictly orthogonal to each other, pseudo-orthogonal to each other or periodic orthogonal to each other. It may be that the cross correlation between the encoded calibration signal and the second code is substantially zero or zero and the cross correlation between the encoded data signal and the first code is substantially zero or zero. It may be that the first code is orthogonal to the second code by way of the time variance of the first and second codes, such as the time variance of their frequencies or amplitudes.

It may be that the first code has a first length in time and the second code has a second length in time, the first and second lengths being equal or substantially equal to each other. It may be that the communication channel extends longitudinally down a borehole or wellbore. It may be that the communication channel extends at least between first and second communication nodes.

It will be understood that the terms convolution and correlation and derivatives thereof relate to time domain convolution and correlation. It will be understood for the avoidance of doubt that these terms are also used to refer to multiplication and multiplication by the complex conjugate respectively in the frequency domain.

FIG. 1 shows a drilling rig having a drill string 100 extending longitudinally down a borehole 108, the drill string 100 comprising a drill bit 101 at a downhole longitudinal extent thereof and plurality of solid, hollow, tubular drill string sections 102 connected to each other longitudinally by couplings 103 and to the drill bit 101, the drill string 100 extending between a surface 104 and a lower longitudinal extent 106 of the borehole (or wellbore) 108, the borehole 108 being drilled by the drill bit 101. Downhole equipment (not shown) may be provided down the borehole 108, such as any one or more of: sensors, such as temperature sensors or pressure gauges; valves; chokes; firing heads; packers; perforators; samplers; flow meters; fluid analysers. The surface 104 may be a land surface or a surface of a sea bed, for example. The drill string sections 102 each have bores defined by solid, tubular walls and the sections 102 may be coupled together such that their bores are in fluid communication with each other and, typically, such that fluid tight seals are provided at the joints between sections 102. Drilling fluid may be transmitted through the bores of the tubular sections 102 from the surface 104 to the drill bit 101 and circulated back up to the surface 104 through an annular gap between the tubular drill string sections 102 and the side walls of the borehole 108. Torque may be applied to the drill bit 101 by way of torque applied to the tubular sections 102 of the drill string 100, for example by a top drive (not shown). A first communications node 110 may be provided at the surface 104 and a second communications node 112 may be provided at the lower longitudinal extent 106 of the borehole 108. The second node 112 may be communicatively coupled to the downhole equipment. It will be understood that the first communications node 110 may alternatively be provided beneath the surface 104, while the second communications node 112 may be provided above the lower extent 106 of the borehole 108. The first communications node 110 may be provided vertically closer to the surface 104 than the second communications node 112 is to the surface 104. The first and second nodes 110, 112 may be mechanically connected to the drill string 100, for example by way of respective couplers. The drill string 100 may be connected to a wellhead (not shown) at the surface 104. In this case, the wellhead may comprise the first communications node 110, although it will be understood that the first communication node 110 may alternatively be provided for example on the top drive, above or below slips supporting the drill string 100 below the top drive, or as part of the drilling rig.

Data, such as telemetry data or command or control data, or command acknowledgement or monitoring payload data, may be communicated between the first and second nodes 110, 112 by way of a communications channel. For example, command or control data may be transmitted from the first node 110 to the second node 112, for example to control or modify the operation of downhole equipment (e.g. a test valve) or request sensor data from downhole monitoring equipment. In this case, it may be that the second node 112 is communicatively coupled to the said downhole equipment, and may be configured to forward command or control data received from the first node 110 to the downhole equipment. In another example, command acknowledgement or monitoring data such as sensor data from downhole equipment may be transmitted from the second node 112 to the first node 110. Again in this case, it may be that the second node 112 is communicatively coupled to the downhole equipment such that the second node 112 can receive the command acknowledgement or monitoring data from the downhole equipment and forward it to the first node 110.

It may be that the communication channel has a dynamically variable transfer function. It may be that one or more frequency band(s) which are open for data communication by way of the communication channel change dynamically over time. It may be that the communication channel is noisy, lossy or noisy and lossy. It will be assumed in the following discussion, by way of example, that data is communicated between the first and second communications nodes 110, 112 by way of acoustic signals. It may be that the acoustic signals are transmitted and received through the solid longitudinal walls of the drill string sections 102 extending from the surface 104 to the lower longitudinal extent 106 of the borehole 108, the solid longitudinal walls of the drill string sections 102 acting as a communication channel by way of which data is communicated acoustically. However, it will be understood that data additionally or alternatively may be communicated between the first and second communications nodes 110, 112 by any other suitable way such as electromagnetically or by way of pressure pulses in fluid flowing through the drill string 100, or through the annular gap between the drill string 100 and the side walls of the borehole 108, such as mud, drilling fluid or product from the borehole 108, such as oil or water, or any combination thereof. Thus, the communication channel may comprise or consist of any matter extending or flowing between the first and second communications nodes 110, 112, such as solid matter or fluid propagating between the first and second communications nodes 110, 112. It may be that the communication channel comprises a communications medium, such as an acoustic communications medium. It may be that the communications medium is a wireless communications medium. An additional or alternative acoustic communication channel to the drill string 100 may be provided for example by coiled tubing or production tubing which may extend between the first and second communications nodes 110, 112. It may be that the communication channel is a downhole, "in well" or underwater communication channel. It may be that the communication channel comprises a solid communication channel such as any one or more of a drill string, a casing, production tubing, a riser, coiled tubing extending between the first and second nodes 110, 112, or a fluid communication channel such as mud, product or any combination thereof propagating between the first and second nodes 110, 112. The transceivers (see below) of nodes 110, 112 may be selected according to the selected communications medium (e.g. the transceivers may be electromagnetic or acoustic transceivers for example).

The drill string 100 may have a periodic structure which causes it to act as a mechanical filter, trapping (i.e. damping) signals having frequencies that lie within certain bands. The filtered nulls, where frequencies do not propagate, are called stopbands; the frequencies where signals may be allowed to propagate are called passbands. The stopbands may be caused by joints or couplers 103 provided between adjacent longitudinal sections thereof. Additional factors may affect the transmission path and attenuation (energy loss) of a signal propagating along the drill string, such as tension or compression of the drill string sections 102, contact of the drill string sections 102 with the side walls of the borehole 108, drilling fluid density passing through the drill string and mode coupling. Within these passbands there may be a number of instabilities. Their exact position and width vary from well to well, and can also vary dynamically during communications. The passbands may have a ripple (or 'fine structure'). The number of drill string sections 102 that the transmission energy has to pass through may primarily determine the number of ripples. The ripples may also vary over time with the changes in the depth and deviation of the well. Certain passbands may have more noise in them than others at any given time. The noise in particular passbands may reduce or the attenuation may change thus providing an increase in usable bandwidth. The frequency of a "passband", where communication is more effective, may vary over time.

It will be understood that other types of communication channel, such as other types of acoustic communication channel, may have different passbands and stop bands from a drill string. For example, coiled tubing may be considered to be acoustically joint-less for long distances, despite welds such as helical welds, which may they may have. Coiled tubing may thus provide broader frequency passbands in its acoustic frequency response than a drill string. In another example, it may be that production tubing is a more suitable acoustic communication channel at higher acoustic frequencies than a drill string, with a different arrangement of passbands and stop bands. Candidate passbands of the communication channel can be determined empirically.

Figure 2:
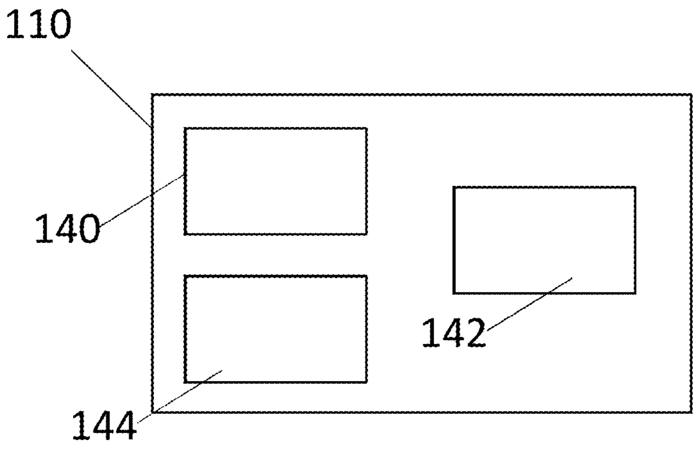
FIG. 2 schematically illustrates a communications node of FIG. 1.

FIG. 2 schematically illustrates apparatus of the first communications node 110. The second communications node 112 may have apparatus comprising the same or similar features. Indeed, it will be assumed in the following discussion that the second communications node 112 has apparatus comprising the same features as those shown in FIG. 2. As such, the second communications node 112 will not be described separately here.

The first communications node 110 may comprise processing circuitry 140 and a transceiver 142 communicatively coupled to the processing circuitry 140, for example by wired connections. The first communications node 110 may further comprise a memory 144 communicatively coupled to the processing circuitry 140. The processing circuitry 140 may be configured to generate communication signals to be transmitted by the transceiver 142. The processing circuitry 140 may be configured to cause the transceiver 142 to transmit communication signals. The processing circuitry 140 may be configured to process communication signals received by the transceiver 142. The processing circuitry 140 may comprise general purpose processing circuitry or special purpose processing circuitry. The functionality of the processing circuitry 140 described herein may be implemented in software, hardware or firmware or a combination of any of software, hardware and firmware. For example, the processing circuitry 140 may be configured to retrieve and execute computer program instructions stored in the memory 144 to thereby provide its functionality described herein. The memory 144 may comprise any suitable memory such as cache memory, random access memory (RAM), read only memory (ROM), flash memory, magnetic or optical disk or any combination thereof. The transceiver 142 may be configured to transmit and receive acoustic signals, for example by way of an acoustic communication channel such as the drill string 100. The transceiver 142 may be operable to transmit and receive signals over a plurality of frequency bands. The transceiver 142 may be communicatively coupled to the communication channel by one or more couplers. The transceiver 142 may comprise one or more transducers, such as one or more acoustic transducers, which may be operable over a plurality of frequency bands. The transceiver 142 may comprise a discrete transmitter and a discrete receiver, which may each comprise a respective transducer such as a respective acoustic transducer, or the transceiver 142 may comprise an integrated transmitter and receiver which share hardware. For example, the transceiver may comprise an integrated transceiver and receiver which share a transducer such as an acoustic transducer. It may be that the transceiver is an acoustic, electromagnetic or fluid (e.g. mud or product) pulse transceiver configured to transmit and receive acoustic, electromagnetic or fluid pulse signals respectively. However, it will be assumed below that the transceiver is an acoustic transceiver. It may be that the transducer(s) are capable of converting acoustic signals to electrical signals, electrical signals to acoustic signals or both. It may be that the processing circuitry is configured to cause transmission of acoustic signals by the node by providing electrical signals to the transceiver for conversion to acoustic signals. It may be that the node is configured to receive acoustic signals by the transceiver converting received acoustic signals to electrical signals and passing the electrical signals to the processing circuitry 100.

Figure 3A:
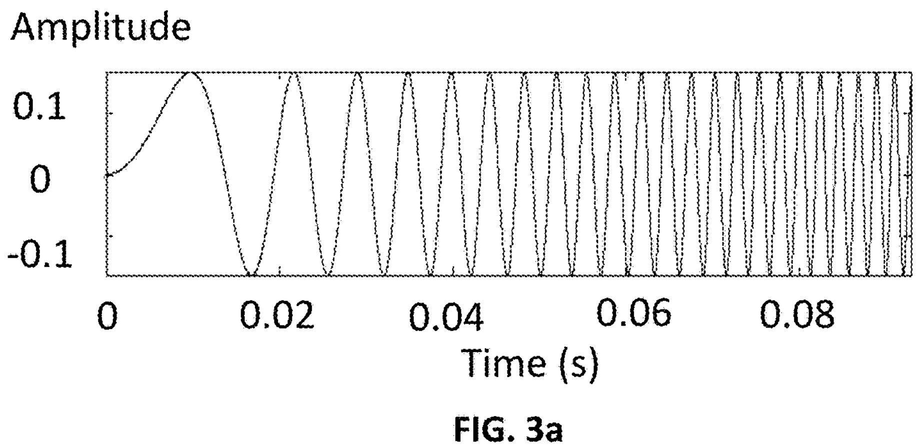
FIG. 3*a* shows an example chirp signal in the time domain.
Figure 3B:
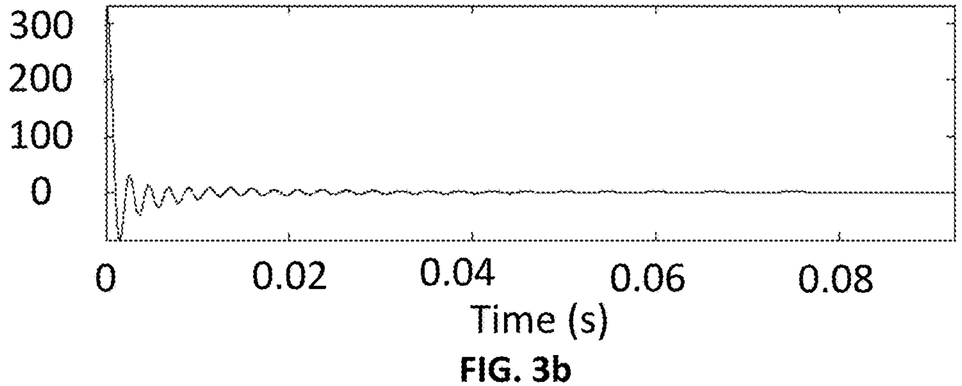
FIG. 3*b* shows a pulse compressed version of the chirp signal of FIG. 3*a;*

As discussed above, the communication channel between the communications nodes 110, 112 may be noisy, lossy and dynamically changing. Chirp codes may be used to provide a high signal to noise ratio to thereby allow data to be successfully transmitted through such an environment. A typical chirp pulse is a frequency sweep pulse with a short autocorrelation function. Chirp pulses may be any signal, such as a pressure wave signal, capable of pulse compression. An example chirp pulse of constant AC amplitude and varying frequency is illustrated in the time domain in FIG. 3*a*. A pulse compressed version of the chirp pulse of FIG. 3*a*, obtained by correlating the chirp function of FIG. 3*a* with a stored reference chirp identical to the chirp function of FIG. 3*a*, is shown in FIG. 3*b*, the pulse compressed version having an initial peak followed by lower amplitude oscillations.

The communication channel may be operable over a plurality of frequency bands. Particularly in a downhole communication environment, certain frequency bands for communication by way of the communication channel can be expected to be more prone to noise or attenuation or to both noise and attenuation than others. The frequency bands of the plurality which are less prone to noise or attenuation can also dynamically change. The noise and loss characteristics of the respective bands can also dynamically change. It is therefore desirable that one or more suitable frequency bands for data communication by way of the communication channel are determined and selected. It is desirable that the determinations and selections of one or more suitable frequency bands for data communication by way of the communication channel are updated over time to ensure that they continue to correspond to the frequency bands least exposed to the effects of noise, attenuation or noise and attenuation. It may be that the first and second nodes 110, 112 are configured to determine updated suitabilities of one or more, e.g. a plurality of, frequency bands of the communication channel for data communication between them. It may be that the first and second nodes 110, 112 are configured to make updated selections of one or more frequency bands which are suitable for data communication, such as one or more frequency bands of the plurality of frequency bands least exposed to the effects of noise and attenuation.

It may be that the plurality of frequency bands are candidate frequency passbands of the communication channel which may have been predetermined, for example empirically, to be potentially suitable for data communication between the first and second nodes 110, 112 by way of the communication channel. It may be that the candidate frequency bands are bands which have been previously identified as allowing signals to propagate between the first and second nodes 110, 112. For example, the candidate frequency bands may be passbands extending between predetermined stop bands of the communication channel, which stop bands may for example, for a communication channel comprising the drill string 100, be nulls filtered out mechanically by the drill string 100. It may be that respective ones of the predetermined candidate frequency passbands of the communication channel which are adjacent to each other (i.e. having no other candidate frequency passbands between them) in the frequency domain are separated by respective predetermined stop-bands of the communication channel.

In order to account for changing noise and loss characteristics of the communication channel in the respective bands during communications between the nodes 110, 112 by way of the communication channel, calibration signals may be transmitted between the nodes 110, 112 in addition to data signals so that calibration functions may be determined from the calibration signals and so that the data signals can be processed in dependence on the calibration functions to take account of the effects of the communication channel on the data signals.

In order to determine suitable frequency bands, which may be frequency bands of the plurality of candidate frequency bands, for data communication with the second node 112 by way of the communication channel, the processing circuitry 140 of the first node 110 may be configured to cause the transmitter thereof to transmit to the second node 112, by way of the communication channel, corresponding first and second signals in each of a plurality of frequency bands. The first and second signals may be for the second node 112 to determine the suitabilities of the respective frequency bands for data communication from the first node 110 to the second node 112. The first and second signals may form a dedicated calibration sequence for the second node 112 to determine the suitabilities of the frequency bands for data communication from the first node 110 to the second node 112. The first and second signals may be transmitted from the first node 110 to the second node 112, and received by the second node 112 from the first node 110, for example when the communication channel is in situ in the borehole 108, for example during operation of downhole equipment in the borehole 108, such as during drilling of the borehole 108, for example by the drill bit 101 of the drill string 100, logging, drill stem testing, fracturing, stimulation, completion, cementing or production. The first node 110 may be configured to receive indications of suitabilities of the frequency bands from the second node 112.

The first signals may be calibration signals which may for example be based on predetermined calibration signals known to the second node 112, such as by way of predetermined calibration data stored at the second node 112. It may be that the second node 112 can determine the effects of the channel, and thus calibration functions, from the received first signals. The second signals may be based on predetermined reference data, which may be known to the second node 112, for example by way of reference data stored at the second node 112.

In order to provide the calibration and data signals with greater immunity to the noise levels of the channel, it may be that the first and second signals depend on (e.g. are encoded in dependence on) respective codes. For example, it may be that the first and second signals comprise calibration and predetermined reference data respectively encoded in dependence on respective codes. For example it may be that the respective first signals comprise calibration data encoded based on a respective code. The calibration data may comprise a constant or time varying amplitude. The calibration data may be known by the second node 112, for example by being stored at memory 144 of the second node 112. The predetermined reference data of the second signals may comprise predetermined reference data based on a predetermined bit sequence or predetermined waveform. It may be that the codes are time variant codes. It may be that the codes are spread spectrum codes such as any of: chirp codes; linear chirp codes; non-linear chirp codes; direct sequence spread spectrum codes; frequency hopping spread spectrum sequences. It may be that the respective codes are known to the second node 112, for example by being stored at memory 144 of the second node 112.

For each of the frequency bands, the respective first signal may comprise or consist of a plurality of first signal frequencies within the frequency band. The first signal frequencies may span at least 70%, at least 80%, at least 90%, at least 95% or 100% of the respective frequency band. For example, the first signal may comprise a chirp signal such as an up-chirp or down-chirp which sweeps at least 70%, at least 80%, at least 90%, at least 95% or 100% of the respective frequency band. The more of the frequency band which is swept by the first signal, the more accurate the determination of the suitability of the frequency band.

It may be that the frequency bands are narrowband frequency bands. It may be that the widths of the frequency bands depend on the implementation, for example on the type of communication channel. For example, it may be that a coiled tubing communication channel provides wider frequency bands than a drill string. It may be that, for each of the frequency bands, the difference between the lower and upper frequency cut-offs of the frequency band may be between 10 Hz and 5000 Hz, 10 Hz and 3000 Hz, 10 Hz and 1000 Hz, 10 Hz and 500 Hz, 10 Hz and 250 Hz, 50 Hz and 150 Hz, 100 Hz or substantially 100 Hz, 2 kHz or substantially 2 kHz or at least 2 kHz.

Figure 4A:
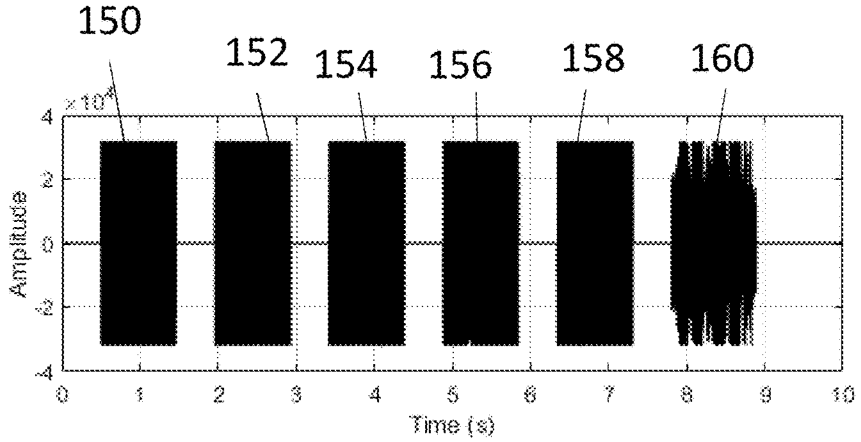
FIG. 4*a* shows a time domain representation of five calibration chirp signals sweeping different frequency bands transmitted in a series followed by a plurality of predetermined reference data signals in the respective different frequency bands transmitted simultaneously.

The first signals in the different frequency bands may be transmitted in a series. This is illustrated in FIG. 4*a*, which shows five first signals 150, 152, 154, 156, 158 transmitted in a series by the transceiver, the said first signals comprising up-chirp signals spanning frequency ranges from 600 Hz to 700 Hz (152), 850 Hz to 950 Hz (154), 1150 Hz to 1250 Hz (156), 1400 Hz to 1500 Hz (158) and 1690 Hz to 1790 Hz (150) respectively. A time delay of around 0.5 seconds is provided between successive first signals 150-158 to allow for ring-down of the communication channel before the next first signal in the series is transmitted. Alternatively, the first signals 150-158 may be transmitted simultaneously or a plurality thereof may at least partially overlap each other in the time domain; this will be described in more detail below.

For each of the frequency bands, the second signal may comprise or consist of a plurality of second signal frequencies within the respective frequency band. It may be that the second signal frequencies span at least 50%, at least 70%, at least 80%, at least 90%, at least 95% or 100% of the respective frequency band. It may be that, for each of the frequency bands, the second signal is based on one or more chirps which at least together sweep at least 50%, at least 70%, at least 80%, at least 90%, at least 95% or 100% of the respective frequency band. It may be that, for each of the said frequency bands, the frequency range spanned by the second signal frequencies at least partially overlaps the frequency range spanned by the corresponding first signal frequencies. It may be that, for each of the said frequency bands, the frequency range spanned by the second signal frequencies overlaps at least 50%, at least 70%, at least 80%, at least 90%, at least 95% or 100% of the respective frequency range spanned by corresponding first signal frequencies. It may be that the codes, such as the chirps, used to encode the predetermined reference data of the second signals are the same or different from those on which the first signals are based.

As indicated above, it may be that, for each of the plurality of frequency bands, the second signal comprises predetermined reference data, such as predetermined reference data based on a predetermined waveform or a predetermined bit sequence, such as a predetermined bit sequence comprising at least two bits, such as at least one binary ‘1’ and at least one binary ‘0’ or at least two binary ‘1’s. It may be that the second signal comprises encoded predetermined reference data. It may be that the second signal comprises a predetermined waveform or bit sequence encoded based on one or more codes. It may be that the one or more codes are time variant codes. It may be that the predetermined data is encoded by way of a first code representing a binary ‘1’ and a second code different from the first code, or the absence of the first code, representing a binary ‘0’. For example, it may be that, for each of the frequency bands, the second signal comprises a series of chirp signals, such as a sequence of chirp signals in the time domain, which together provide an encoded predetermined bit sequence or an encoded predetermined waveform based on a predetermined bit sequence. The predetermined bit sequence may comprise 1101001 which, from tests of signal leakage across frequency bands, helps to maximise the bit density in each of the bands. Where the bit sequence is encoded by way of a plurality of chirp signals, it may be that a chirp signal corresponds to a binary ‘1’ and the absence of a chirp signal corresponds to a binary ‘0’. Alternatively, it may be that the presence of a first chirp function (e.g. up-chirp) corresponds to a binary ‘1’ and the presence of a second chirp function (e.g. down-chirp) different from the first chirp function corresponds to a binary ‘0’.

For example, it may be that, for each of the frequency bands, the second signal comprises an encoded predetermined bit sequence or waveform generated by way of on/off keying. In this case, it may be that a chirp signal (e.g. an up-chirp or a down-chirp) represents a binary ‘1’ in the encoded predetermined bit sequence and the absence of a (or that) chirp signal represents a binary ‘0’ in the encoded predetermined bit sequence. It may be that the chirp signal of each binary ‘1’ has a frequency which sweeps over (e.g. ramps up or down in frequency across) at least a portion of (or the entire) frequency band. It may be that a particular chirp code is used to represent each binary ‘1’ (i.e. it may be that each binary ‘1’ is represented by the same chirp code). For each of the frequency bands, the chirps representing the binary ‘1’s of the second signal may be offset from each other in the time domain, but they may (e.g. significantly) overlap each other in the time domain when transmitted. For example it may be that, for two successive chirps representing consecutive binary ‘1’s in the second signal (i.e. with no binary ‘0’s in between them), at least 50%, at least 80%, at least 90% or at least 95% of the chirps overlap in the time domain. This is possible because, when decoded (pulse compressed) at the receiving node, each chirp is compressed in time, for example by factor of 100. It will be understood that larger time offsets may be provided between chirps representing binary ‘1’s in order to represent one or more binary ‘0’s.

It may be that the frequency bands of the plurality of frequency bands are defined by the frequency ranges spanned by the respective first signal frequencies, by the frequency ranges spanned by the respective second signal frequencies or by the overlapping frequency ranges spanned by both the respective first and second signal frequencies.

As shown in FIG. 4*a*, the second signals 160 may be transmitted simultaneously across all of the frequency bands of the plurality. By the second signals at least partially or fully overlapping each other in the time domain, the suitabilities of the corresponding plurality of frequency bands for data communication by way of the communication channel can be determined more quickly than if they were separated in time from each other. In addition, a more accurate determination of the suitabilities of the corresponding plurality of frequency bands for data communication by way of the communication channel can be made as less time will have elapsed between receipt of the corresponding first and second signals. This means that there is less chance of the properties of the communication channel having changed between receipt of the first and second signals. The second signals 160 may be discrete from the first signals 150-158 (i.e. it may be that the first and second signals do not overlap) in the time domain in order to help prevent interference between them. Alternatively, the first and second signals may be transmitted simultaneously with each other (or that they at least partially overlap each other in the time domain), in which case it may be that the respective first and second signals are encoded based on different (e.g. orthogonal) codes from each other to allow them to be discriminated from each other at the second node 112. This is discussed in more detail below.

Figure 4B:
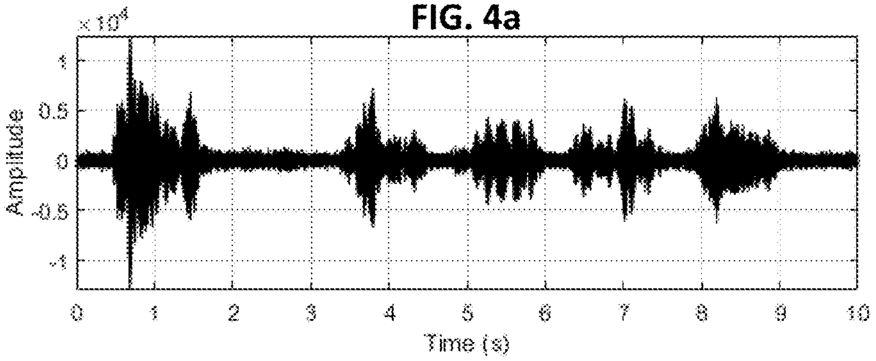
FIG. 4*b* shows the signals of FIG. 4*a* after they have passed through a communication channel.
Figure 5A:
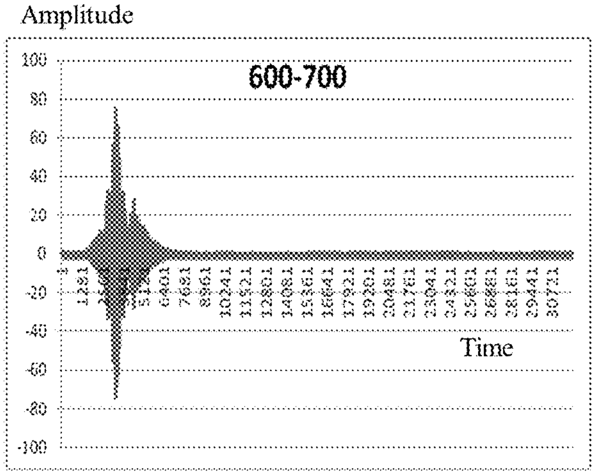
FIGS. 5*a*-5*e* show pulse compressed versions of the five received calibration chirp signals of FIG. 4*b;*
Figure 5B:
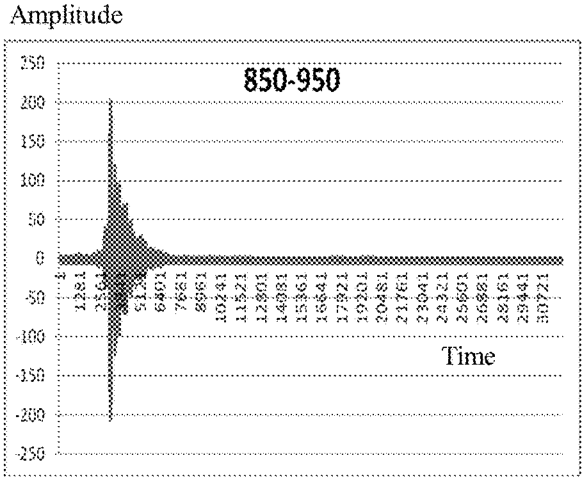
Figure 5C:
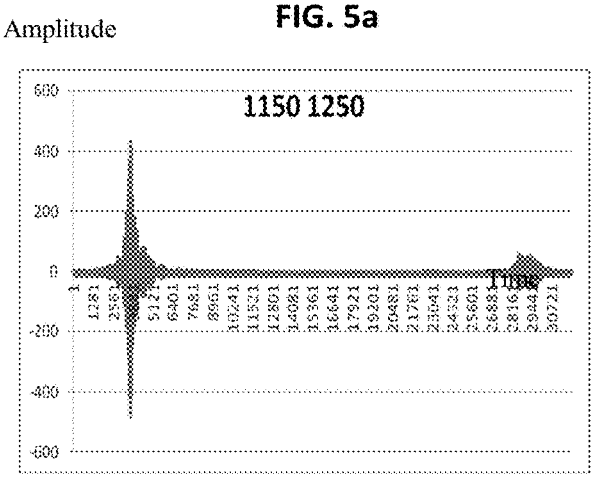
Figure 5D:
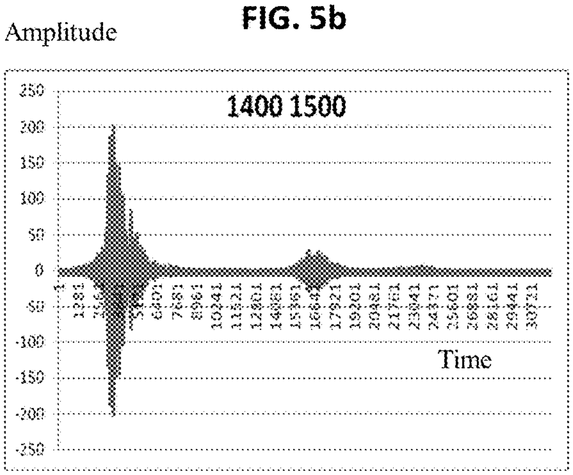
Figure 5E:
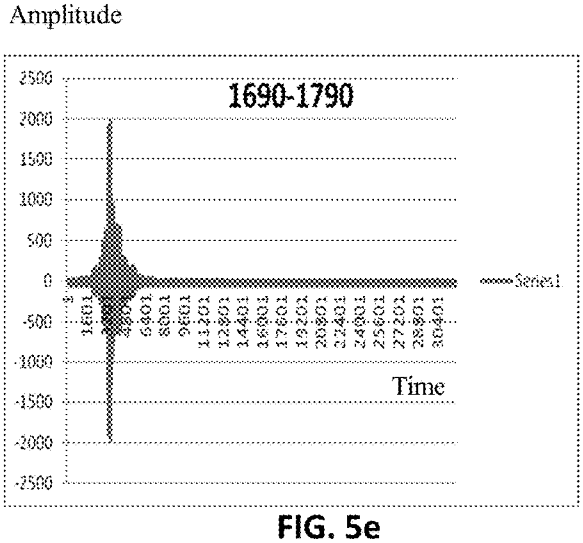

When the first and second signals 150-160 are transmitted over the communication channel, they are adapted in accordance with the transfer function of the communication channel. For example, noise will be added to the first and second signals, and the first and second signals will be attenuated in accordance with the transfer function of the communication channel. It may be that the communication channel has a dynamically variable transfer function, such that the noise and attenuation experienced in the frequency bands of the channel vary over time. FIG. 4*b* shows the signals of FIG. 4*a* after they have been transmitted acoustically through the solid, tubular walls of a 1 km test pipe. By comparing FIG. 4*a* with FIG. 4*b*, which are aligned with each other in the time domain, example attenuation and noise effects of the communication channel on the transmitted signals can be seen.

The transceiver 142 of the second node 112 may be configured to receive the first and second signals 150-160 transmitted by the first node 110 to the second node 112 by way of the communication channel. The processing circuitry 140 of the second node 112, which is communicatively coupled to the transceiver 142 thereof, may be configured to process the first and second signals 150-160 received by the transceiver 142. For each of a plurality of frequency bands in respect of which first signals are received from the first node 110, the processing circuitry 140 of the second node 112 may be configured to determine a calibration function relating to the communication channel depending on the first signal received in that band, for example by processing the first signal depending on stored predetermined calibration reference data on which it is based, such as by pulse compressing the first signal by correlation with a respective stored calibration reference chirp on which it is based, obtaining a frequency domain representation of the respective processed (e.g. pulse compressed) first signal and inverting the said frequency domain representation of the respective processed (e.g. pulse compressed) first signal. By processing the respective received first signal in dependence on the stored predetermined calibration reference data for that band, the dependency of the first signal on the respective predetermined calibration reference data may be removed. The processing circuitry 140 of the second node 112 may be configured to process the second signal received in that band in dependence on the calibration function for that band to take account of the effects (e.g. noise, attenuation or noise and attenuation effects) of the communication channel on the second signal. By taking into account the effects of the communication channel on the second signal, the second signal can be recovered more accurately. The processing circuitry 140 of the second node 112 may be configured to determine the suitability of the frequency band for data communication from the first node 110 to the second node 112 depending on the processed second signal. This will be explained in more detail below.

Figure 6:
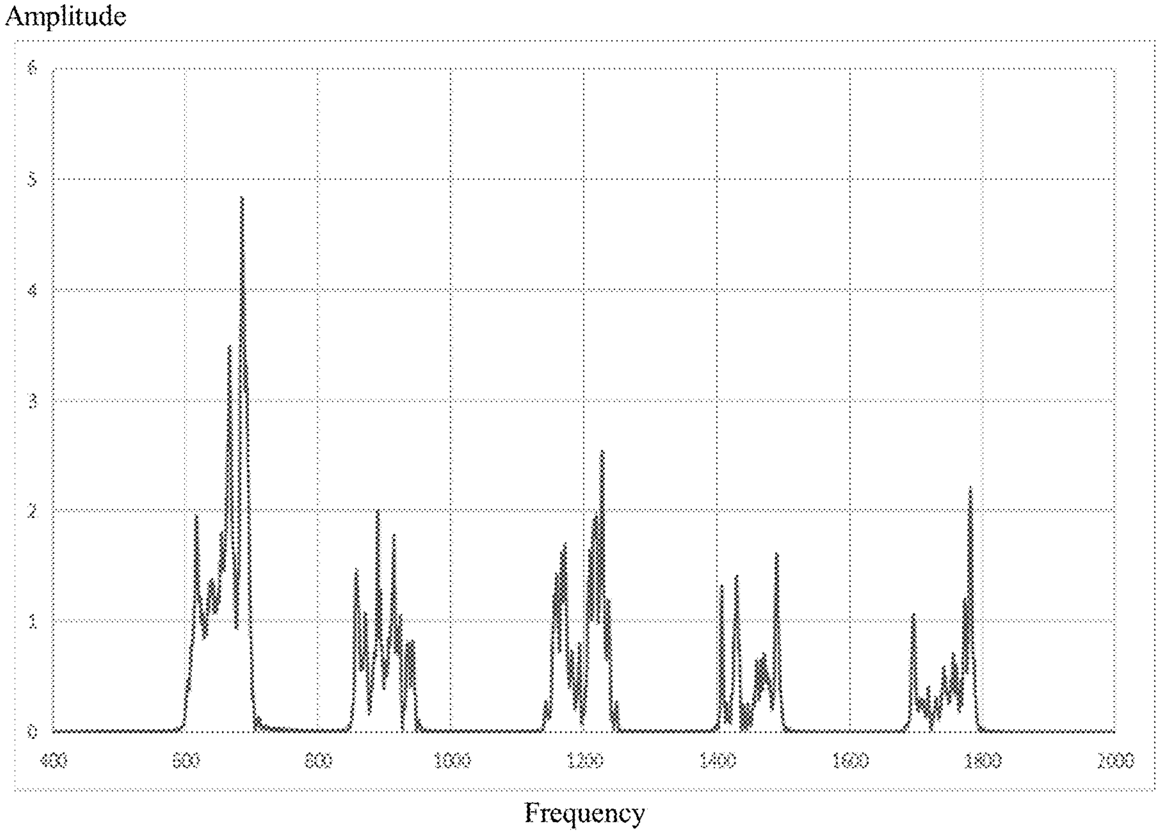
FIG. 6 shows the passband amplitude responses of the signals of FIGS. 5*a*-5*e;*
Figure 7:
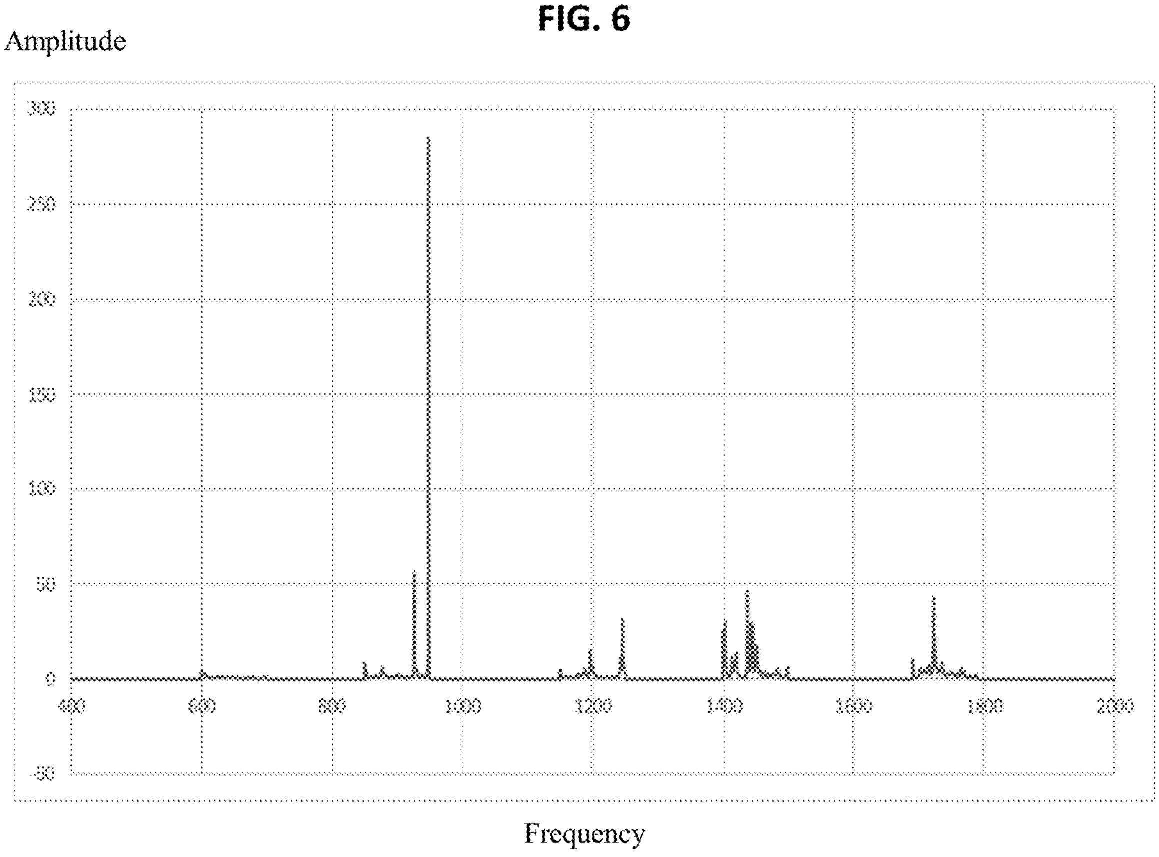
FIG. 7 shows the reciprocal of the transform of FIG. 6.

It may be that the processing circuitry 140 of the second node 112 is configured to determine, for each of the plurality of frequency bands, the effect of the communication channel on the first signal in that band and to determine a calibration function depending thereon. The calibration function may also be determined in dependence on a respective predetermined calibration signal on which the respective first signal is based, which may for example be stored in memory 144 of the second node 112. It may be that a different respective predetermined calibration signal is stored for each of the respective frequency bands, for example to account for the respective first signals being in different frequency bands. For example, it may be that the processing circuitry 140 of the second node 112 is configured to, for each of the plurality of frequency bands, determine a calibration function relating to the communication channel depending on the first signal received in that band by processing (e.g. pulse compressing) the respective first signal in dependence on the respective predetermined calibration signal on which it is based (e.g. to thereby decode the calibration signal). It may be that the processing circuitry 140 of the second node 112 is further configured to determine a frequency domain representation of the processed (e.g. decoded, e.g. pulse compressed) first signal and to determine the calibration function by taking the reciprocal of the magnitude and the complex conjugate of the phase of the frequency domain representation of the processed (e.g. pulse compressed) first signal. For example, for each of the frequency bands, the processing circuitry 140 of the second node 112 may be configured to perform a correlation between the respective received first signal and the respective stored predetermined calibration signal (e.g. known chirp) on which the respective received first signal is based to thereby process (e.g. pulse compress) the respective received first signal. The respective stored predetermined calibration signal (e.g. known chirp) may be stored in and retrieved by processing circuitry 140 from the memory 144 of the second node 112. Pulse compressed versions of the received first signals shown in FIG. 4*b* in the respective frequency bands 600 Hz to 700 Hz (152), 850 Hz to 950 Hz (154), 1150 Hz to 1250 Hz (156), 1400 Hz to 1500 Hz (158) and 1690 Hz to 1790 Hz (150) are shown in FIGS. 5*a* to 5*e* respectively. Next, the processing circuitry 140 of the second node 112 may place the correlated first signals from the different frequency bands into a clipping buffer in memory 144, such that their peak energies are a consistent number of samples offset from the start of the clipping buffer. Next, a Fast Fourier transform (FFT) may be performed on the contents of the clipping buffer to determine the spectra of the channel's transfer function within the respective frequency bands. These are shown in FIG. 6 combined into a single spectrum. By placing the correlated signals at the same position in the buffer, the transfer functions for each passband are referenced to the same phase or time reference. The calibration function for each frequency band may be determined by inverting the spectrum of the channel's transfer function for the respective frequency band, for example by inverting the spectrum of the frequency domain representation of the respective first signal processed depending on the respective predetermined calibration signal. This is shown for each of the plurality of frequency bands in FIG. 7. The inverse of the spectrum of the channel's transfer function for the respective frequency band may be determined by taking the reciprocal of the magnitude (e.g. $X \rightarrow 1/X$) and the complex conjugate of the phase (e.g. $Y^\circ \rightarrow -Y^\circ$) of the said frequency domain representation of the respective processed (e.g. pulse compressed) first signal. Alternatively, the processing circuitry may be configured to convert the received first signals into the frequency domain, for example by applying an FFT thereto, before multiplying the frequency domain representation of the first signal by the complex conjugate of a frequency domain representation of the stored predetermined calibration signal, to thereby correlate the respective received first signal with the respective stored predetermined calibration signal, and take the inverse of the output of the correlation as the calibration function. Any other suitable method of determining a calibration function from the first signal and processing the second signal in dependence thereon to take account of the effect of the communication channel on the second signal may be employed.

The processing circuitry 140 of the second node 112 may be configured, for each of the plurality of frequency bands, to process the second signals from the first node 110. If the predetermined reference data is encoded in the second signals in accordance with one or more codes, such as one or more chirp codes, the processing circuitry 140 may process the respective received second signals in dependence on respective stored reference codes based on the said codes used in the encoding, to decode the second signals. In this way, it may be that the dependency of the second signals on the said codes may be removed. A different respective reference code may be stored for each of the respective frequency bands, for example to account for the respective second signals being in different frequency bands. For example, if the predetermined reference data is encoded in accordance with one or more chirp codes, the processing circuitry 140 may be configured to process the respective second signals by pulse compressing the second signals, for example by correlating the respective received second signals with respective stored reference chirp signals used to encode the predetermined reference data of the respective second signals. The known reference codes may be stored in and retrieved by processing circuitry 140 from the memory 144 of the second node 112. As well as decoding (e.g. pulse compressing) the second signals, this has the effect of separating the second signals of the different frequency bands from each other at the second node 112. Whether the predetermined reference data is encoded in the second signals or not, the processing circuitry 140 of the second node 112 may be configured to, for each of the plurality of frequency bands, process the respective second signal depending on the calibration function for that frequency band, such as by convolving the (e.g. decoded, e.g. pulse compressed) second signal with the calibration function, to take account of the effect of the communication channel on the second signal. The convolution may be done in the frequency domain by determining frequency domain representations of the calibration function and the (e.g. decoded, e.g. pulse compressed) second signal and by multiplying the frequency domain representations of the calibration function and (e.g. decoded, e.g. pulse compressed) second signal.

It will be understood that the calibration data may be accounted for, for example by scaling the predetermined calibration reference data, the calibration function, or the second signal processed depending on (e.g. convolved with) the calibration function, in accordance with (e.g. the known constant or time varying amplitude of) the calibration data.

As the calibration functions are dependent on the effect of the communication channel on calibration signals propagating over the communication channel at a similar time to (e.g. just before, just after or simultaneously with) the second signals, the transfer function of the communication channel is unlikely to, or will not, have changed between propagation of the first and second signals over the communication channel, and the processing of the second signals in dependence on the calibration functions generally takes into account the current characteristics of the transfer function of the communication channel between the first and second nodes 110, 112. Thus, the first and second signals may be transmitted or received within a time period such that the calibration functions derived from the first signals may take into account the characteristics of the transfer function of the communication channel between the first and second nodes 110, 112 as experienced by the second signals. For example, the time gap (if any) between the end of transmitting or receiving the first signal and the start of transmitting or receiving the second signal may be less than 30 seconds, less than 10 seconds, less than 5 seconds, less than 1 second, less than 0.6 seconds or less than 0.5 seconds. It may be that there is no time gap between transmitting or receiving the first and second signals.

When the second signals have been processed depending on the respective calibration functions and, if the predetermined reference data on which the second signals are based is encoded, the second signals have been processed such that the predetermined reference data has been decoded, the processing circuitry 140 of the second node 112 may be configured to determine the suitabilities of the frequency bands for data communication from the first node 110 to the second node 112 depending on the processed second signals. It may be that the processing circuitry 140 is configured to determine qualities of the respective processed second signals. It may be that the processing circuitry is configured to determine the suitabilities of each of the frequency bands for data communication from the first node 110 to the second node 112 by way of the communication channel depending on the determined qualities of the respective processed second signals.

Figure 8:
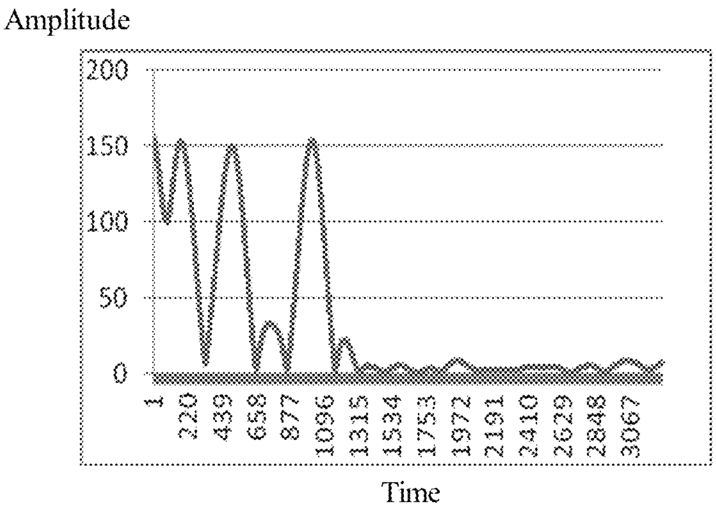
FIGS. 8 and 9 show idealised predetermined reference data waveforms for the transmitted predetermined reference data signals of FIG. 4*a* for different frequency bands.
Figure 9:
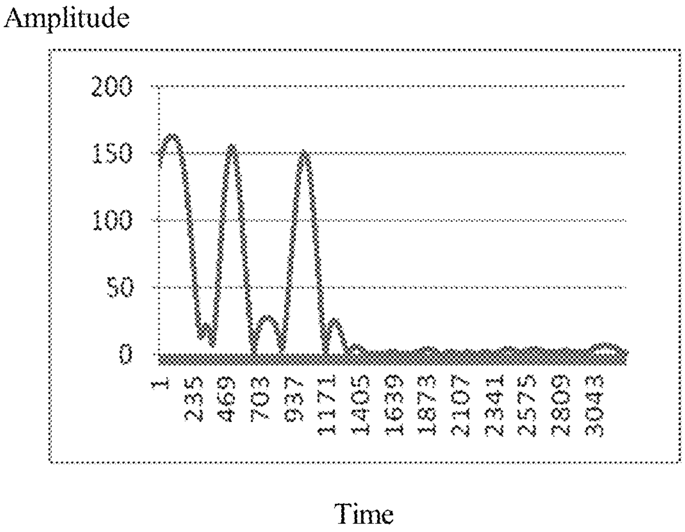

As mentioned above, the second signals may comprise predetermined reference data, which may be based on a predetermined waveform or a predetermined bit sequence. It may be that the predetermined reference data is frequency band dependent. For example, an idealised representation of an example predetermined reference waveform for the frequency band 1690 Hz to 1790 Hz is shown in FIG. 8. This waveform may be based on a bit sequence 1101001. An idealised representation of an example predetermined reference waveform for each of the frequency bands 600 Hz to 700 Hz, 850 Hz to 950 Hz, 1150 Hz to 1250 Hz and 1400 Hz to 1500 Hz is shown in FIG. 9. This waveform may be based on the bit sequence 1101001. It may be that the predetermined reference data, such as the waveforms of FIGS. 8 and 9, are stored in the memory 144 of the second node 112. It will be understood that the waveforms may alternatively be based on different bit sequences. It will also be understood that the predetermined reference data may be different for some bands or for each band or the same for all bands.

It may be that the processed second signals are recovered versions of the predetermined reference data on which the second signals transmitted by the first node 110 are based. It may be that the processing circuitry 140 of the second node 112 is configured to determine, for each of the frequency bands, the suitability of the frequency band for data communication from the first node 110 to the second node 112 depending on the respective processed second signal for that band based on the respective processed second signal and the stored predetermined reference data for that band. The processing circuitry 140 of the second node 112 may be configured to compare the processed second signal to stored predetermined reference data to determine whether the respective processed second signal matches the stored predetermined reference data for that band and to determine whether that band is suitable for data communication from the first node 110 to the second node 112 in dependence thereon. For example, if there is a match between the processed second signal and the predetermined reference data in a particular frequency band, the processing circuitry 140 may determine that the frequency band is suitable for communication from the first node 110 to the second node 112 by way of the communication channel. If the processed second signal does not match the predetermined reference data, the processing circuitry 140 may determine that the frequency band is not suitable for communication from the first node 110 to the second node 112 by way of the communication channel. Thus, comparing the processed second signal (which may comprise a waveform or bit sequence for example) to the known predetermined reference data provides a mechanism by which the quality of the second signal having propagated along the channel and thus the suitability of the respective band can be determined.

Figure 10A:
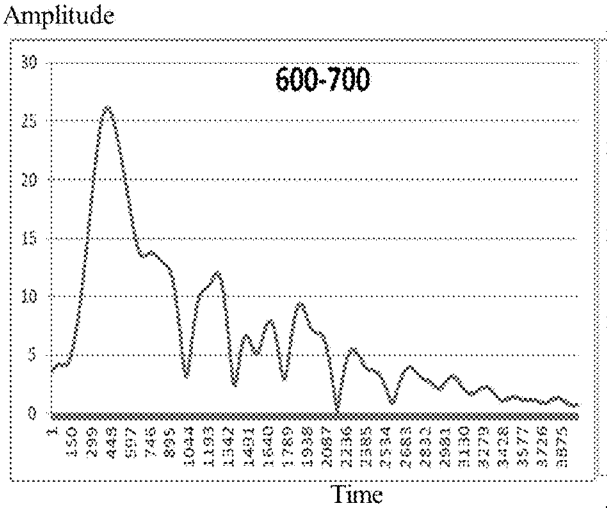
FIGS. 10*a* to 10*e* show pulse compressed versions of the received predetermined reference data signals of FIG. 4*b* processed in accordance with the reciprocal spectrum of FIG. 7.
Figure 10B:
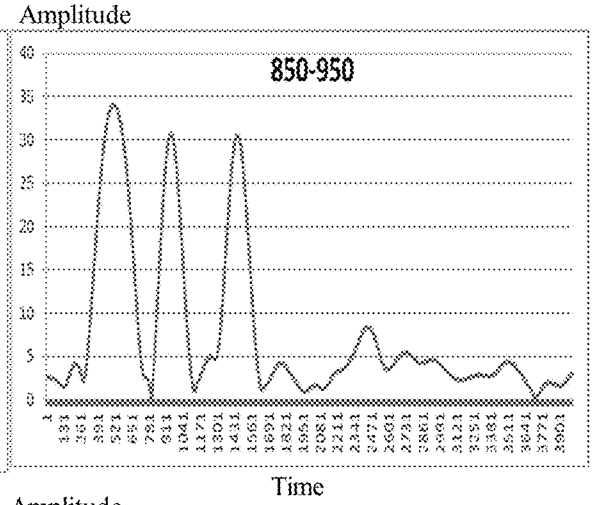
Figure 10C:
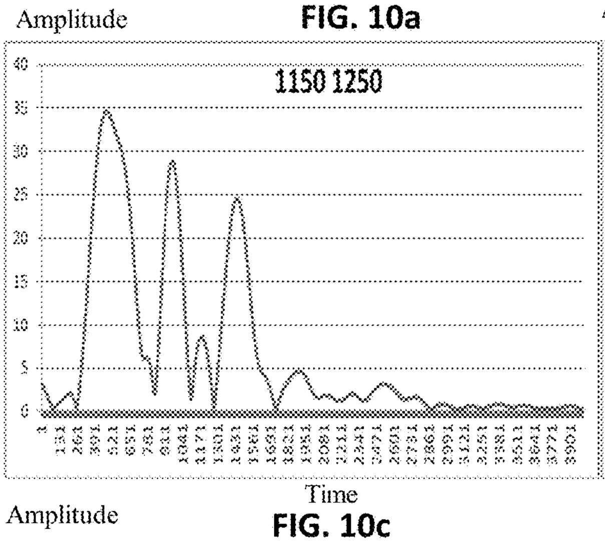
Figure 10D:
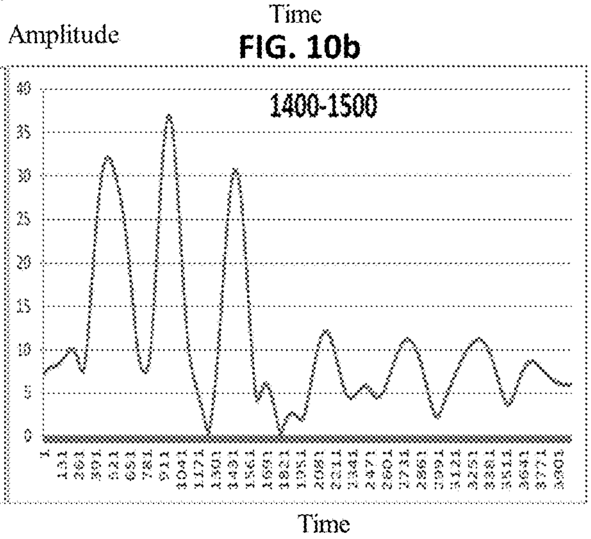
Figure 10E:
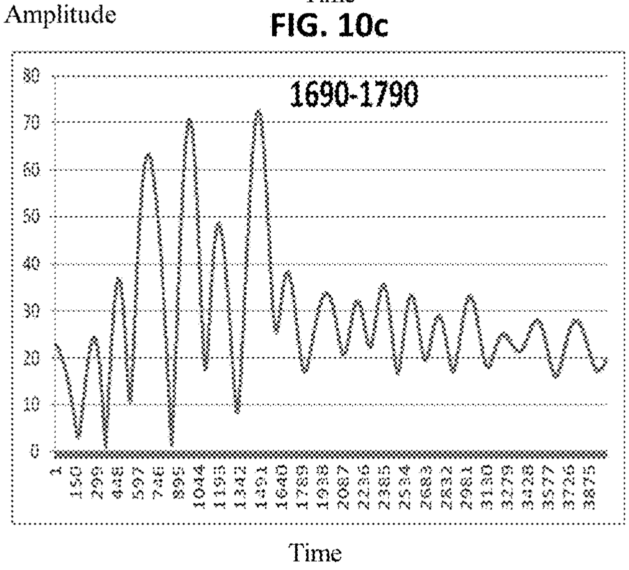

For example, FIGS. 10*a* to 10*e* illustrate example received second signals which have been pulse compressed and processed depending on the respective calibration functions for frequency bands 600 Hz to 700 Hz (FIG. 10*a*), 850 Hz to 950 Hz (FIG. 10*b*), 1150 Hz to 1250 Hz (FIG. 10*c*), 1400 Hz to 1500 Hz (FIG. 10*d*) and 1690 Hz to 1790 Hz (FIG. 10*e*). The processing circuitry 140 may be configured to compare the waveforms of FIGS. 10*a* to 10*d* to the waveform of FIG. 9, and to compare the waveform of FIG. 10*e* to the waveform of FIG. 8, and to determine whether there is a match in each case. In this example, the processing circuitry 140 may determine that there is a match between FIGS. 10*b*, 10*c* and 10*d* and FIG. 9, but no match between FIG. 10*a* and FIG. 9 or between FIG. 10*e* and FIG. 8. Accordingly, the processing circuitry 140 may determine that frequency bands 850 Hz to 950 Hz (FIG. 10*b*), 1150 Hz to 1250 Hz (FIG. 10*c*) and 1400 Hz to 1500 Hz (FIG. 10*d*) are open for communication from the first node 110 to the second node 112 by way of the communication channel and that frequency bands 600 Hz to 700 Hz (FIG. 10*a*) and 1690 Hz to 1790 Hz (FIG. 10*e*) are not open for communication from the first node 110 to the second node 112 by way of the communication channel.

It will be understood that the "match" between waveforms does not necessarily have to be a perfect match; a match which meets one or more predetermined matching criteria may be sufficient. For example, one or more matching criteria may be defined relating to tolerances on the relative positions of corresponding peaks and troughs of the compared waveforms.

It may be that the determinations of the suitabilities of the frequency bands for data communication are binary determinations which indicate whether the frequency bands are suitable for data communication or not. It may be that the frequency band is suitable for data communication from the first node 110 to the second node 112 by way of the communication channel because data communication signals having their frequencies in the frequency band can be successfully transmitted to the second node 112 from the first node 110 and recovered by the second node 112. The processing circuitry 140 of the second node 112 may output indications of the suitabilities of the frequency bands for data communication from the first node 110 to the second node 112, which may be stored in memory for transmission to the first node 110. It may be that the indications of the suitabilities of the frequency bands for data communication are binary indications which indicate whether the respective bands are suitable for data communication with the node by way of the communication channel or not.

Depending on the determinations of the suitabilities of the frequency bands, it may be that the processing circuitry 140 of the second node 112 causes it to selectively process signals from the first node 110 in one or more frequency bands determined to be suitable for data communication from the first node 110 to the second node 112, for example by selectively setting the frequency bands determined to be suitable as expected receiver passbands of the transceiver. In this case, it may be that the processing circuitry 140 of the second node 112 is configured to cause it to selectively process signals from the first node 110 in one or more or each of the bands determined to be suitable for data communication from the first node 110 to the second node 112 and to selectively discard signals from the first node 110 in frequency bands not determined to be suitable for data communication from the first node 110 to the second node 112. Alternatively, it may be that the transceiver 142 of the second node 112 is configured to continue to process signals from the first node 110 on all of the said plurality of frequency bands at least for the time being.

It may be that the same frequency bands are open for communication by way of the communication channel from the first node 110 to the second node 112 as those that are open for communication from the second node 112 to the first node 110. However, more typically, it may be that different frequency bands are open for communication from the first node 110 to the second node 112 from those that are open for communication from the second node 112 to the first node 110. Accordingly, it may be that the suitabilities of frequency bands for data communication by way of the communication channel from the second node 112 to the first node 110 are determined separately from the suitabilities of frequency bands for data communication by way of the communication channel from the first node 110 to the second node 112. Thus, it may be that the processing circuitry 140 of the second node 112 is configured to cause the transceiver 142 of the second node 112 to transmit to the first node 110, for each of a plurality of frequency bands, a dedicated calibration sequence comprising a calibration signal (corresponding to the first signal described above) and a predetermined reference data signal (corresponding to the second signal described above) each having frequencies in the said frequency band. As above, the calibration and predetermined reference data signals may be transmitted from the second node 112 to the first node 110, and received by the first node 110 from the second node 112, for example when the communication channel is in situ in the borehole 108, for example during operation of downhole equipment in the borehole 108, such as during drilling of the borehole 108, for example by the drill bit 101 of the drill string 100, logging, drill stem testing, fracturing, stimulation, completion, cementing or production.

The calibration and predetermined reference data signals may be suitable for the first node 110 to determine the suitability of the respective frequency bands for data communication by way of the communication channel from the second node 112 to the first node 110. It may be that the first node 110 is configured to determine the suitabilities of the frequency bands for communication of data relating to the downhole or in well environment by way of the communication channel from the second node 112 to the first node 110, for example for communication of monitoring data by way of the communication channel during operation of downhole equipment in the borehole 108, such as whilst drilling is being performed in the borehole 108, for example data from one or more downhole sensors communicatively coupled to the second node 112. The calibration signals may have any of the features of the first signals discussed above transmitted by the first node 110. The predetermined reference data signals may have any of the features of the second signals discussed above transmitted by the first node 110.

It may be that the processing circuitry 140 of the second node 112 is configured to cause the transceiver 142 thereof to transmit the calibration and predetermined reference data signals in dependence on the second node 112 having received first and second signals from the first node 110 or in dependence on having determined that at least one frequency band is suitable for data communication from the first node 110 to the second node 112. The calibration and predetermined reference data signals transmitted by the second node 112 to the first node 110 may have any of the features of the first and second signals transmitted from the first node 110 to the second node 112 as described above respectively. For example, it may be that the calibration signals transmitted by the second node 112 comprise chirp signals in the respective frequency bands. It may be that the chirp signals are known to the first node 110, for example by way of predetermined calibration data stored in memory 144 thereof. It may be that the predetermined reference data signals transmitted by the second node 112 to the first node 110 comprise predetermined reference data in the respective frequency bands, the predetermined reference data being known to the first node 110, for example by way of reference data stored in memory 144 thereof. As above, it may be that the predetermined reference data signals transmitted by the second node 112 comprise predetermined reference data encoded based on one or more codes, such as one or more chirp codes. It may be that the codes are known to the first node 110, for example by way of reference data stored in memory 144 thereof. It may be that the predetermined reference data signals transmitted by the second node 112 comprise the same or different predetermined reference data from the second signals transmitted by the first node 110. It may be that the same or different codes (e.g. chirps) are used to encode the calibration signals, predetermined reference data signals or both the calibration and predetermined reference data signals transmitted by the second node 112 compared to the corresponding first signals, second signals or first and second signals transmitted by the first node 110.

The same or different candidate frequency bands may be predetermined, for example empirically, for data communication from the second node 112 to the first node 110 as compared to from the first node 110 to the second node 112. For example, the same or different numbers of candidate frequency bands for data communication may be predetermined for communication from the second node 112 to the first node 110 than from the first node 110 to the second node 112. Additionally or alternatively frequency bands having the same or different frequency ranges may be predetermined for data communications from the second node 112 to the first node 110 than from the first node 110 to the second node 112. Accordingly, the frequency bands may be the same or different for the calibration and predetermined reference data signals transmitted by the second node 112 to the first node 110 from the first and second signals transmitted from the first node 110 to the second node 112.

The transceiver 142 of the first node 110 may be configured to receive the calibration and predetermined reference data signals from the second node 112 by way of the communication channel. The processing circuitry 140 of the first node 110, which is communicatively coupled to the transceiver 142 of the first node 110, may be configured to process the calibration and predetermined reference data signals to determine the suitabilities of the frequency bands for data communication from the second node 112 to the first node 110. The processing performed by the processing circuitry 140 of the first node 110 on the calibration and predetermined reference data signals to determine the suitabilities of the frequency bands for data communication from the second node 112 to the first node 110 may be the same or similar to the processing performed by the processing circuitry 140 of the second node 112 on the first and second signals transmitted by the first node 110 to determine the suitabilities of the frequency bands for data communication from the first node 110 to the second node 112. Accordingly, the processing will not be described again in detail here.

When the first node 110 has determined the suitabilities of the frequency bands for data communication from the second node 112 to the first node 110, the processing circuitry 140 of the first node 110 may be configured to output indications of those suitabilities, for example to memory 144 of the first node 110 where they may be stored and later retrieved by the processing circuitry 140 for transmission to the second node by the transceiver 142 of the first node 110, or directly to transceiver 142 of the first node 110 for transmission to the second node 112. Depending on the determination of suitabilities of the frequency bands, the processing circuitry 140 of the first node 110 may be configured to cause it to selectively process signals from the second node 112 in the frequency band(s) determined to be suitable for data communication by way of the communication channel from the second node 112 to the first node 110, for example by selectively setting the frequency bands determined to be suitable as expected receiver passbands of the transceiver. In this case, it may be that the processing circuitry 140 of the first node 110 may be configured to cause it to selectively process signals from the second node 112 in one or more or each of the bands determined to be suitable for data communication from the second node 112 to the first node 110 and to selectively discard signals from the second node 112 in frequency bands not determined to be suitable for data communication from the second node 112 to the first node 110.

The indications of the suitabilities of the frequency bands for data communication from the second node 112 to the first node 110 may be transmitted from the first node 110 to the second node 112, for example in a payload data signal comprising a bit sequence the meaning of which is known to the second node 112, for example by way of a look up table stored in the memory 144 of the second node 112. Different bit sequences may be defined, for example in such a look up table, for each possible combination of open frequency bands and stored in memory 144 of the first and second nodes 110, 112 such that each of the nodes 110, 112 associates the respective bit sequences with respective combinations of open frequency bands, closed frequency bands or open and closed frequency bands. In a similar way to the predetermined reference data discussed above, the bit sequence may be encoded by one or more codes, such as one or more (e.g. time variant) spread spectrum codes, such as one or more chirp codes which are capable of pulse compression (e.g. by on/off keying as described above). The codes may be known to the first and second nodes 110, 112.

At this stage, the first node 110 may not know which frequency bands are suitable for data communication from the first node 110 to the second node 112 as the second node 112 may not yet have communicated to the first node 110 the indications of the suitabilities of the frequency bands for data communication from the first node 110 to the second node 112 determined above. However, particularly if the transmission of the first and second signals by the second node 112 to the first node 110 was dependent on there being at least one frequency band open for communication from the first node 110 to the second node 112, it may be known to a high level of certainty that at least one of the plurality of frequency bands will be suitable for communication from the first node 110 to the second node 112. The indications may be transmitted from the first node 110 to the second node 112 in each of the plurality of frequency bands.

Figure 11A:
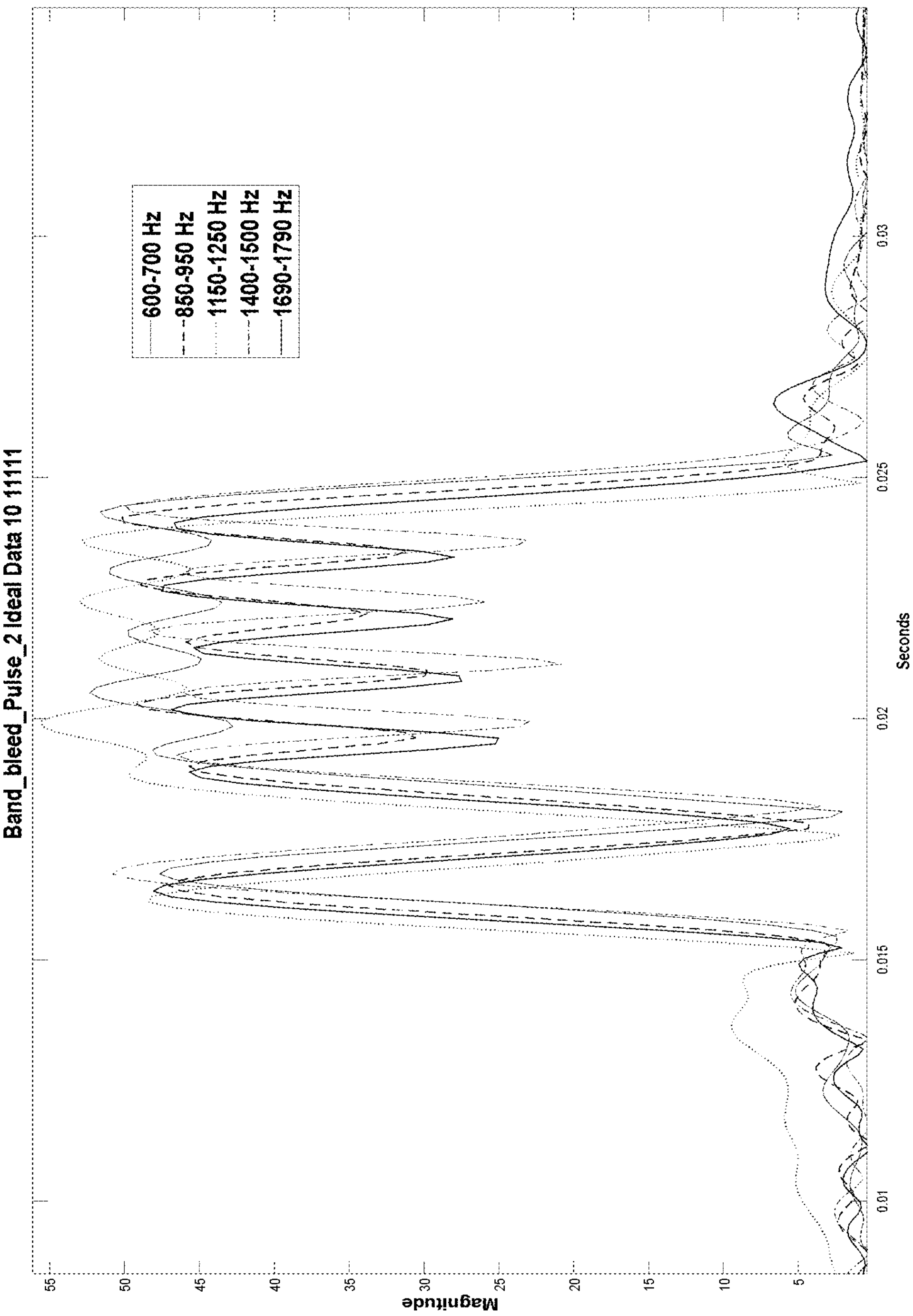
FIG. 11*a* is an idealised representation of signals for communicating indications of the suitabilities of a plurality of frequency bands for data communication from one node to another.

Idealised bit sequences communicating that all five candidate frequency bands are suitable for data communications from the second node 112 to the first node 110 by way of the communications channel are shown for each of the five frequency bands 600 Hz to 700 Hz, 850 Hz to 950 Hz, 1150 Hz to 1250 Hz, 1400 Hz to 1500 Hz and 1690 Hz to 1790 Hz in FIG. 11*a*. As discussed above, for each of the frequency bands, the bit sequences may be encoded by one or more codes such as one or more chirp codes. For example, the bit sequences may be represented by a plurality of chirp signals, the presence of a chirp signal being indicative of a binary '1' and the absence of a chirp signal being indicative of a binary '0' (e.g. the encoded bit sequences may be generated by on/off keying as described above), or the presence of a chirp signal of a first chirp function being indicative of a binary '1' and the presence of a chirp signal of a second chirp function different from the first being indicative of a binary '0'. The bit sequence shown in FIG. 11*a* for each frequency band comprises 1011111. Any suitable additional or alternative coding may be employed.

As with the processed second signals discussed above with reference to FIG. 8 and FIG. 9, different waveforms, rather than different bit sequences, may be defined for each possible combination of open frequency bands and stored in the memories 144 of the first and second nodes 110, 112 for the respective frequency bands. Any other suitable alternative signals for communicating the open and closed bands which can be understood by (e.g. stored in the memories 144 of) the first and second nodes 110, 112 may be used to communicate different groups of open and closed frequency bands to the second node 112.

The first node 110 may be configured to transmit to the second node 112 respective calibration signals in each of the frequency bands, the calibration signals having signal frequencies in the respective frequency band in each case. The calibration signals transmitted by the first node 110 may be known to the second node 112, such as by way of predetermined calibration data stored in memory 144 thereof. It may be that the second node 112 is to process the received calibration signals to determine calibration functions to account for the effect of the channel on the payload data signal comprising the indications of suitabilities of the frequency bands. For example, the calibration signals may be chirp signals which are the same or similar to the first signals 150-158 of FIG. 4*a*. The processing circuitry 142 of the first node 110 may be configured to cause its transceiver 142 to transmit the payload data signal comprising said indications of the suitabilities of the frequency bands after, before or simultaneously with the calibration signals. In this case, the processing circuitry of the second node 112 may be configured, for each of the frequency bands, to determine a calibration function depending on the calibration signal received from the first node 110 in that band, for example in the same way as that described above (e.g. to pulse compress the calibration signal, obtain the passband amplitude spectrum of the pulse compressed calibration signal and determine the reciprocal of the passband amplitude spectrum of the pulse compressed calibration signal to determine the calibration function), and to process the payload data signal in that band depending on the calibration function to take account of the effect of the channel on the payload data signal. When the bit sequence of the payload data signal is encoded, for example by chirp signals, the processing of the payload data signal may further comprise decoding, such as pulse compression, of the payload data signal, for example by correlation with one or more known codes, such as one or more chirp codes stored in memory 144. As before, the calibration functions may take into account the characteristics of the transfer function of the communication channel between the first and second nodes 110, 112 as experienced by the payload data signals.

Figure 11B:
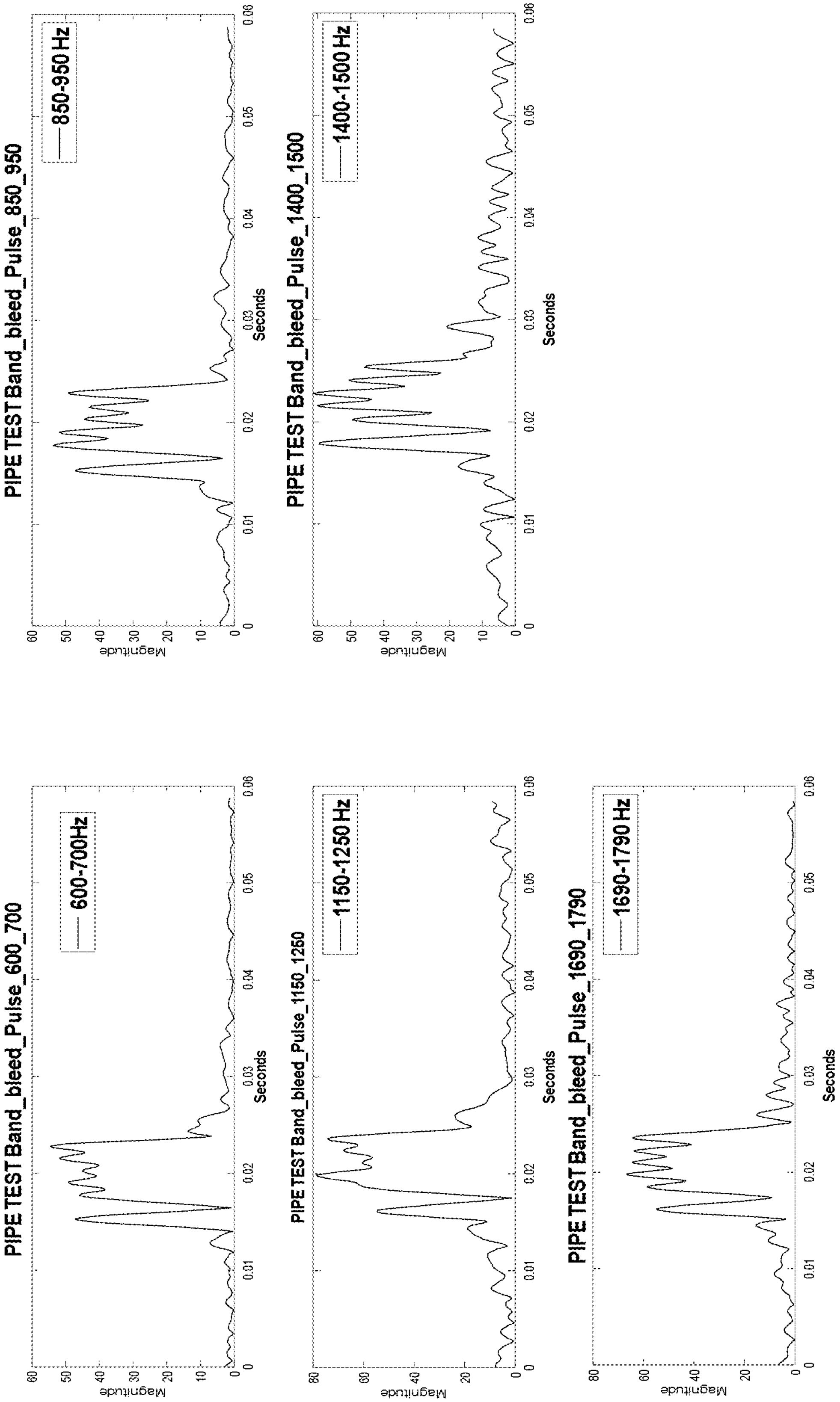
FIG. 11*b* shows recovered versions of signals based on those of FIG. 11*a* after they have passed through a communication channel and been processed.

Some example payload data signals communicating groups of open and closed frequency bands to the second node 112 are shown in FIG. 11*b*, the payload data signals having propagated from the first node 110 to the second node 112 by way of a 1 km drill string test pipe. In this case, the payload data signals have been received, decoded and processed depending on respective calibration functions determined depending on respective calibration signals by the second node 112. In this case, the bit sequence of the payload data signals, the meaning of which is known to the second node 112 for example by way of reference data such as a lookup table stored in memory 144 of the second node 112, indicates that four of the frequency bands of FIG. 11*a* (600-700 Hz, 850-950 Hz, 1150-1250 Hz and 1690-1790 Hz) are open from the second node 112 to the first node 110. The bit sequence cannot be derived from one of the processed payload data signals, the processed payload data signal in the 1400-1500 Hz frequency band, but it can be derived from the others. Accordingly, in this example, the four passbands other than 1400-1500 Hz are open from the first node 110 to the second node 112 by way of the communication channel. This is what is indicated by the bit sequence in this example.

As discussed above, the second node 112 may have already determined the frequency bands suitable for data communication by way of the communication channel from the first node 110 to the second node 112 and stored that information in its memory 144, albeit it may not have yet communicated that information to the first node 110. The second node 112 may therefore retrieve from memory 144 the indications of which frequency band(s) it has determined to be suitable for data communication by way of the communication channel from the first node 110 to the second node 112, or it may be that the second node 112 is already configured to selectively process signals in the frequency bands determined to be suitable for data communication from the first node 110 to the second node 112, and determine from processed payload data signal(s) communicated by the first node 110 in that/those frequency band(s) the indications of suitable frequency bands for communication by way of the communication channel from the second node 112 to the first node 110. The second node 112 may be configured to compare the indications in the said processed payload data signal(s) to the reference data to determine which frequency bands are suitable for communication by way of the communication channel from the second node 112 to the first node 110. In this way, it can be ensured with a high degree of certainty that the indications of suitable frequency bands for communication from the second node 112 to the first node 110 from the said processed payload data signal(s) are accurate.

It may be that the payload data signals transmitted from the first node 110 to the second node 112 to communicate the indications of the suitabilities of the frequency bands used for communication by way of the communication channel from the second node 112 to the first node 110 comprise predetermined reference data, such as encoded predetermined reference data, by which the suitabilities of the frequency bands for data communication from the first node 110 to the second node 112 may be determined by the second node 112. This determination can override the previous suitability determination based on the dedicated calibration sequence, or allow the second node 112 to determine whether a new calibration of the channel needs to be triggered. The payload data signals may comprise preamble data comprising such predetermined reference data. The preamble may precede the indications of the suitabilities of the frequency bands for communication by way of the communication channel from the second node 112 to the first node 110. The preamble data may comprise synchronisation data such as a "sync tuple" indicating to the second node 112 that the indications of the suitabilities of the frequency bands for communication by way of the communication channel from the second node 112 to the first node 110 are to follow, the synchronisation data comprising the predetermined reference data. The predetermined reference data may be based on a known bit sequence, such as "10". The position within the payload data signal and the content of the known bit sequence may be known to the second node 112, for example by way of reference data stored in memory 144 thereof. As before, the bit sequence of the predetermined reference data may be encoded by one or more codes, such as one or more chirp signals which can be pulse compressed. As before it may be that the one or more codes are known to the second node to thereby allow the second node to decode the bit sequence. The bit sequence of the predetermined reference data of the payload data signal may be shorter, and thus potentially a less accurate indicator of the quality of the communication channel, than the second signals of the dedicated calibration sequence. Nevertheless, the processing circuitry 140 of the second node 112 may be configured to determine, for each of the frequency bands used for data communications, a quality of the recovered predetermined reference data, for example the predetermined reference data as determined from the decoded payload data signals processed in accordance with the calibration functions determined from the calibration signals, for example by comparison with corresponding stored predetermined reference data, to determine the suitabilities of the respective frequency bands for data communication by way of the communication channel from the first node 110 to the second node 112.

The quality of the recovered predetermined reference data may be determined by the processing circuitry 140 of the second node 112 for example based on whether the bit sequence of the predetermined reference data can be accurately extracted from, for example, the decoded payload data signal processed in accordance with the calibration function and matched to the known predetermined reference bit sequence. Alternatively, as above, the quality of the recovered predetermined reference data may be determined by the processing circuitry of the second node 112 based on whether a waveform of the predetermined reference data recovered from, for example, the decoded payload data signal processed in accordance with the calibration function matches a reference waveform, which may be stored in the memory 144 of the second node 112. If the bit sequence of the recovered predetermined reference data can be extracted from the decoded payload data signal processed in accordance with the calibration function and matched to a predetermined bit sequence, or if a waveform recovered from the decoded payload data signal processed in accordance with the calibration function matches a stored reference waveform, it may be determined that the predetermined reference data recovered from the payload data signal is of sufficient quality to determine that the frequency band to which it relates is suitable for data communication from the first node 110 to the second node 112. Otherwise, it may be determined that the recovered predetermined reference data is not of sufficient quality and that, as such, the frequency band to which it relates is not suitable for data communication from the first node 110 to the second node 112.

Thus, it may be that the suitabilities of the frequency bands for data communication by way of the communication channel are determined based on predetermined reference data provided in a payload data signal, such as in preamble data thereof. The predetermined reference data by which the suitabilities of the frequency bands for data communication may be determined may additionally or alternatively be provided in payload data (e.g. payload data comprising the indications of the suitabilities of the frequency bands), a mid-amble of the payload data signal or a post-amble of the payload data signal.

If the determination of the suitabilities of the frequency bands from the first node 110 to the second node 112 based on predetermined reference data recovered from the payload data signal is performed, it may be that the determination of the suitabilities of the frequency bands for data communications from the first node 110 to the second node 112 based on the dedicated calibration sequence are replaced by the suitabilities determined based on the predetermined reference data of the payload data signal. Additionally or alternatively, the suitabilities determined from the predetermined reference data of the payload data signal may be compared to the suitabilities determined from the dedicated calibration sequence to determine whether the suitabilities determined from the dedicated calibration sequence are still accurate. It may be that, if the suitabilities are different, the processing circuitry 140 of the second node 112 may be configured to trigger updated determinations of the suitabilities of the frequency bands in one or both directions between the nodes 110, 112 by the nodes 110, 112, for example by causing the transceiver 142 thereof to transmit a dedicated calibration sequence, such as first and second signals of FIG. 4*a*, to the first node 110, or to stop transmitting signals to the first node 110. Alternatively, the determining of the suitabilities of the frequency bands from the first node 110 to the second node 112 based on predetermined reference data of the payload data signal may be omitted and the suitabilities determined from the dedicated calibration sequence are retained. In this case, predetermined reference data may be omitted from the payload data signal.

As an alternative to retrieving from memory 144 the indications of which frequency band(s) it has determined to be suitable for data communication by way of the communication channel from the first node 110 to the second node 112, or preconfiguring the second node 112 to selectively process signals from the first node 110 in one or more frequency bands determined to be suitable, and determining from the processed data signal(s) in that/those frequency band(s) the indications of suitable frequency bands for communication by way of the communication channel from the second node 112 to the first node 110, it may be that the processing circuitry 140 of the second node 112 is configured to determine the indications of suitable frequency bands for data communications from the second node 112 to the first node 110 selectively based on processed payload data signal(s) in that/those frequency band(s) determined based on the predetermined reference data recovered from the processed payload data signal(s) to be suitable for communication by way of the communication channel from the first node 110 to the second node 112.

If it has not done so already, or if the determination based on the predetermined reference data of the payload data signal overrides the determination from the dedicated calibration sequence of which frequency bands are suitable for data communication from the first node 110 to the second node 112, the second node 112 may then be configured to selectively process signals from the first node 110 on one or more frequency bands determined to be suitable for data communication (from the dedicated calibration sequence or from the predetermined reference data of the payload data signal as the case may be) by way of the communication channel from the first node 110 to the second node 112. As before, it may be that the processing circuitry 140 of the second node 112 may be configured to selectively process signals from the first node 110 in one or more or each of the bands determined to be suitable for data communication from the first node 110 to the second node 112 and to selectively discard signals from the first node 110 in frequency bands not determined to be suitable for data communication from the first node 110 to the second node 112.

The processing circuitry 140 of the second node 112 may be configured to output indications of the suitabilities of the frequency bands for data communication by way of the communication channel from the first node 110 to the second node 112 based on the predetermined reference data of the payload data signal, for example to memory 144 of the second node 110 where they may be stored and later retrieved by the processing circuitry 140 for transmission to the first node 110 by the transceiver 142 of the second node 112, or directly to transceiver 142 of the second node 112, for transmission to the first node 110. Alternatively, the processing circuitry 140 of the second node 112 may be configured to output indications of the suitabilities of the frequency bands for data communication by way of the communication channel from the first node 110 to the second node 112 determined based on the dedicated calibration sequence received from the first node 110. As above, the indications of the suitabilities of the frequency bands for data communication from the first node 110 to the second node 112 may be transmitted from the second node 112 to the first node 110, for example based on of a bit sequence or waveform the meaning of which is known to the first node 110 (e.g. by a look up table stored in the memory 144 of the first node 110). As before, different bit sequences may be defined for each possible combination of open frequency bands and stored in memories 144 of the first and second nodes 110, 112 such that each of the nodes 110, 112 associate the respective bit sequences with the respective combinations of open frequency bands. The bit sequences may as above be encoded, for example, by one or more chirp signals which can be pulse compressed.

Although the second node 112 may have determined the frequency bands which are suitable for data communication by way of the communication channel from the second node 112 to the first node 110 based on the bit sequence transmitted by the first node 110, the indications of the suitabilities of the frequency bands from the first node 110 to the second node 112 may be transmitted from the second node 112 to the first node 110 in each of the plurality of frequency bands in case the open frequency bands from the second node 112 to the first node 110 have changed since they were last determined. Alternatively, the indications of the suitabilities of the frequency bands from the first node 110 to the second node 112 may be transmitted from the second node 112 to the first node 110 selectively in one or more frequency bands determined to be suitable for communication in that direction. Thus, the second node 112 may be configured to transmit data signals to the first node 110 selectively in one or more frequency bands indicated to be suitable for data communications from the second node 112 to the first node 110. In either case the indications may be sent to the first node 110 in one or more bands previously determined to be suitable for data communications from the second node 112 to the first node 110.

As described above in respect of the first node 110, the second node 112 may be configured to transmit to the first node 110 calibration signals in each of the frequency bands used to transmit data signals, the calibration signals of the frequency bands having signal frequencies in the respective frequency band in each case. The calibration signals may be known to the first node 110, such as by way of predetermined calibration data stored in memory 144 thereof. The calibration signals may be suitable for the first node 110 to determine a calibration function for the channel depending on the received first signals. For example, the calibration signals may be chirp signals which are the same or similar to the first signals 150-158 of FIG. 4*a*. The second node 112 may be configured to transmit a payload data signal comprising the said indications of the suitabilities of the frequency bands for data communication by way of the communication channel from the first node 110 to the second node 112 after, before or simultaneously with the calibration signals. In this case, the first node 110 may be configured, for each of the frequency bands, to determine a calibration function depending on the calibration signal received from the second node 112 in that band, for example in the same way as that described above (e.g. to pulse compress the calibration signal, obtain its passband amplitude spectrum and determine the reciprocal of the passband amplitude spectrum of the pulse compressed calibration signal to determine the calibration function), and to process the payload data signal in that band depending on the calibration function to take account of the effects of the channel on the data signal such that the data can be recovered more accurately. If the payload data signals are encoded, e.g. based on one or more chirps, it may be that processing of the payload data signals further comprises decoding, e.g. pulse compression, thereof.

As above, the first node 110 may have already determined the frequency bands suitable for data communication by way of the communication channel from the second node 112 to the first node 110. That information may have been stored in its memory 144. The first node 110 may therefore retrieve from memory 144 the indications of which frequency band(s) it has determined to be suitable for data communication by way of the communication channel from the second node 112 to the first node 110, or the first node 110 may already be configured to process signals from the second node 112 selectively in one or more frequency bands determined to be suitable, and determine from the processed payload data signal(s) in that/those frequency band(s) the indications of suitable frequency bands for communication by way of the communication channel from the first node 110 to the second node 112. The first node 110 may be configured to compare the indications in the said processed payload data signal(s) to reference data (e.g. a lookup table) to determine which frequency bands are indicated to be suitable for communication by way of the communication channel from the first node 110 to the second node 112. In this way, it can be ensured with a high degree of certainty that the indications of suitable frequency bands for communication from the first node 110 to the second node 112 from the said processed second signal(s) are accurate.

As above, it may be that the payload data signals transmitted from the second node 112 to the first node 110 to communicate the indications of the suitabilities of the frequency bands for communication by way of the communication channel from the first node 110 to the second node 112 comprise (e.g. encoded) predetermined reference data by which the suitabilities of the frequency bands for communication by way of the communication channel from the second node 112 to the first node 110 may be determined by the first node 110. For example, the payload data signals may comprise preamble data comprising such predetermined reference data. The preamble may comprise a "sync tuple" indicating to the first node 110 that the indications of the suitabilities of the frequency bands for communication by way of the communication channel from the first node 110 to the second node 112 are to follow, the synchronisation data comprising the predetermined reference data. The predetermined reference data may comprise a bit sequence or waveform, the position within the payload data signal and content of which known to the first node 110. As above, the predetermined reference data may be encoded. As above, the processing circuitry 140 of the first node 110 may be configured to determine, for each of the frequency bands, a quality of the predetermined reference data recovered from the payload data signals, for example as determined by comparison of the predetermined reference data recovered from the decoded payload data signals processed in accordance with calibration functions determined based on calibration signals to stored predetermined reference data, to determine the suitabilities of the respective frequency bands for data communication by way of the communication channel from the second node 112 to the first node 110. As above, the predetermined reference data may additionally or alternatively be embedded in payload data, mid-amble data or in post-amble data.

As an alternative to retrieving from memory 144 the indications of which frequency band(s) it has determined to be suitable for data communication by way of the communication channel from the second node 112 to the first node 110 or preconfiguring the first node 110 to selectively process signals from the second node 112 in one or more frequency bands determined to be suitable therefor, and determining from the processed data signal(s) in that/those frequency band(s) the indications of suitable frequency bands for communication by way of the communication channel from the first node 110 to the second node 112, it may be that the processing circuitry 140 of the first node 110 is configured to determine the indications of suitable frequency band(s) for communication by way of the communication channel from the first node 110 to the second node 112 selectively based on the processed payload data signal(s) in that/those frequency band(s) determined based on the predetermined reference data of the payload data signals to be suitable for communication from the second node 112 to the first node 110. As before, it may be that the processing circuitry 140 of the first node 110 may be configured to selectively process signals from the second node 112 in one or more or each of the bands determined to be suitable for data communication from the second node 112 to the first node 110 and to selectively discard signals from the second node 112 in frequency bands not determined to be suitable for data communication from the second node 112 to the first node 110.

The processing circuitry 140 of the first node 110 may be configured to compare the suitabilities of the respective frequency bands for data communication by way of the communication channel from the second node 112 to the first node 110 determined from the predetermined reference data of the payload data signal to the corresponding suitabilities determined by the first node 110 from the dedicated calibration sequence transmitted to the first node 110 by the second node 112 to determine whether they are still accurate. It may be that, if the suitabilities are different, the processing circuitry 140 of the first node 110 is configured to trigger decoded determinations of the suitabilities of the frequency bands for data communication by way of the communication channel in one or both directions between the nodes 110, 112 (i.e. from the first node 110 to the second node 112 and from the second node 112 to the first node 110), for example by causing the transceiver 142 thereof to transmit a dedicated calibration sequence, such as first and second signals of FIG. 4*a*, to the second node 112, or to stop transmitting signals to the second node 112. Alternatively, the determining of the suitabilities of the frequency bands from the second node 112 to the first node 110 based on predetermined reference data of the payload data signal may be omitted. In this case, predetermined reference data may be omitted from the payload data signal.

It may be that, regardless of whether different frequency bands are determined to be open from the second node 112 to the first node 110 based on the predetermined reference data of the payload data signals as compared to the frequency bands determined to be open based on the dedicated calibration sequence, the processing circuitry 140 of the first node 110 may be configured to process signals from the second node 112, for example selectively, on the frequency bands which were indicated to the second node 112 as being suitable for data communication by way of the communication channel from the second node 112 to the first node 110. This is so that the first node 110 can process signals which will be communicated from the second node 112 to the first node 110 in those bands. However, the determination based on the predetermined reference data in the payload data signal may inform the first node 110 whether the open frequency bands have changed to a sufficient extent to trigger re-calibration; if so, re-calibration may be triggered as discussed above.

Assuming that an updated determination of the suitabilities of the frequency bands for data communication between the first and second nodes 110, 112 is not triggered, the processing circuitry 140 of the first node 110 may be configured to cause the transceiver 142 thereof to transmit payload data signals comprising payload data, such as command payload data, for example to control or modify the operation of downhole equipment (e.g. a test valve) or request sensor data from downhole monitoring equipment, to the second node 112 selectively in one or more frequency bands indicated to be suitable for data communication from the first node 110 to the second node 112. Different payload data may be provided in different bands. As indicated above, the second node 112 may already be configured to selectively process signals received in those frequency band(s). It may be that the first node 110 is further configured to transmit calibration signals, such as the first signals described above, selectively in the respective one or more frequency bands determined to be suitable for data communication from the first node 110 to the second node 112. This allows the second node 112 to determine, for each of the one or more frequency bands, calibration functions depending on the calibration signals as described above, thereby allowing the data signals to be processed to take account of the effects of the communication channel on the data signals, thereby allowing the data signals to be recovered more accurately. Indeed, the processing circuitry 140 of the second node 112 may be configured to determine, for each of the one or more frequency bands, calibration functions depending on the respective calibration signals and to process the received payload data signals depending on the corresponding calibration functions to thereby take account of the effects of the channel on the payload data signals. As above, the payload data signals may comprise bit sequences, which may for example be encoded based on one or more codes such as one or more chirp signals (e.g. using on/off keying as described above). In this case, processing of the payload data signals by the second node 112 may comprise decoding the payload data signals, such as by pulse compression thereof, for example by correlation with known codes on which they are based which may be stored in memory 144 of the second node 112, such as one or more chirp codes.

Similarly, the processing circuitry 140 of the second node 112 may be configured to cause the transceiver 142 thereof to transmit payload data signals comprising payload data, such as monitoring data received from one or more downhole sensors, to the first node 112 selectively on one or more frequency bands indicated to be suitable for data communication from the second node 112 to the first node 110. Different payload data may be provided in different bands. As indicated above, the first node 110 may already be configured to selectively process signals from the second node 112 on those frequency band(s). It may be that the second node 112 is further configured to transmit calibration signals, such as the first signals described above, in the frequency bands determined to be suitable for data communication from the second node 112 to the first node 110. This allows the first node 110 to determine, for each of the one or more frequency bands, calibration functions depending on the respective calibration signals, thereby allowing the payload data signals to be calibrated to take account of the effects of the communication channel on the payload data signals. Indeed, the processing circuitry 140 of the first node 110 may be configured to determine, for each of the one or more frequency bands, calibration functions depending on the respective calibration signals and to process the received payload data signals depending on the corresponding calibration functions to thereby take account of the effects of the channel. As above, the payload data signals may comprise bit sequences, which may for example be encoded based on one or more codes such as one or more chirp signals. In this case, processing of the payload data signals by the second node 112 may comprise decoding the payload data signals, such as by pulse compression thereof, for example by correlation with known codes on which they are based, such as one or more chirp codes, which may be stored in memory 144 of the second node 112.

Thus, it may be that the first node 110 is configured to receive from the second node 112 indications of suitabilities of frequency bands for data communication to the second node 112. It may be that the first node 110 is configured, in dependence on the received indications, to transmit data to the second node 112 selectively on one or more frequency bands indicated to be suitable therefor. Similarly, it may be that the second node 112 is configured to receive from the first node 110 indications of suitabilities of frequency bands for data communication to the first node 110. It may be that the second node 112 is configured, in dependence on the received indications, to transmit data to the first node 110 selectively on one or more frequency bands indicated to be suitable therefor.

It may be that the first node 110 is configured to determine (e.g. based on a dedicated calibration sequence received from the second node 112 as described above) suitabilities of frequency bands for data communication from the second node 112 to the first node 110. It may be that the first node 110 is configured to transmit to the second node 112 indications of the determined suitabilities of frequency bands for data communications from the second node 112 to the first node 110. It may be that the first node 110 is configured, in dependence on the determined suitabilities, to selectively process data from the second node 112 on one or more frequency bands determined to be suitable therefor. It may be that the second node 112 is configured to determine suitabilities of frequency bands for data communication from the first node 110 to the second node 112 based on calibration and predetermined reference data signals from the first node 110 in one or more of the suitable frequency bands as described above. It may be that the second node 112 is configured to transmit to the first node 110 indications of the determined suitabilities of frequency bands for data communications from the first node 110 to the second node 112. It may be that the second node 112 is configured to, in dependence on the determined suitabilities, selectively process data from the first node 110 on one or more frequency bands determined to be suitable therefor.

By determining, for each of the frequency bands, the suitability of the frequency band for data communication from the first node 110 to the second node 112 depending on a respective second signal, such as a predetermined reference data signal, processed depending on a calibration function which itself depends on the received corresponding first signal, such as a corresponding calibration signal, an accurate determination of the suitability of the frequency band for data communication from the first node 110 to the second node 112 can be determined, particularly when the data signals themselves are to be processed depending on respective calibration functions, such as calibration functions derived from received calibration signals as described herein, to thereby equalise or whiten the effects of the communication channel on the data signals. This is because one or more additional noise factors become apparent when data signals received by way of the communication channel, and which may be mixed with noise after having propagated by way of the communication channel, are processed in accordance with calibration functions to account for the effect of the communication channel. The quality of the processed second signal provides a reliable indication of the quality of the communications channel for data communication in the frequency band. This allows more reliable communications and greater data communication rates to be achieved.

The first node 110, second node 112, or each of the first and second nodes 110, 112 may be configured to cause an updated determination of the suitabilities of the plurality of frequency bands, for example periodically or depending on a determination that one or more frequency bands are no longer suitable for data communication by way of the communication channel from the other node. In the latter case for example, as explained above, payload data signals, such as payload data signals comprising command data, control data, acknowledgement data, monitoring data or data indicating suitabilities of frequency bands for data communication, received from the other node by way of the communication channel, for example on the frequency bands determined to be suitable for such communications, may comprise predetermined reference data, such as encoded predetermined reference data, for example in preamble data, mid-amble data, post-amble data or in payload data thereof as described above. The node may be configured to determine the suitabilities of the frequency bands in use by determining a quality of the recovered predetermined reference data from the payload data signals as described above to determine whether those frequency bands remain suitable for data communications for example by comparing recovered predetermined reference data from the received payload data signals to stored predetermined reference data. It may be that the node is configured to trigger an updated determination of the suitabilities, and updated selection, of frequency bands for data communication by way of the communication channel, for example from the other node or in both directions between the nodes, depending on the quality of the recovered predetermined reference data failing to meet one or more quality criteria (e.g. if a predetermined bit sequence or waveform cannot be accurately extracted therefrom and matched to stored predetermined reference data). It may be that the node is configured, in dependence on the updated determination, to transmit data signals to or process data signals from the other node 110, 112 selectively on one or more updated frequency bands indicated or determined to be suitable therefor.

The first node 110, second node 112 or each of the first and second nodes 110, 112 may be configured to update the determination of the suitabilities of the plurality of frequency bands by transmitting to the other node, in each of the frequency bands, calibration and predetermined reference data signals each comprising frequencies in the said frequency band, and receiving from the other node, by way of the communication channel, updated indications of the suitabilities of the respective frequency bands for data communication to the other node. In this case, in dependence on the updated indications, the node 110, 112 may be configured to transmit data signals selectively on one or more frequency bands indicated in the updated indications to be suitable for data communications to the other node. The first node 110, second node 112 or each of the first and second nodes 110, 112 may be configured to update the determination of the suitabilities of the plurality of frequency bands by receiving from the other node, in each of the frequency bands, calibration and predetermined reference data signals each comprising frequencies in the said frequency band, determining respective calibration functions depending on the calibration signals, processing the predetermined reference data signals depending on the respective calibration functions, determining updated suitabilities of the respective frequency bands for data communication with the node depending on the processed predetermined reference data signals, and outputting updated indications of the said suitabilities. The node may be configured to transmit the updated indications of the said suitabilities to the other node. In dependence on the updated suitabilities, the node may be configured to process data signals from the other node selectively in one or more frequency bands indicated in the updated indications to be suitable for data communication from the other node. The other node may be configured to transmit payload data signals selectively on one or more frequency bands indicated to be suitable therefor in the updated indications.

Thus, the frequency bands selected for data communication between the nodes 110, 112 may be updated or changed over time to take account of the fact that the communication channel may be dynamically changing. It will be understood that signals in the frequency bands selected for data communication between the nodes 110, 112 may experience noise, attenuation or a combination of noise and attenuation to a lesser extent in the communication channel than one or more other frequency bands not selected for data communication between the nodes 110, 112.

By updating determination and selection of suitable frequency bands in this way, more reliable communication between the nodes 110, 112 can be achieved, particularly when the communication channel has one or more dynamically changing characteristics. In addition, increased data communication rates can be achieved between the first and second nodes 110, 112 at least because a plurality of suitable frequency bands can generally be used in combination to communicate date between them. In addition, a larger portion of each suitable band can be used to communicate data between the first and second nodes 110, 112 as it can be determined with greater confidence that selected bands are suitable for data communications by way of the communication channel between the nodes 110, 112.

As indicated above, although the first (or calibration) signals 150-158 are shown in FIG. 4*a* as being transmitted in series (with a time delay between successive first signals of different frequency bands), the first (or calibration) signals may alternatively be transmitted simultaneously or at least partially overlap each other in the time domain. It has been surprisingly discovered that when the respective first signals overlap each other in the time domain, the respective first signals are separable from each other such that the qualities of second signals processed depending on calibration functions determined therefrom are comparable to the qualities of second signals processed depending on calibration functions determined from corresponding respective first signals which are separated in time from each other. When the first signals in the different frequency bands are transmitted simultaneously, they may be distinguished from each other by the processing circuitry 140 of the receiving node for example by correlating the received signals with the respective predetermined calibration reference signals in the respective frequency bands.

By the respective first signals at least partially or fully overlapping each other in the time domain, the suitabilities of the corresponding plurality of frequency bands for data communication by way of the communication channel can be determined more quickly than if they were separated in time from each other. In addition, a more accurate determination of the suitabilities of the corresponding frequency bands for data communication by way of the communication channel can be made as less time will have elapsed between receipt of the first and second signals. This means that there is less chance of the transfer function of the communication channel having changed between receipt of the first and second signals by the receiving node.

Figure 12:
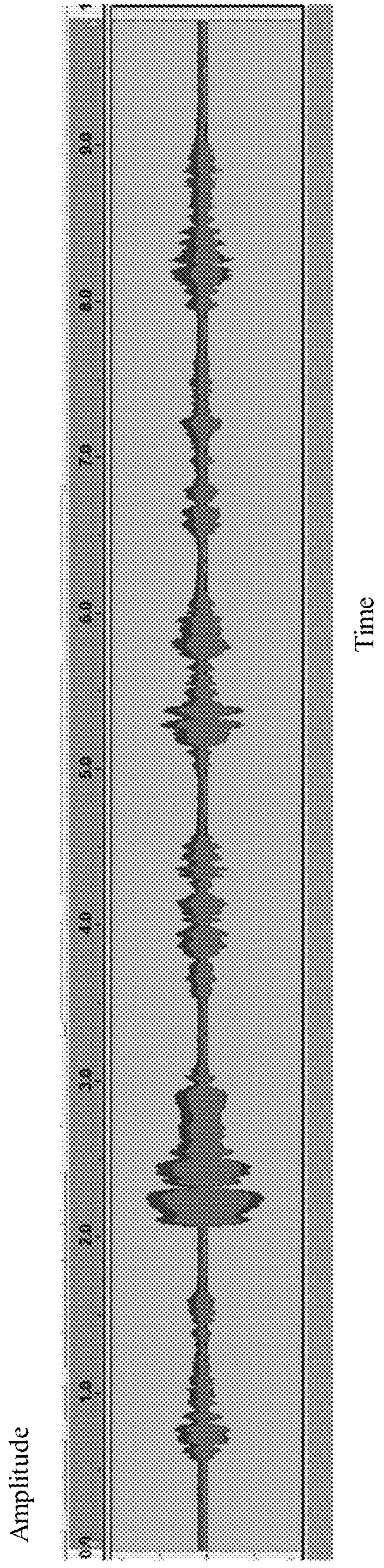
FIG. 12 shows the signals of FIG. 4*a* after they have propagated by way of a communication channel which has different effects on the signal of FIG. 4*a* from the channel to which FIG. 4*b* relates.
Figure 13A:
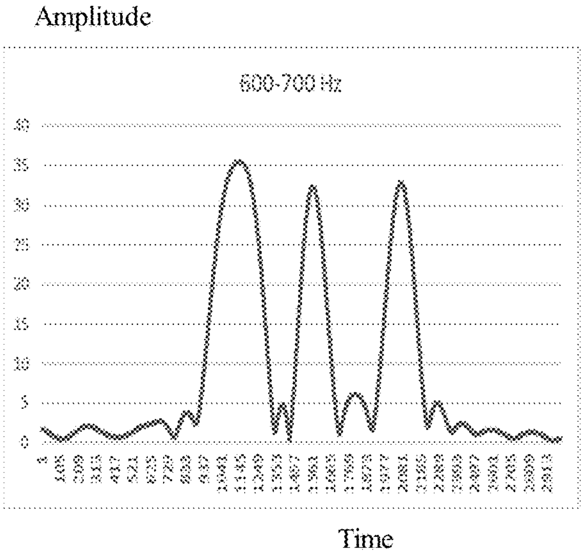
FIGS. 13*a* to 13*d* show pulse compressed versions of four of the five received predetermined reference data signals of FIG. 12 processed in accordance with the reciprocal spectrum derived from four of the five calibration signals of FIG. 12.
Figure 13B:
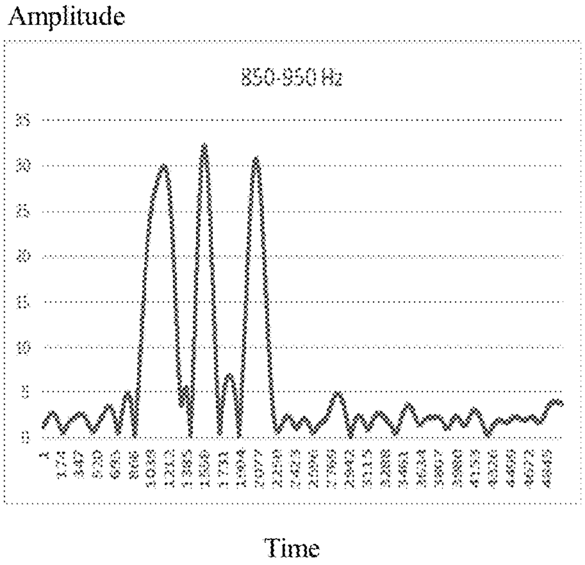
Figure 13C:
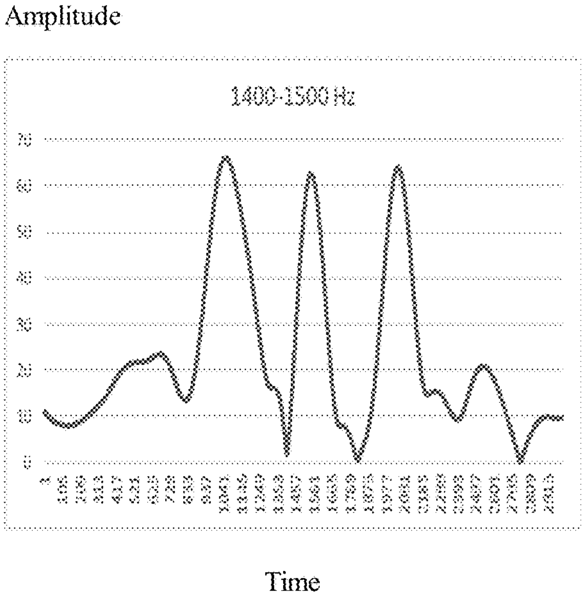
Figure 13D:
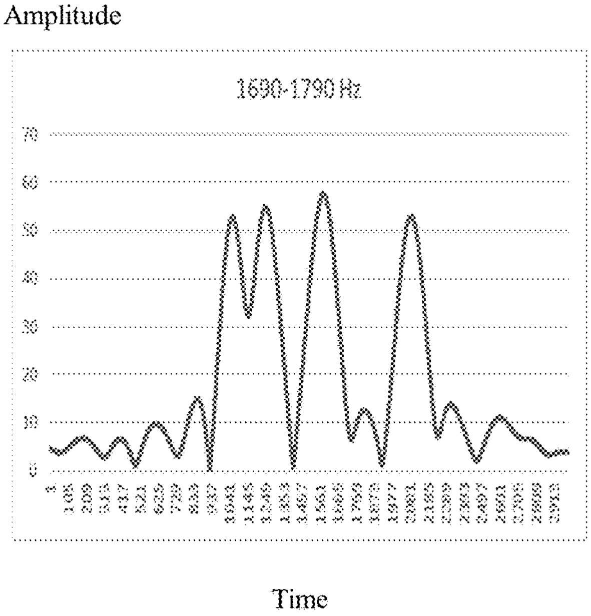

FIG. 12 shows five first (or calibration) chirp signals, each sweeping a different frequency band of a plurality of frequency bands, received by the second node 112 from the first node 110 by way of the communication channel, the chirp signals being separated from each other in time and having been adapted by the communication channel. The chirp signals are followed by corresponding second (or predetermined reference data) signals, each sweeping a respective said frequency band of the plurality of frequency bands, received by the second node 112 from the first node 110 by way of the communication channel, the second signals being transmitted simultaneously. The frequency bands swept by the respective first and second signals are: 600 Hz to 700 Hz, 850 Hz to 950 Hz, 1150 Hz to 1250 Hz, 1400 Hz to 1500 Hz and 1690 Hz to 1790 Hz. FIGS. 13*a* to 13*d* show the pulse compressed second signals processed in accordance with calibration functions derived from the respective pulse compressed first signals as described above for the frequency bands 600 Hz to 700 Hz (FIG. 13*a*), 850 Hz to 950 Hz (FIG. 13*b*), 1400 Hz to 1500 Hz (FIG. 13*c*) and 1690 Hz to 1790 Hz (FIG. 13*d*).

Figure 14:
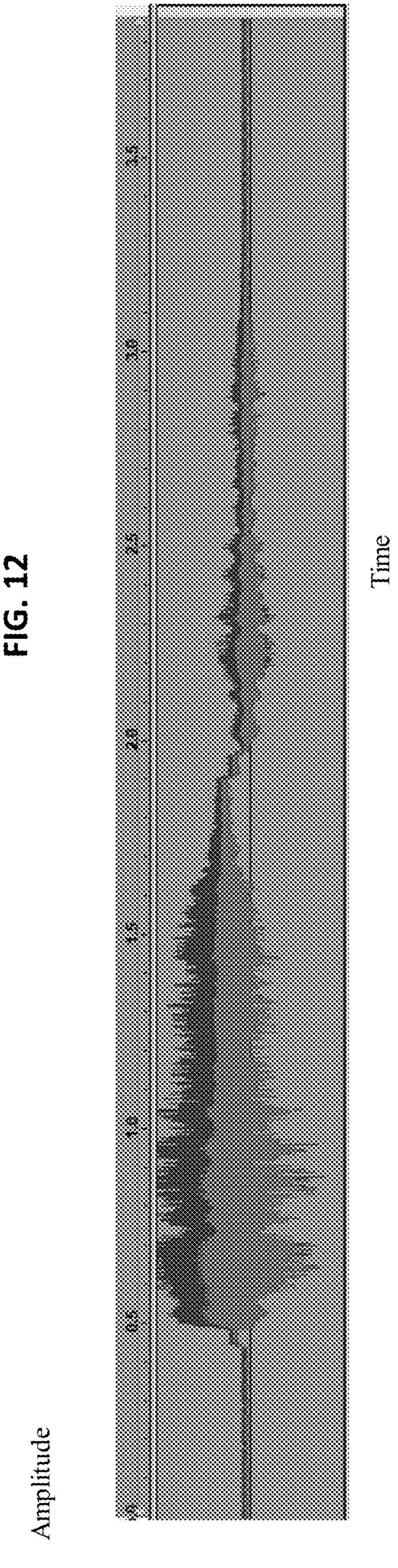
FIG. 14 shows the signals of FIG. 4*a* having passed through the same channel as the signals of FIG. 12 but wherein the calibration signals overlap each other in the time domain.
Figure 15A:
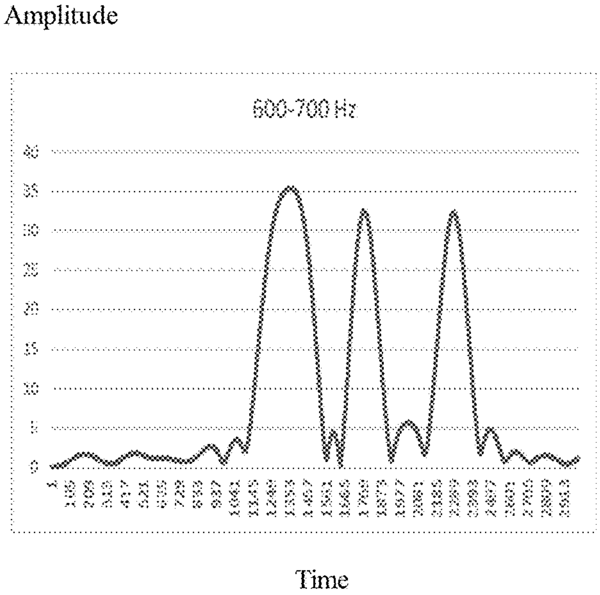
FIGS. 15*a* to 15*d* show pulse compressed versions of four of the five received predetermined reference data signals of FIG. 14 processed in accordance with the reciprocal spectrum derived from the corresponding calibration signals of FIG. 14.
Figure 15B:
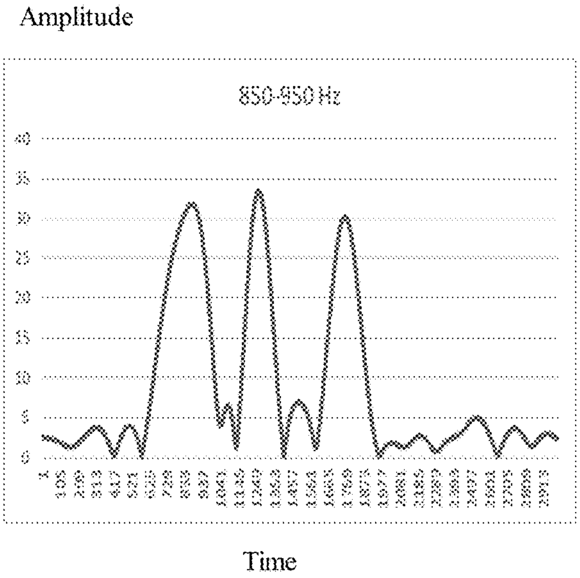
Figure 15C:
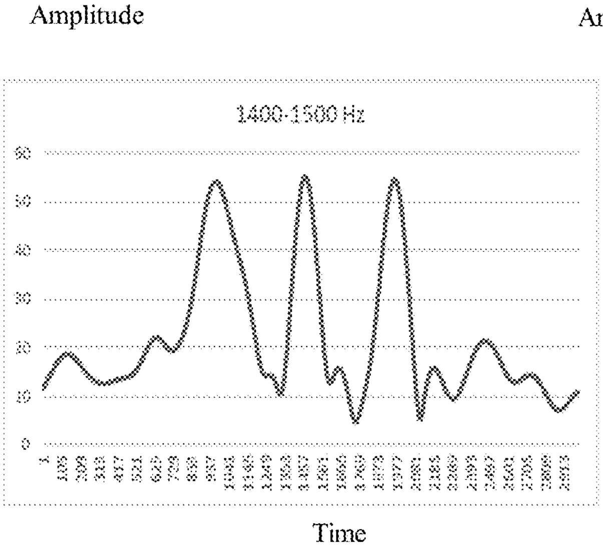
Figure 15D:
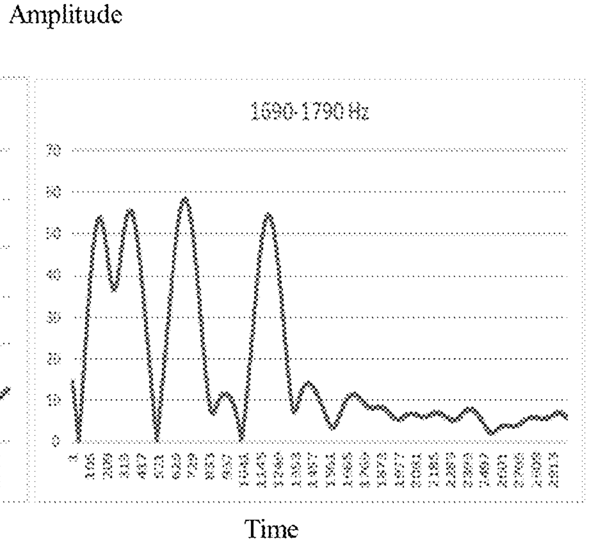

By way of comparison, FIG. 14 shows the five first (or calibration) chirp signals of FIG. 12 followed by the corresponding second (or predetermined reference data) signals of FIG. 12, the first signals being transmitted simultaneously with each other and the second signals being transmitted simultaneously with each other but after the first signals, by way of the communication channel. FIGS. 15*a* to 15*d* show the pulse compressed second signals processed in accordance with calibration functions derived from the respective pulse compressed first signals as described above for the frequency bands 600 Hz to 700 Hz (FIG. 15*a*), 850 Hz to 950 Hz (FIG. 15*b*), 1400 Hz to 1500 Hz (FIG. 15*c*) and 1690 Hz to 1790 Hz (FIG. 15*d*). The signals of FIGS. 15*a* to 15*d* compare favourably to the signals of FIGS. 13*a* to 13*d*, illustrating that similar quality results can be achieved whether the first signals are transmitted between the nodes separated in time from each other, for example to allow the communication channel to ring-down between transmissions, or transmitted simultaneously between the nodes.

Although the above discussion refers to determining the suitabilities of a plurality of frequency bands for data communication between nodes by way of the communication channel, it will be understood that similar methods could be performed for determining the suitability of an individual or single frequency band for data communication between nodes by way of the communication channel.

Although in the examples discussed above, the first and second signals, the calibration and predetermined reference data signals and the calibration and payload data signals, are discrete from each other in time, the first and second signals, calibration and predetermined reference data signals or the calibration and payload data signals, may alternatively be transmitted or received simultaneously with each other, or at least partially overlap each other in the time domain. It will be assumed in the discussion below that the first node 110 is transmitting to the second node 112 and that the second node 112 is receiving from the first node 110. However, it will be understood that the roles of the first and second nodes 110, 112 may be reversed. Corresponding first and second signals, or calibration and data signals, may be transmitted by the transmitting node and received by the receiving node in each of one or more frequency bands of the communication channel. Different data may be communicated in different bands. The second signals or data signals may each comprise a bit sequence, which may be encoded by a code for transmission by the transmitting node to the receiving node. The following discussion refers to the first and second signals for brevity, but it will be understood that it is equally applicable to calibration and predetermined reference data signals and calibration and payload data signals. In the case of payload data signals, reference to predetermined reference data in the following discussion may be read as data or payload data.

Figure 33:
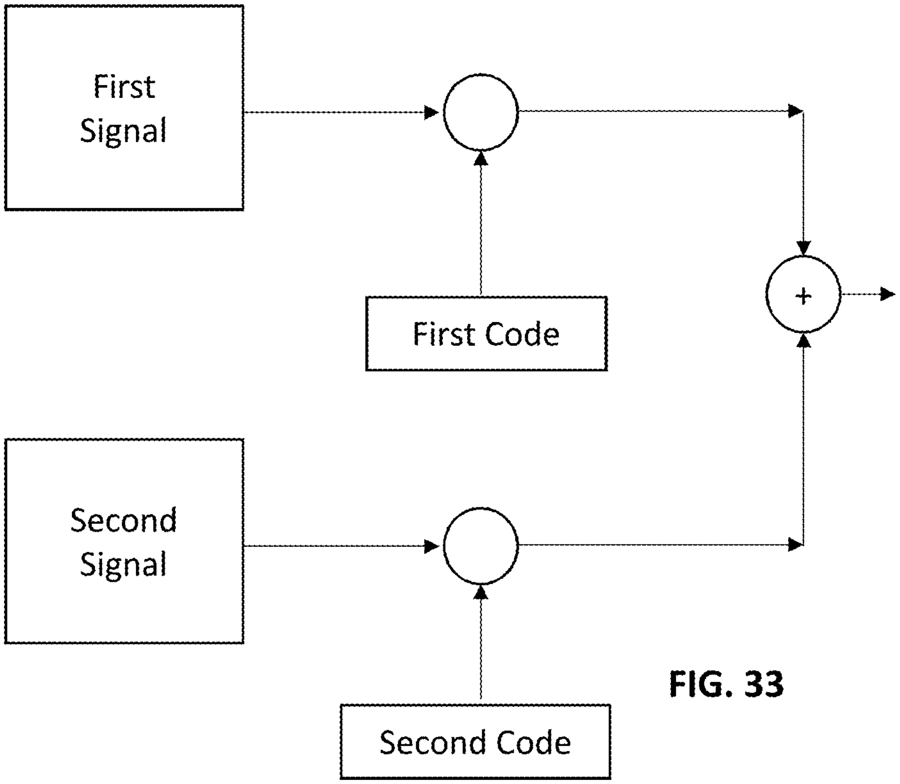
FIG. 33 is a flow diagram illustrating encoding of first and second signals depending on first and second codes.

In order to transmit the first and second signals at least partially overlapping each other in the time domain, for each of one or more frequency bands of the communication channel, the processing circuitry 140 of the transmitting node, such as first node 110, may cause generation of a communication signal, the communication signal comprising a first signal comprising calibration data encoded based on a first code and a second signal comprising predetermined reference data encoded based on a second code, the first code being different from the second code such that the transmitted first and second signals can be discriminated from each other at the receiving node, such as the second node 112. This is illustrated in FIG. 33. The first and second codes may be known to the second node 112 (e.g. the first and second codes may be stored at the memory 144 of the second node 112). The calibration data encoded by the first code may be of constant amplitude or of time varying amplitude, which may be known to the second node 112, for example by being stored in memory 144 thereof. The first signal may be for a receiving node to determine a calibration function which depends on the transfer function of the communication channel between the nodes 110, 112, the calibration function being for equalising or whitening effects of the communication channel on the second signal.

As discussed above, it may be that the first and second signals at least partially overlap with each other in the time domain. It may be that the entire encoded first signal overlaps the encoded second signal in the time domain; it may be that the entire encoded second signal overlaps the encoded first signal in the time domain; it may be that part of the encoded first signal overlaps part of the encoded second signal in the time domain. It may be that the first code has a first length in time and the second code has a second length in time, the first and second lengths being equal or substantially equal to each other.

As discussed above, it may be that the first and second signals at least partially overlap with each other in the frequency domain. It may be that the entire first signal overlaps the second signal in the frequency domain; it may be that the entire second signal overlaps the first signal in the frequency domain; it may be that part of the first signal overlaps part of the second signal in the frequency domain. It may be that encoded second signal frequencies overlap at least 50%, at least 70%, at least 80%, at least 90%, at least 95% or 100% of the frequencies of the corresponding encoded first signal.

The first code may be orthogonal to the second code. For example, it may be that the first and second codes are strictly orthogonal to each other, pseudo-orthogonal to each other or periodic orthogonal to each other. It may be that the first and second codes are selected such that the cross correlation between the first signal and the second code is substantially zero or zero and the cross correlation between the second signal and the first code is substantially zero or zero. It may be that (e.g. the frequency of) the first code varies as a function of time differently from (e.g. the frequency of) the second code. It may be that the first code is orthogonal to the second code by way of the time variance of the first and second codes. By the first and second codes being orthogonal to each other, the first and second signals can readily be discriminated from each other at the receiving node.

The processing circuitry 140 of the transmitting node may cause transmission of the communication signal, for example by way of its transceiver 142, by way of the communication channel, such that they at least partially overlap with each other in the time domain. For example, the processing circuitry 140 of the first node 110 may be configured to combine the encoded calibration and data signals into a communication signal in which they at least partially overlap in the time domain, and to cause the transceiver 142 of the first node 110 to transmit the communication signal to the second node 112 by way of the communication channel.

By the first and second signals overlapping each other in the time domain and in the frequency domain, a more accurate calibration function can be derived from the calibration signal by way of which the effects of the communication channel can be better equalised or whitened in the second signal. This is because the first and second signals will be adapted by the communication channel (e.g. noise characteristics, attenuation characteristics or noise and attenuation characteristics of the channel) in substantially the same way. This is particularly advantageous when, such as in a downhole environment, the transfer function of the communication channel is particularly prone to change, in particular during dynamic deployments such as drilling. For example, during drilling, loading (e.g. sinusoidal or helical bending) of the communication channel may cause modulation of the transfer function to occur. Similarly, drilling induced vibrations can be chaotic and induce instabilities such as non-linear effects in frequency passbands. Thus, even when the transfer function of the communication channel is particularly prone to change in this way, transmitting the encoded first and second signals such that they at least partially overlap in the time domain and in the frequency domain helps to ensure that the transfer function of the communication channel is substantially the same for both the first and second signals and that the first and second signals are thus affected by the communication channel in substantially the same way. This helps to ensure that the calibration function derived from the calibration signal can be used to effectively equalise or whiten the effect of the communication channel on the second signal, even when the transfer function of the communication channel is particularly prone to change. This allows the transmitted data to be recovered more accurately.

Figure 34:
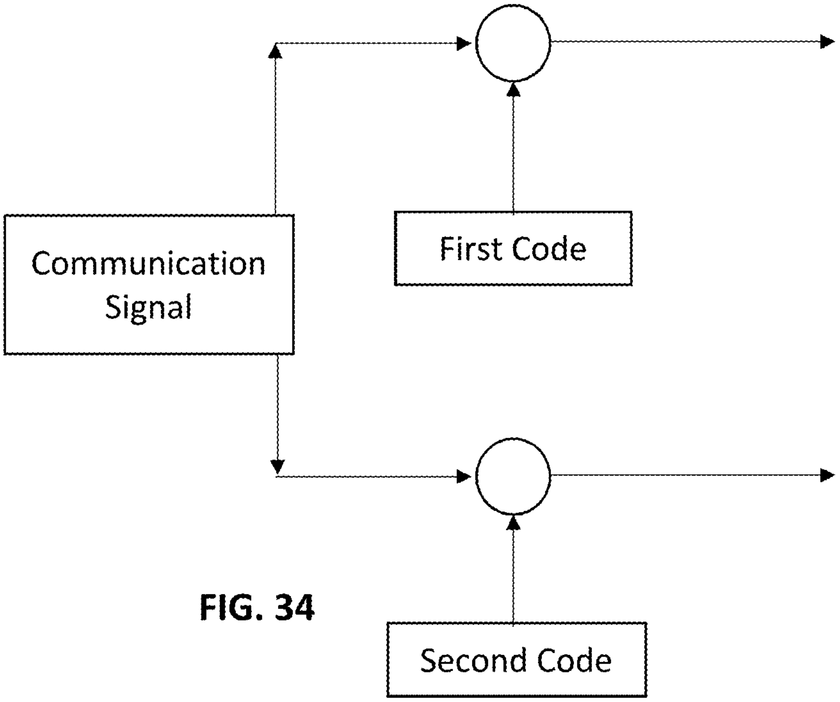
FIG. 34 is a flow diagram illustrating decoding of first and second signals depending on first and second codes.

As illustrated in FIG. 34, in order to receive the first and second signals the transceiver 142 of the receiving node, such as the second node 112, may receive the communication signal by way of the communication channel. The communication signal may comprise the first and second signals which at least partially overlap each other in the frequency domain and in the time domain. Both the corresponding encoded first and second signals may be adapted in accordance a respective transfer function of the communication channel. The first and second signals may comprise calibration and predetermined reference data encoded based on the first and second codes respectively. As discussed above, the first code may be different from the second code such that the received first and second signals can be discriminated from each other. As discussed above, the first code may be orthogonal to the second code. For example, it may be that the first and second codes are strictly orthogonal to each other, pseudo-orthogonal to each other or periodic orthogonal to each other. It may be that the cross correlation between the first signal and the second code is substantially zero or zero and the cross correlation between the second signal and the first code is substantially zero or zero. It may be that (e.g. the frequency of) the first code varies as a function of time differently from (e.g. the frequency of) the second code. It may be that the first code is orthogonal to the second code by way of the time variance of the first and second codes.

The first and second codes may be stored at, and retrieved by (e.g. processing circuitry of), the receiving node, such as the second node 112, from a memory 144 of the receiving node. The first code may be known to the second node by way of a predetermined calibration reference code (which may comprise the calibration data encoded by the said first code such that the encoded calibration data transmitted by the first node 110 is substantially identical to the predetermined calibration reference code) stored at memory 144 of the receiving node. The receiving node may process the received communication signal depending on the (e.g. retrieved) first and second codes to decode the first and second signals and thus determine decoded first and second signals which are discriminated from each other. For example, the receiving node may correlate a first copy of the received communication signal with the first code (for example by correlating the first copy of the received communication signal with a predetermined calibration reference code, which may be retrieved from memory 144 of the second node 112, which is substantially identical to the encoded calibration signal transmitted by the first node 110) to decode the first signal and thereby determine the decoded first signal discriminated from the received second signal. The receiving node may correlate a second copy of the received communication signal with the second code (for example by correlating the second copy of the received communication signal with a copy of the second code, which may be retrieved from memory 144 of the second node 112) to decode the second signal and thereby determine the decoded second signal discriminated from the received first signal. As the cross correlation between the first signal and the second code is substantially zero or zero and the cross correlation between the second signal and the first code is substantially zero or zero, the first and second signals can be readily discriminated from each other by the receiving node without significant interference by one on the other and vice versa.

The receiving node may process the decoded first signal to determine the calibration function. For example, the receiving node may determine the calibration function by obtaining an inverse of a frequency domain representation of the decoded received first signal. The inverse of the frequency domain representation of the decoded received first signal may be obtained by determining the reciprocal of the magnitude (e.g. $X \rightarrow 1/X$) and the complex conjugate of the phase (e.g. $Y^{\circ} \rightarrow -Y^{\circ}$) of the frequency domain representation of the decoded received first signal. The calibration function may depend on the noise and loss characteristics of the communication channel in the respective frequency band. In particular, the calibration function may be dependent on the effects of the communication channel on the respective first signal and thus, because the corresponding first and second signals at least partially overlap with each other in the time domain, the calibration function may also be dependent on the effect of the communication channel on the corresponding second signal.

The receiving node may process the decoded second signal depending on the calibration function. For example, the receiving node may convolve the decoded second signal with the calibration function (e.g. by multiplication in the frequency domain of the decoded second signal by the frequency domain calibration function). By processing the decoded second signal depending on the calibration function, the effects of the communication channel on the decoded second signal may be accounted for (e.g. whitened or equalised), to thereby allow the decoded second signal to be recovered more accurately. It will be understood that the calibration data may be accounted for, for example, by scaling the predetermined calibration reference code in accordance with the calibration data as mentioned above or by scaling the calibration function or the second signal processed depending on (e.g. convolved with) the calibration function in accordance with (e.g. a known constant or time varying amplitude of) the calibration data. The processing circuitry 140 of the second node 112 may output the whitened, decoded received second signal, or perform further processing thereon and provide an output in dependence on the further processed signal.

The first and second signals may be transmitted from the first node 110 to the second node 112, and received by the second node 112 from the first node 110, for example when the communication channel is in situ in the borehole 108, for example during operation of downhole equipment in the borehole 108, such as during drilling of the borehole 108, for example by the drill bit 101 of the drill string 100, logging, drill stem testing, fracturing, stimulation, completion, cementing or production. By the first and second signals at least partially overlapping in the frequency domain and at least partially in the time domain, it can be ensured that the calibration function derived from the decoded first signal is relevant to the second signal, even when the transfer function of the communication channel is dynamically changing.

The receiving node may output the whitened, decoded second signal, or perform further processing thereon and provide an output in dependence on the further processed signal. For example, the receiving node may determine the suitabilities of the respective frequency bands for communications with the node based on the whitened, decoded second signals as above.

It may be that the encoded first and second signals are separated from each other in time. However, the transfer function of the communication channel may be dynamically changing, particularly during dynamic deployments such as drilling. Accordingly, time separation of the first and second signals can cause the transfer function experienced by the calibration signal to be different from that experienced by the data signal, reducing the effectiveness of the processing of the data signal in dependence on the calibration function.

The first and second codes may be time variant codes. It may be that the first code is orthogonal to the second code by way of the time variance of the first and second codes. The time variance of the first and second codes may be a time variance of the frequencies of the first and second codes. It may be that (e.g. the frequency of) the first code varies as a function of time differently from (e.g. the frequency of) the second code. The first and second codes may be orthogonal to each other by virtue of the time variance of their frequencies. Alternatively, the first and second codes may alternatively be direct sequence spread spectrum codes (for example) having amplitudes which vary differently in time from each other rather than frequencies. In this case, it may be that the first and second codes are orthogonal to each other by way of the time variance of their amplitudes. The first and second codes may be spread spectrum codes such as any of: chirp codes; linear chirp codes; non-linear chirp codes; direct sequence spread spectrum codes; frequency hopping spread spectrum sequences. It may be that the first and second codes provide the calibration and data signals with greater immunity to the noise levels of the channel.

By way of example, it may be that the first signal is encoded by the processing circuitry 140 of the first node 110 based on a first chirp code and the second signal is encoded by the processing circuitry 140 of the first node 110 based on a second chirp code, the first chirp code being orthogonal to the second chirp code. The cross correlation between the first chirp and the second chirp may be substantially zero or zero and the cross correlation between the second chirp and the first chirp may be substantially zero or zero. The first and second chirp codes may be known to the second node 112, such as by being stored in memory 144 thereof. Accordingly, the first and second signals may be discriminated from each other by the processing circuitry 140 of the second node 112.

For example, the first code may comprise a first chirp code sweeping at least a portion of the (or the entire) respective frequency band. It may be that the second code refers to the code used to represent a binary ‘1’ in the encoded bit sequence or waveform of the encoded predetermined reference data. The second code, used to represent binary ‘1’ in the encoded bit sequence or waveform of the predetermined reference data, may be a second chirp code different from the first chirp code such that the first and second signals can be discriminated from each other. It may be that the second chirp code sweeps at least a portion of (or the entire) respective frequency band. For example, the first chirp code may be an up-chirp and the second chirp code may be a down-chirp (or vice versa). It may be that the up-chirp and down-chirp have the same bandwidths and the same time bandwidth products as each other.

Figure 35A:
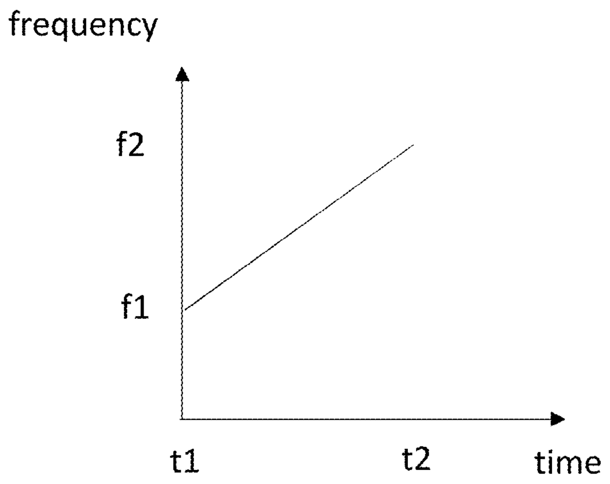
FIGS. 35*a* and 35*b* illustrate up and down chirp codes respectively, the up and down chirp codes being orthogonal to each other.
Figure 35B:
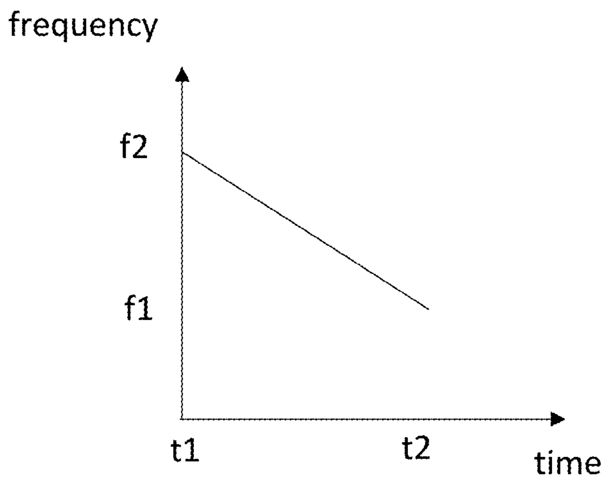

For example, it may be that the first chirp code linearly increases in frequency from frequency f1 to frequency f2 between time t1 and time t2 as illustrated in the plot of frequency versus time of FIG. 35*a*. The second chirp code may linearly decrease in frequency from frequency from frequency f2 to frequency f1 between time t1 and time t2 as illustrated in the plot of frequency versus time of FIG. 35*b*. The first and second chirp codes may thus be the same length in time as each other. The frequency band f1 to f2 may correspond to a passband of the communication channel. Although the up-chirp and down-chirp codes of FIGS. 35*a* and 35*b* fully overlap with each other in frequency and time, they are orthogonal to each other by way of their time variance, in this case by way of the time variance of their frequencies. The encoded first and second signals may be combined by the processing circuitry 140 of the first node 110 and transmitted by the transceiver thereof to the second node 112 by way of the communication channel such that they overlap with each other in the time domain.

As mentioned above, the second signals to be transmitted from the first node 110 to the second node 112 may each comprise a bit sequence. The second signals may be encoded based on the second code for transmission from the first node 110 to the second node 112. In the present example, the bit sequences of the second signals may be encoded by the down-chirp code. For example, it may be that the presence of the down-chirp code represents binary ‘1’ and the absence of the down-chirp code represents binary ‘0’ of the bit sequence (or vice versa) in the encoded second signal. For example, an encoded second signal may comprise a plurality of identical linear down-chirps offset from each other in the time domain, each of the down-chirps representing a binary ‘1’. Thus, the second signals or data signals may comprise a bit sequence generated by way of on/off keying. In this case, it may be that a chirp signal (e.g. the down-chirp) represents a binary ‘1’ in the encoded predetermined bit sequence of the second signal, and the absence of a (or that) chirp signal represents a binary ‘0’ in the encoded predetermined bit sequence of the second signal. It may be that the chirp signal of each binary ‘1’ has a frequency which sweeps over (e.g. ramps up or down in frequency across) at least a portion of the (or the entire) respective frequency band. For a respective frequency band, the chirps representing the binary ‘1’s of the second signal may be offset from each other in the time domain, but they may (e.g. significantly) overlap each other in the time domain when transmitted.

As also mentioned above, the first signal may comprise a signal which is known to the second node 112, for example by being stored at memory 144 thereof. It may be that the first signal is of constant amplitude or of time varying amplitude. As discussed above, the first signal may be encoded by way of the first code, in the present example the up-chirp code.

In an example, a communication signal received by the transceiver 142 of the second node 112 by way of the communication channel from the first node 110 may comprise, in a 1150 Hz-1250 Hz frequency band of the communication channel, an encoded second signal comprising four identical linear down-chirps offset from each other in the time domain and a corresponding encoded first signal comprising a linear up-chirp overlapping the down-chirp signals in the frequency domain and at least partially overlapping in the time domain with (e.g. at least the last of) the four down-chirp signals. The up-chirp increases linearly in frequency as a function of time from 1150 Hz to 1250 Hz, while the down-chirp decreases linearly in frequency as a function of time from 1250 Hz to 1150 Hz. The up-chirp and down-chirp may have substantially the same period.

Figure 37:
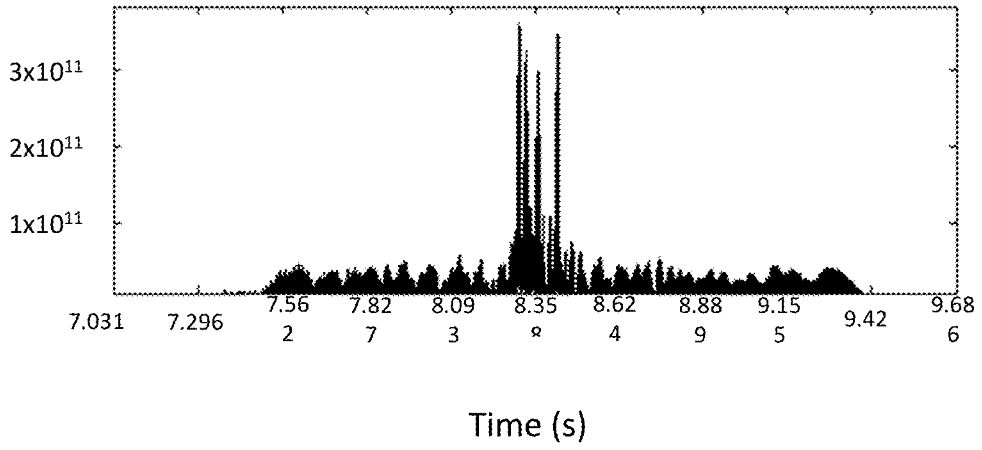
FIG. 37 shows four pulse compressed down chirp signals offset in time from each other together, recovered from a communication signal comprising the four down chirps and an up chirp orthogonal to the down chirp overlapping the down chirps in the frequency domain and overlapping the fourth down chirp in the time domain.
Figure 38:
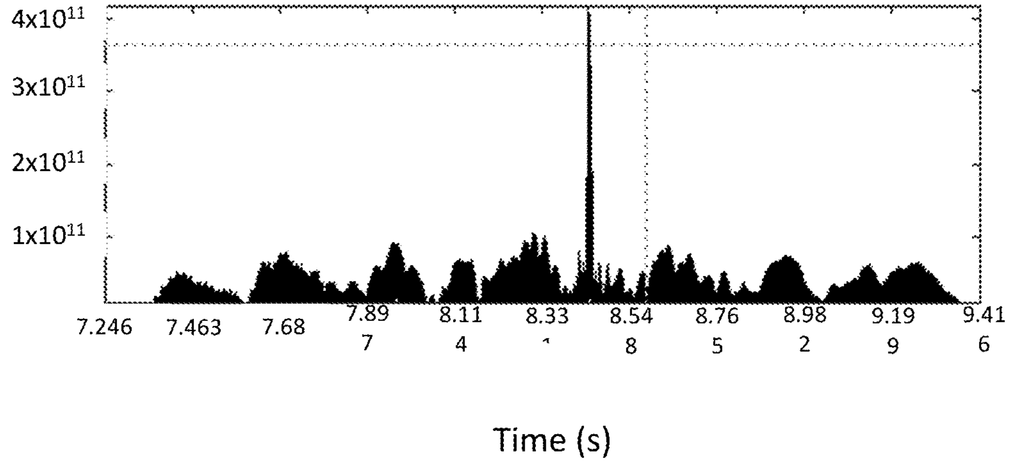
FIG. 38 shows a pulse compressed up chirp signal recovered from the same communication signal as the four pulse compressed down chirp signals of FIG. 37.

The transceiver 142 of the second node 112 may receive the communication signal comprising the encoded first and second signals and the processing circuitry 140 thereof may decode the encoded first and second signals depending on the respective first and second chirp codes stored at memory 144 of the second node 112. As well as decoding the first and second signals, processing the encoded first and second signals depending on the respective first and second chirp codes discriminates them from each other. FIG. 37 shows the decoded data signal comprising four decoded, in this case pulse compressed, down-chirps recovered from the communication signal. FIG. 38 shows the decoded first signal comprising a decoded, in this case pulse compressed, up-chirp signal recovered from the said communication signal. It can be seen from FIGS. 37 and 38 that the decoded down-chirp signals can be readily discriminated from the decoded up-chirp signal without significant interference by one on the other and vice versa by the second node 112.

As discussed above, the processing circuitry 140 of the second node 112 may process the decoded first signal to determine a calibration function and process the decoded second signal depending on the calibration function. As discussed above, it may be that the processing circuitry 140 of the second node 112 determines the calibration function based on the decoded received first signal by obtaining an inverse of a frequency domain representation of the decoded received first signal. The calibration function may depend on the noise and loss characteristics of the communication channel in the respective frequency band. It may be that the processing circuitry 140 of the second node 112 processes the decoded second signal depending on the calibration function by convolving the decoded second signal with the calibration function. The second node 112 may provide an output depending on the processed second signal.

As another example, the first and second codes may comprise spread spectrum frequency hopping sequences. For example, it may be that the processing circuitry 140 of the first node 110 encodes the first signal based on a first frequency hopping sequence and the second signal based on a second frequency hopping sequence different from (e.g. orthogonal to) the first frequency hopping sequence such that the first and second signals can be distinguished from each other at the second node. For example, the first signal may comprise a known signal of constant or time varying amplitude having a frequency which varies in accordance with the first frequency hopping sequence. Similarly, the second signal may comprise a bit sequence, for example represented by signals of relatively high (representing binary ‘1’) and relatively low (representing binary ‘0’) amplitude, having a frequency which varies in accordance with the second frequency hopping sequence. The processing circuitry 140 of the first node 110 may combine the encoded first and second signals and cause the combined signals to be transmitted as a communication signal to the second node 112 by way of the communication channel such that they at least partially overlap with each other in the time domain.

The transceiver 142 of the second node 112 may receive the communication signal comprising the encoded first and second signals. The second node 112 may know the first and second frequency hopping sequences, for example, the first and second frequency hopping sequences may be stored in memory 144 of the second node 112. The processing circuitry 140 of the second node 112 may process the received communication signal depending on the first and second frequency hopping sequences to thereby decode the first and second signals such that they can be discriminated from each other. For example, the processing circuitry 140 of the second node 112 may correlate a first copy of the received communication signal with the first frequency hopping sequence to decode the first signal and discriminate it from the second signal. The processing circuitry 140 of the second node 112 may correlate a second copy of the received communication signal with the second frequency hopping sequence to decode the second signal and discriminate it from the first signal. The cross correlation between the encoded first signal and the second frequency hopping sequence may be substantially zero or zero and the cross correlation between the encoded second signal and the first frequency hopping sequence may be substantially zero or zero. Accordingly, the first and second signals can be readily discriminated from each other by the second node 112 without significant interference by one on the other.

As above, the processing circuitry 140 of the second node 112 may derive a calibration function from the decoded first signal and process the decoded second signal depending on the calibration function. As above, it may be that the processing circuitry 140 of the second node 112 determines the calibration function based on the decoded received first signal by obtaining an inverse of a frequency domain representation of the decoded received first signal. As above, it may be that the processing circuitry 140 of the second node 112 processes the decoded second signal depending on the calibration function, for example by convolving the decoded second signal with the calibration function.

Figure 36:
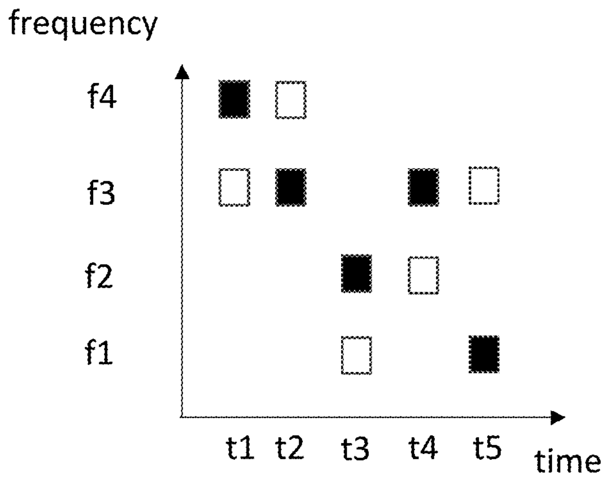
FIG. 36 illustrates first and second frequency hopping codes, the first and second frequency hopping codes being orthogonal to each other.

By way of illustration, FIG. 36 shows example, first and second frequency hopping spread spectrum sequences, the first frequency hopping sequence being shown by way of white boxes and the second frequency hopping sequence being shown by way of black boxes. The first and second frequency hopping sequences are different from each other such that a first signal encoded by the first sequence can be discriminated from a second signal encoded by the second sequence. The first and second frequency hopping sequences may be orthogonal to each other. Frequencies f1, f2, f3 and f4 may represent different sub-bands (or discrete frequencies) of a frequency band, such as a passband, of the communication channel or respective sub-bands of different frequency bands, such as frequency passbands, of the communication channel. Times t1, t2, t3, t4 and t5 may represent different time slots of the respective sequences. The first frequency hopping sequence in this example is: t1, f3; t2, f4; t3, f1; t4, f2; t5, f3. The second frequency hopping sequence in this example is: t1, f4; t2, f3; t3, f2; t4, f3; t5, f1. The first and second sequences overlap with each other in the frequency domain, in that the same frequency sub-bands f1 to f4 are used by both sequences. The first and second sequences may be the same length in time as each other. The first and second sequences overlap with each other in the time domain, in that the first and second sequences occupy the same time respective slots t1 to t5. Although there are no time slots in which the first and second sequences use the same frequencies in FIG. 7, it will be understood that there may be one or more time slots in which the first and second sequences use the same frequencies. Although the first and second frequency hopping sequences overlap with each other in the frequency domain and in the time domain, they are orthogonal to each other by way of their time variance (in this case, the time variance of their frequencies).

Although in some of the above examples first and second signals based on the up and down chirp codes, and first and second signals based on the first and second frequency hopping sequences, may overlap with each other fully in the time domain and in the frequency domain, it will be understood that the first and second signals may alternatively partially overlap with each other in the time domain and partially overlap with each other in the frequency domain. Generally, the first and second signals may at least partially overlap with each other in the time domain and at least partially overlap with each other in the frequency domain.

Although in the above example, the time variance of the first and second codes is a time variance of the frequencies of the first and second codes, it will be understood that the first and second codes may alternatively be direct sequence spread spectrum codes (for example) having amplitudes which vary differently in time from each other rather than frequencies. In this case, it may be that the first and second codes are orthogonal to each other by way of the time variance of their amplitudes.

It may be that first and second signals may be transmitted from the first node 110 to the second node 112 (or vice versa) in each of a plurality of frequency bands, the first and second signals in the different frequency bands at least partially or fully overlapping with each other in the time domain. Similarly, it may be that the communication signal received by the second node 112 from the first node 110 (or vice versa) may comprise first and second signals in each of a plurality of frequency bands, the signals in the different frequency bands at least partially or fully overlapping each other in the time domain. The codes by which the first and second signals in the different frequency bands are encoded may be different from each other such that signals in different bands can be distinguished from each other by the second node 112. Thus, processing the received communication signals depending on the respective codes may also discriminate the first and second signals in the respective frequency bands from the calibration and data signals in the other bands. Indeed, the decoded first and second signals of FIGS. 37 and 38 are recovered from a communication signal further comprising corresponding calibration and data signals in four other frequency bands (600 Hz to 700 Hz, 850 Hz to 950 Hz, 1400 Hz to 1500 Hz and 1690 Hz to 1790 Hz).

Figure 39:
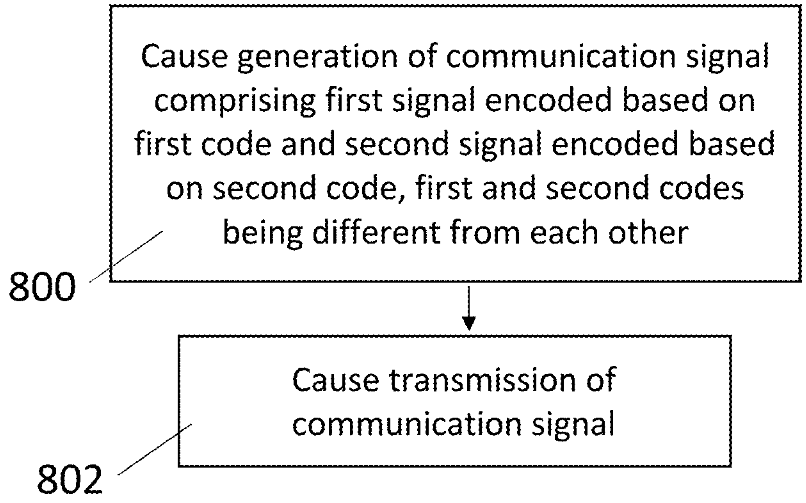
FIG. 39 is a flow chart illustrating a method of transmitting a communication signal.

FIG. 39 is a flow chart illustrating a method of transmitting a communication signal. The method of FIG. 10 may be performed by processing circuitry of one of the first and second nodes 110, 112. At 800, generation of a communication signal is caused, the communication signal comprising a first signal encoded based on a first code and a second signal based on a second code, the first code being different from the second code such that the transmitted first and second signals can be discriminated from each other. The first signal may comprise a calibration signal for a receiving node to determine a calibration function which depends on the transfer function of the communication channel between the nodes, the calibration function being for equalising or whitening effects of the communication channel on the data signal. It may be that the encoded first and second signals at least partially overlap with each other in the time domain. It may be that the encoded first and second signals at least partially overlap with each other in the frequency domain. As discussed above, the first code may be orthogonal to the second code. For example, it may be that the first and second codes are strictly orthogonal to each other, pseudo-orthogonal to each other or periodic orthogonal to each other. It may be that the first and second codes are selected such that the cross correlation between the encoded first signal and the second code is substantially zero or zero and the cross correlation between the encoded second signal and the first code is substantially zero or zero. It may be that (e.g. the frequency or amplitude of) the first code varies as a function of time differently from (e.g. the frequency or amplitude of) the second code. It may be that the first code is orthogonal to the second code by way of the time variance of the first and second codes. At 802, transmission of the communication signal is caused, for example by way of a transceiver 142 of the respective node, by way of the communication channel.

By the first and second signals overlapping each other in the time domain and in the frequency domain, a more accurate calibration function can be derived from the first signal by way of which the effects of the communication channel can be better equalised or whitened in the second signal. This is because the first and second signals will be adapted by the communication channel in substantially the same way. This is particularly advantageous when, such as in a downhole environment, the transfer function of the communication channel is particularly prone to change, in particular during dynamic deployments such as drilling.

Figure 40:
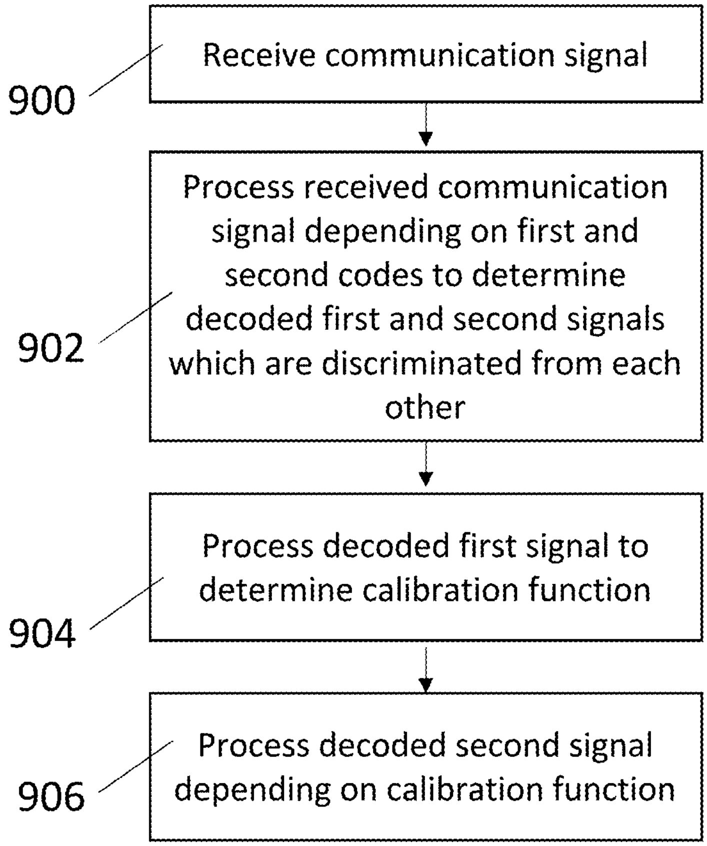
FIG. 40 is a flow chart illustrating a method of receiving a communication signal.

FIG. 40 is a flow chart illustrating a method of receiving a communication signal. The method of FIG. 40 may be performed by one of the first and second nodes 110, 112, such as a different one of the first and second nodes 110, 112 from the method of FIG. 39. At 900, the receiving node, such as the transceiver 142 of the receiving node, may receive a communication signal by way of the communication channel. The communication signal may comprise a first signal and a second signal which at least partially overlap each other in the frequency domain and in the time domain. The first and second signals may be encoded based on first and second codes respectively. The first code may be different from the second code such that the received first and second signals can be discriminated from each other. As discussed above, the first code may be orthogonal to the second code. For example, it may be that the first and second codes are strictly orthogonal to each other, pseudo-orthogonal to each other or periodic orthogonal to each other. It may be that the cross correlation between the encoded first signal and the second code is substantially zero or zero and the cross correlation between the encoded second signal and the first code is substantially zero or zero. It may be that (e.g. the frequency of) the first code varies as a function of time differently from (e.g. the frequency of) the second code. It may be that the first code is orthogonal to the second code by way of the time variance of the first and second codes.

The first and second codes may be stored at, and retrieved by (e.g. processing circuitry of), the receiving node from a memory 144 of the receiving node. At 902, the receiving node may process the received communication signal depending on the (e.g. retrieved) first and second codes to determine decoded first and second signals which are discriminated from each other. For example, the receiving node may correlate a first copy of the received communication signal with the first code (for example by correlating the first copy of the received communication signal with a predetermined calibration reference code substantially identical to the encoded first signal transmitted by the first node 110) to determine the decoded first signal discriminated from the received second signal. The receiving node may correlate a second copy of the received communication signal with the second code to determine the decoded second signal discriminated from the received first signal. As the cross correlation between the encoded first signal and the second code is substantially zero or zero and the cross correlation between the encoded second signal and the first code is substantially zero or zero, the first and second signals can be readily discriminated from each other by the receiving node without significant interference by one on the other.

At 904, the receiving node may process the decoded first signal to determine the calibration function. For example, the receiving node may determine the calibration function by obtaining an inverse of a frequency domain representation of the decoded received first signal. The inverse of the frequency domain representation of the decoded received first signal may be obtained by determining the reciprocal of the magnitude (e.g. X→1/X) and the complex conjugate of the phase (e.g. Y°→−Y°) of the frequency domain representation of the decoded received first signal. The calibration function may depend on the noise and loss characteristics of the communication channel in the respective frequency band.

At 906, the receiving node may process the decoded second signal depending on the calibration function. For example, the receiving node may convolve the decoded second signal with the calibration function. By processing the decoded second signal depending on the calibration function, the effects of the communication channel on the decoded data signal may be whitened or equalised. By the first and second signals at least partially overlapping in the frequency domain and at least partially in the time domain, it can be ensured that the calibration function derived from the decoded first signal is relevant to the data signal, even when the transfer function of the communication channel is dynamically changing. The receiving node may output the whitened, decoded data signal, or perform further processing thereon and provide an output in dependence on the further processed signal.

It may be that first and second signals may be transmitted from the first node 110 to the second node 112 (or vice versa) in each of a plurality of frequency bands, the signals in the different frequency bands at least partially or fully overlapping with each other in the time domain. Similarly, it may be that the communication signal received by the second node 112 from the first node 110 (or vice versa) may comprise first and second signals in each of a plurality of frequency bands, the signals in the different frequency bands at least partially or fully overlapping each other in the time domain. The codes by which the calibration and predetermined reference data of the first and second signals in the different frequency bands are encoded may be different from each other such that signals in different bands can be distinguished from each other by the second node 112. Thus, processing the received communication signals depending on the respective codes may also discriminate the first and second signals in the respective frequency bands from the first and second signals in the other bands.

For each of the frequency bands in respect of which corresponding first and second (or calibration and data) signals are transmitted from the first node 110 to the second node 112, the respective encoded first (or calibration) signal may comprise or consist of a plurality of signal frequencies within the frequency band. The encoded first (or calibration) signal frequencies may span at least 70%, at least 80%, at least 90%, at least 95% or 100% of the respective frequency band. For example, the encoded first (or calibration) signal may comprise a chirp signal such as an up-chirp or down-chirp which sweeps at least 70%, at least 80%, at least 90%, at least 95% or 100% of the respective frequency band. The more of the frequency band which is swept by the encoded first (or calibration) signal, the more accurate the calibration function for that band. For each of the frequency bands in respect of which corresponding first and second (or calibration and data) signals are transmitted from the first node 110 to the second node 112, the respective encoded second (or data) signal may comprise or consist of a plurality of signal frequencies within the respective frequency band. It may be that the encoded second (or data) signal frequencies span at least 50%, at least 70%, at least 80%, at least 90%, at least 95% or 100% of the respective frequency band. It may be that, for each of the frequency bands, the encoded second (or data) signal is based on one or more chirps which at least together sweep at least 50%, at least 70%, at least 80%, at least 90%, at least 95% or 100% of the respective frequency band.

Figure 16:
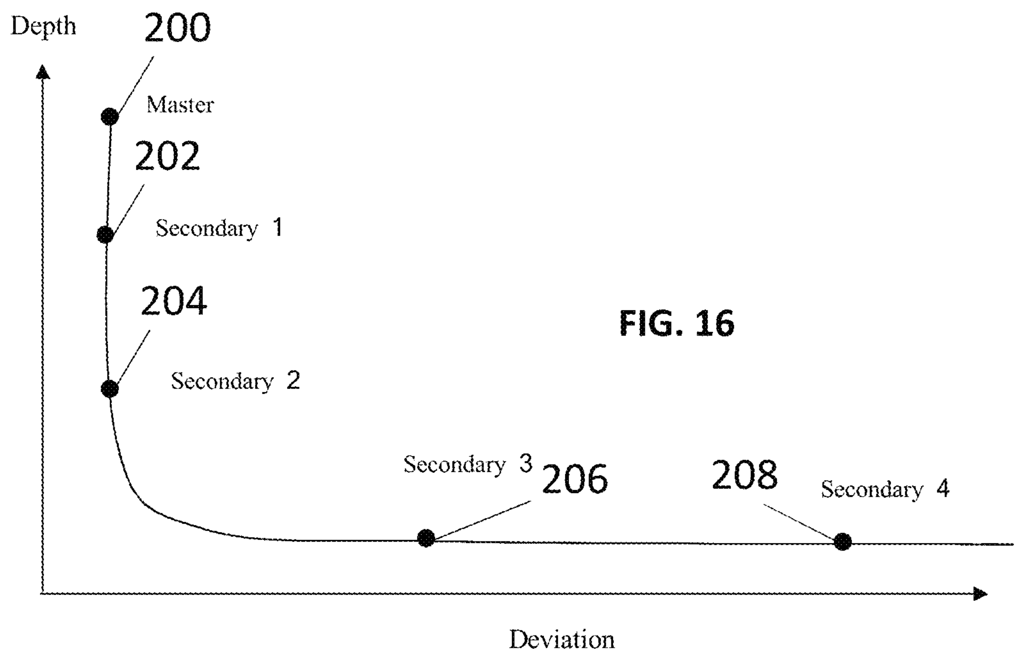
FIG. 16 is a plot of depth verses lateral deviation for a particular topology of downhole communications nodes.

Although the above discussion refers to a topology having a pair of nodes 110, 112, it will be understood that more than two nodes may be provided. For example, for longer boreholes, it may be that one or more repeater nodes are provided between the first and second nodes 110, 112 along the length of the drill string. Additionally or alternatively, sensors may be provided at various discrete locations along the length of the drill string, and corresponding nodes may be provided at the said locations in order to transmit data to and from the sensors. FIG. 16 shows a topology comprising five nodes 200-208 deployed along the length of a drill string 210 which provides an acoustic communication channel for the nodes 200-208 to communicate on. As above, however, any suitable additional or alternative communication channel may be provided. The five nodes 200-208 comprise a first node 200 at the surface, a second node 202 directly beneath the first node 200, a third node 204 directly beneath the second node 202, a fourth node 206 vertically below and laterally offset from the third node 204 and a fifth node 208 at approximately the same depth as but laterally offset from the fourth node 206. The first node 200 may be a master node and the other nodes 202-208 may be secondary nodes coordinated by the master node 200. It will be understood that any number of nodes 200-208 may be provided.

It may be that each pair of nodes 200-208 is configured to determine the suitability of each of a plurality of frequency bands for data communication between them, for example in both directions between them, for example as discussed above in respect of the first and second nodes 110, 112, and to communicate data with each other selectively on one or more frequency bands determined to be suitable therefor.

Each of the nodes 200-208 may be provided with a unique identifier, which may be stored in memory 144 at the master node 200, and in some cases by the secondary nodes 202-208. It will be assumed in the following discussion that each of the nodes 200-208 have the features of the node 110 shown in FIG. 2. It may be that the processing circuitry 140 of the master node 200 is configured to cause the transceiver 142 thereof to transmit (e.g. broadcast or multicast to the secondary nodes 202-208), by way of the communication channel, a dedicated calibration sequence comprising corresponding first and second signals in each of a plurality of frequency bands as set out above in respect of the first node 110. Each of the secondary nodes 202-208 may receive, by way of the communication channel, and process, by way of the respective processing circuitry 140 thereof, the first and second signals transmitted by the master node 200 to determine the suitabilities of the frequency bands from the master node 200 to the respective secondary nodes 202-208, for example as discussed above in respect of the first and second nodes 110, 112. The respective secondary nodes 202-208 may each be configured, in response to receiving the first and second signals from the master node 200, for example in response to determining that there is at least one suitable frequency band for data communication by way of the communication channel from the master node 200 to the respective secondary node 202-208, to transmit to the master node 200, broadcast or multicast to each of the other nodes 200-208 their own first and second signals so that the master node 200 may determine therefrom the suitabilities of the frequency bands for data communications from the respective secondary node 202-208 to the master node 200.

To help prevent interference between the first and second signals transmitted by the respective secondary nodes 202-208 in response to the first and second signals received from the master node 200, each of the secondary nodes 202-208 may be configured to transmit their first and second signals at a different time from the other secondary nodes 202-208. For example, each of the secondary nodes 202-208 may be configured to transmit their first and second signals at a time dependent on their respective unique identifiers. As the master node 200 has access to the unique identifiers of the secondary nodes 202-208 stored in the memory 144 thereof, the master node 200 can determine from which secondary node 202-208 it is receiving first and second signals at any given time. The master node 200 can thus receive the first and second signals from the various secondary nodes 202-208, identify which signals are from which secondary node 202-208 and determine the suitabilities of the frequency bands for data communication from the respective secondary nodes 202-208 to the master node 200.

The master node 200 may be configured to transmit payload data signals each comprising indications of the suitabilities of the frequency bands for data communication from a respective secondary node 202-208 to the master node 200. To prevent or at least inhibit interference between the signals, the indications of the suitabilities of the frequency bands for each of the secondary nodes 202-208 may be transmitted by the master node 200 at different times which depend on the unique identifiers associated with the nodes 202-208. The indications may be transmitted in each of the frequency bands. As above, the indications may be communicated by way of a bit sequence, such as an encoded bit sequence, for example by way of one or more chirp signals (e.g. by on/off keying as described above), which may be known to the secondary nodes 202-208, for example by way of reference data stored in their memories 144. As above, the indications may be preceded (or succeeded) in each of the frequency bands by calibration signals transmitted by the master node 200, such as calibration chirps, known to the secondary nodes 202-208, for example by way of reference data stored in their memories 144. Alternatively, as discussed above, the calibration signals and bit sequence may alternatively be transmitted simultaneously with each other (or at least such that they at least partially overlap in the time domain), in which case they may be encoded with different (e.g. orthogonal) codes which enable them to be discriminated from each other. This enables the secondary nodes 202-208 to account for the effects of the channel as described above when determining the contents of the indications of the suitabilities of the frequency bands.

It may be that the respective secondary nodes 202-208 are configured to determine the indications of the suitabilities of the frequency bands for data communication to the master node 200 from the indications received in the frequency bands determined to be suitable for data communication from the master node 200 to the respective secondary node 202-208 based on the dedicated calibration sequence received from the master node 200, for example as discussed above in respect of the first and second nodes 110, 112.

The payload data signal comprising the indications may further comprise predetermined reference data (e.g. at a preamble, mid-amble or post-amble thereof). As above, the secondary nodes 202-208 may be further configured to determine the suitabilities of the respective frequency bands for data communication by way of the communication channel from the master node 200 to the respective secondary node 202-208 by determining the quality of the predetermined reference data, which may for example be based on a predetermined reference bit sequence or waveform known to the respective secondary node 202-208 by way of, e.g. comparison to, predetermined reference data stored at the memory 144 thereof, which can be recovered from the processed payload data signals received by the respective secondary node 202-208. Accordingly, it may be that the respective secondary nodes 202-208 are configured to determine the indications of the suitabilities of the frequency bands for data communication to the master node 200 from the indications received in the frequency bands determined to be suitable for data communication from the master node 200 to the respective secondary node 202-208 based on the predetermined reference data recovered from the payload data signal.

The secondary nodes 202-208 may each be configured to transmit payload data signals comprising indications of the suitabilities of the frequency bands for data communication from the master node 200 to the respective secondary node 202-208. The suitabilities may be the suitabilities determined based on the predetermined reference data of the payload data signals or the suitabilities determined based on the first and second signals of the dedicated calibration sequence transmitted by the master node 200. To prevent or at least inhibit interference between the signals, the indications of the suitabilities of the frequency bands for data communications to each of the secondary nodes 202-208 may be transmitted to the master node 200 at different times which for example depend on the unique identifiers associated with the secondary nodes 202-208. The indications may be transmitted in each of the frequency bands, or in frequency bands indicated to be suitable for communications from the respective secondary node 202-208 to master node 200. The payload data signals comprising the indications may comprise predetermined reference data which may for example be based on a predetermined bit sequence. As above, the indications may be communicated by way of a bit sequence, such as an encoded bit sequence, the meaning of which is known to the master node 200, for example by way of reference data stored in its memory 144 as discussed above. The payload data signal may also be preceded (or succeeded) in each of the frequency bands by calibration signals, such as calibration chirps, known to the master node 200, for example by way of predetermined calibration data stored in its memory 144. Alternatively, as discussed above, the payload data signal and calibration signal may be transmitted simultaneously with each other, in which case it may be that they are encoded based on different (e.g. orthogonal) codes to enable them to be discriminated from each other. As above this enables the master node 200 to account for the effects of the channel as described above when determining the contents of the indications of the suitabilities of the frequency bands. It may be that the master node 200 determines the indications of the suitabilities of the frequency bands for data communication from the master node 200 to the respective secondary nodes 202-208 from the indications received in the frequency bands determined to be suitable for data communication from the respective secondary node 202-208 to the master node 200 based on the first and second signals of the dedicated calibration sequence received from the respective secondary node 202-208.

As above, the master node 200 may be configured to determine the suitabilities of the respective frequency bands for data communication by way of the communication channel from the respective secondary node 202-208 to the master node 200 by determining the quality of predetermined reference data recovered from the payload data signal received therefrom by the master node 200. As above, the quality of the recovered predetermined reference data may for example be determined based on a comparison of the predetermined reference data recovered from the payload data signal to predetermined reference data, such as a predetermined bit sequence or waveform, on which it is based stored at the memory 144 thereof. It may be that the master node 200 determines the indications of the suitabilities of the frequency bands for data communication from the master node 200 to the respective secondary nodes 202-208 from the indications received in the frequency bands determined to be suitable for data communication from the respective secondary node 202-208 to the master node 200 based on the predetermined reference data recovered from the payload data signal.

As the first and second signals transmitted by the respective secondary nodes 202-208 may propagate in both directions (e.g. towards the master node 200 and towards the bottom end 215 of the drill string 199), and because they may be broadcast or multicast to each of the other nodes, the first and second signals transmitted by the respective secondary nodes 202-208 can also be detected by the other secondary nodes. The secondary nodes may thus be configured to determine from the respective first and second signals the frequency bands suitable for data communication between them in both directions.

The respective secondary nodes 202-208 may be configured to further transmit to the master node 200, or to each of the other nodes 200-208, node identification data identifying the other secondary nodes 202-208 in respect of which they have determined at least one frequency band to be suitable for data communication therewith by way of the communication channel. For example, the data indicating which other secondary nodes 202-208 were detected may be an encoded bit sequence the meaning of which is known by the master node 200, for example by way of reference data stored in its memory 144. In this way, if the master node 200 wishes to communicate with a secondary node it cannot communicate with directly (e.g. because there are no frequency bands suitable for data communication directly with that node), the master node 200 may determine from the node identification signals a relay node 202-208 with which it can communicate (e.g. because there are one or more frequency bands suitable for data communication with that node 202-208) and which can communicate with that secondary node.

The master node 200 has now determined which secondary nodes 202-208 it can communicate with directly (i.e. without having to relay data via another node), and which other secondary nodes 202-208 each of the secondary nodes 202-208 can communicate with. In addition, each node 200-208 has determined which frequency bands are open for communication with the other nodes 200-208. Thus, data can be transmitted efficiently, reliably, potentially over a plurality of frequency bands, with high bit rates between the nodes 200-208.

If any of the secondary nodes 202-208 did not receive the first and second signals transmitted by the master node 200, they will not have responded thereto by transmitting their own first and second signals. Accordingly the master node 200 will not have determined the suitabilities of the frequency bands for data communication by way of the communication channel from the respective secondary node 202-208 to the master node 200. The master node 200 may be configured to identify any secondary nodes 202-208 from which it has not received respective first and second signals of a calibration sequence based for example on the respective timings of the receipt of the first and second signals from the secondary nodes 202-208 and the unique identifiers of the secondary nodes 202-208 stored in the memory of the master node 200. For example, the master node 200 may determine one or more time gaps between signals received from the nodes 202-208 and determine the node(s) 202-208 from which signals have not been received by reference to the unique identifiers based on the expectation that signals should have been received in order of unique identifier from the nodes 202-208. The master node 200 may further determine whether any of the secondary nodes 202-208 can communicate with the missing node from the node identification data transmitted by the secondary nodes 202-208. If so, the master node 200 may communicate with the missing node via a secondary node 202-208 which can communicate with the missing node.

In response to determining that it cannot communicate with one or more of the secondary nodes 202-208, for example either directly or by way of another secondary node 202-208 (e.g. based on the node identification data), the master node 200 may send a FIND command by way of the communication channel to one of the secondary nodes 202-208 with which it can communicate, for example on one or more selected frequency bands which have been determined to be suitable for data communication or on all frequency bands with that secondary node 202-208. The master node 200 may be configured to select a secondary node 202-208 to send the FIND command to based on predetermined data (which may for example be stored in the memory 144 of the master node 200) indicative that the selected node is positioned to be near to the node to be found, and send the FIND command to that node 202-208. For example, the unique identifiers may be allocated to the secondary nodes 202-208 depending on their relative locations to each other. In this case, the master node 200 may select a secondary node 202-208 depending on the selected secondary node 202-208 having a similar unique identifier to the node to be found. The FIND command may have the format: <FIND><SELECTED NODE IDENTIFIER><IDENTIFIER OF NODE TO BE FOUND>, where the <SELECTED NODE IDENTIFIER> is the unique identifier of the node 202-208 to which the FIND command is sent and the <IDENTIFIER OF NODE TO BE FOUND> is the unique identifier of the node 202-208 which is subject of the FIND command, that is the node 202-208 to be found.

When the FIND command is transmitted by the master node 200, it may be received directly by the node to be found, for example if an appropriate frequency band has opened to allow the master node 200 to communicate directly with the node 202-208 to be found. Additionally or alternatively, the selected secondary node 202-208 may receive the FIND command and transmit it to another secondary node 202-208 which is also determined to be close to the secondary node 202-208 to be found (e.g. by way of reference to stored unique identifiers of the secondary nodes 202-208 which may also be stored at each of the nodes 202-208), for example on one or more selected frequency bands which have been determined to be suitable for data communication with the newly selected secondary node 202-208 or on all frequency bands. As the FIND command is re-transmitted, it may be detected by the node 202-208 to be found.

When the node 202-208 to be found receives the FIND command, it may be configured to transmit calibration signals (corresponding to the first signals described above) and predetermined reference data signals (corresponding to the second signals described above) for at least one of the secondary nodes 202-208 to determine one or more frequency bands suitable for communication by way of the communication channel to the at least one of the secondary nodes 202-208 from the node 202-208 to be found. The at least one of the secondary nodes 202-208 may be configured to transmit to the master node 200 data indicating that it has determined at least one frequency band to be suitable for data communication with the node to be found by way of the communication channel. The master node 200 may then communicate with the node to be found by way of the said node.

For secondary nodes 202-208 which the master node 200 can communicate with directly, commands may be sent from the master 200 to a respective secondary node 202-208 in the format: <ID><COMMAND><SRC>, where <ID> is the unique identifier of the node 202-208 to which the command is sent, <COMMAND> is the command being sent to the node 202-208 and <SRC> is the unique identifier of the master node 200 from which the command originated.

For secondary nodes 202-208 which the master node 200 has to communicate with by way of a relay secondary node 202-208, commands may be sent from the master 200 to the respective secondary node 202-208 in the format: <ID><PASSON><TARGETID><COMMAND><SRC>, where <ID> is the unique identifier of the relay node 202-208, <PASSON> is a command to the relay node 202-208 to pass the command onto another secondary node 202-208, <TARGETID> is the unique identifier of the node with which the master node 200 is trying to communicate with via the relay node 202-208, <COMMAND> is the command from the master node 200 to the node 202-208 with which the master node 200 is trying to communicate with via the relay node and <SRC> is the unique identifier of the master node 200 from which the command originated.

On receiving a PASS ON command, the relay node 202-208 may be configured to transmit the communication received from the master node 200, for example on one or more frequency bands known by the relay node 202-208 to be suitable for communicating with the respective node 202-208 to be found. In response to receiving the message, the targeted node 202-208 may transmit a signal such as an acknowledgement back to the relay node 202-208 which itself may re-transmit the signal to the master node 200.

It will be understood that, in more complex topologies, a plurality of secondary nodes 202-208 may act as relay nodes to pass on messages between nodes.

Thus, the master node 200 may communicate with secondary nodes 202-208 indirectly by way of one or more other secondary nodes 202-208 which act as relay nodes 202-208.

Data may thus be communicated between the master node 200 and the secondary nodes 202-208. It will be understood that data may be communicated from the secondary nodes 202-208 to the master node 200 in a similar way. It will also be understood that data may be communicated between secondary nodes 202-208 in a similar way. It will also be understood that the data need not comprise a command, and that it may comprise data such as sensor data.

It will be understood that the secondary nodes 202-208 can equally transmit FIND commands to other nodes 200-208 in order to find nodes 200-208 from which they have not received calibration signals.

Although not discussed explicitly above, it will be understood that, preceding (or succeeding) each data or command transmission, the respective transmitting node 200-208 may transmit calibration signals in the frequency bands being used for data transmission. Alternatively, as discussed above, the calibration and data or command signals may be transmitted simultaneously with each other, in which case they may be encoded based on different (e.g. orthogonal codes) such that they can be discriminated from each other. As discussed, this allows the receiving node, which may store predetermined calibration signals on which the calibration signals are based, to determine a calibration function depending thereon and to process the data signals in accordance with the calibration function to account for the effects of the communication channel.

The determining of suitable frequency bands for data communications between the nodes may be repeated periodically. Additionally or alternatively, the determining of suitable frequency bands for data communications between the nodes may be repeated when it is determined that the frequency bands being used for communications are no longer suitable or are at least sub-optimal. For example, as discussed above, the payload data signals transmitted between the nodes 200-208 may comprise predetermined reference data, such as a predetermined bit sequence, which can be recovered by the receiving node to determine the suitability of the frequency bands used for data communication as discussed above. Thus, the receiving node 200-208 can determine if a frequency band is no longer suitable or at least sub-optimal and trigger the determining of suitable frequency bands depending thereon.

Although in the topology shown in FIG. 16 the nodes are distributed along the length of a communication channel having a single branch, it will be understood that the topology may alternatively have a plurality of branches. For example, the topology may have one or more nodes which are communicatively coupled with a plurality of other nodes by way of separate discrete paths along the communication channel. For example, in the topology of FIG. 17, a master node 300 may be connected to a first secondary node 302 which may be directly vertically beneath the master node 300. The first secondary node 302 may be connected to second and third secondary nodes 304, 306 which may be vertically beneath the first secondary node 302 and laterally offset therefrom in different directions, the second and third secondary nodes 304, 306 being connected to the first secondary node 302 by separate discrete paths 308, 310. The third secondary node 306 may be connected to a fourth secondary node 312 which may be directly vertically beneath the third secondary node 306. The nodes 300, 302, 304, 306, 312 may communicate with each other in a similar way to the nodes 200-208 of FIG. 16, including determining suitabilities of frequency bands for data communications with each other by way of the communication channel.

Figure 17:
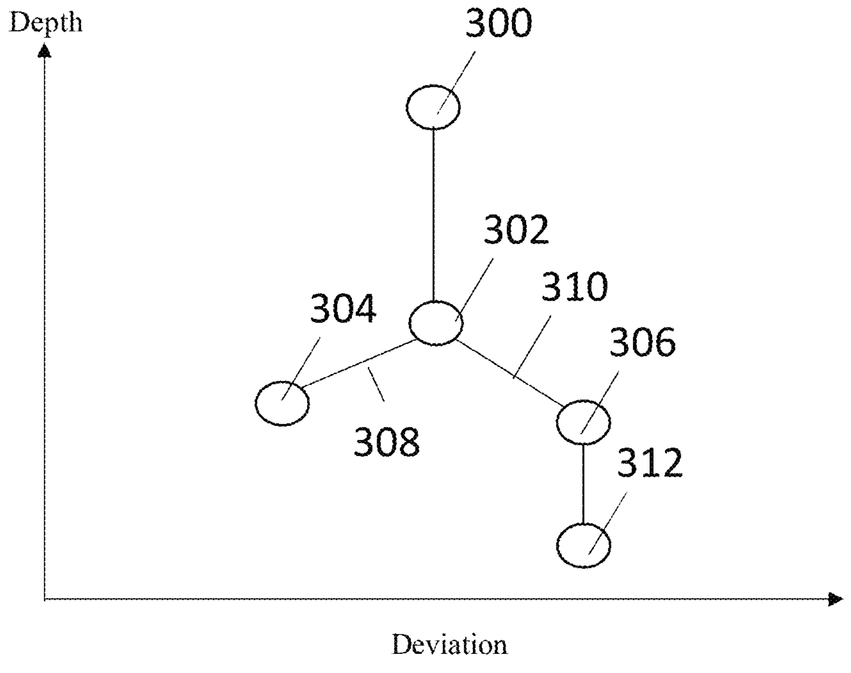
FIG. 17 is a plot of depth verses lateral deviation for an alternative topology of downhole communications nodes comprising parallel branches.

The topology of FIG. 17 may represent a multilateral well profile comprising a pair of branches which split from the main backbone of the topology extending between nodes 300 and 302 at splitter node 302. Data may be captured and communicated to nodes 300, 302 from in-well equipment below node 302, for example, from equipment in one or more or each of the branches extending downwards from node 302 (e.g. the branches between nodes 302 and 304, between node 302 and node 306 or 312). In the example of FIG. 17, there is a single well-head corresponding to node 300. However, different topologies may be provided in which there are a plurality of interconnected nodes under a plurality of well-heads. The nodes of the topology which communicate with each other using the methodologies described herein may be part of an interconnected telemetry network across different bores and different well-heads.

It may be that one or more of the nodes of the topology, such as node 302 of FIG. 17, comprises a collector node which is configured to transmit data between the master node and one or more other nodes, such as any one or more of nodes 304, 306, 312, one or more of which may form part of another telemetry network. The one or more other nodes 304, 306, 312 may be coupled to downhole equipment such as one or more downhole sensors. The said another telemetry network may be based on a different communication channel from the communication channel between the collector node and a master node. The said another telemetry network may be based on a different communication type from the telemetry network between the collector node and the master node. Thus, it may be that the master node and the collector node form at least part of a backbone of an interconnected telemetry network comprising a plurality of different telemetry network types. For example, the telemetry network between the collector node and the master node may be a first type of telemetry network, such as an acoustic telemetry network, in which nodes communicate by signals or waves of a first type, such as acoustic signals or waves, while the telemetry network between the collector node and the one or other nodes may be a telemetry network of a second type different from the first type, such as an electromagnetic telemetry network, in which nodes communicate by signals or waves of a second type, such as electromagnetic signals or waves. Accordingly, the collector node may comprise a plurality of transducers each operable to communicate by way of a different communication type (e.g. by being operable to transmit and/or receive waves of different types). The collector node may be configured to convert signals or waves of a first type received from the master node or from the one or more other nodes to signals or waves of a second type different from the first type and to transmit the communications signals or waves of the second type to the other node(s) or the master node respectively. In this way, different types of telemetry network can be interconnected by the collector node. It may be that the nodes of the first telemetry network, the nodes of the second telemetry network, or the nodes of both the first and second telemetry networks operate in accordance with the methods and apparatus for determining the suitabilities of frequency bands for data communication described herein.

Figure 18:
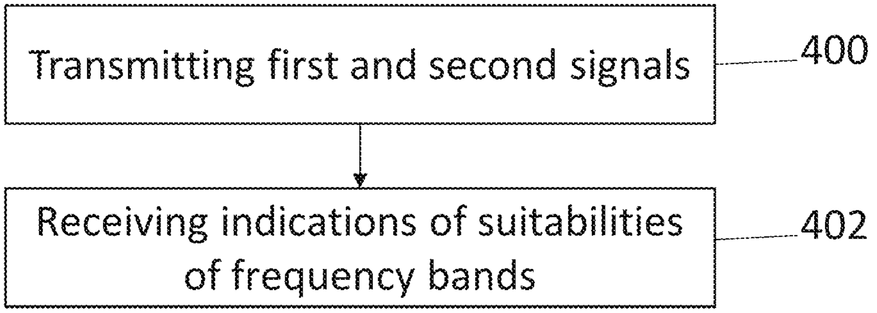
FIG. 18 illustrates a method of determining suitabilities of a plurality of frequency bands for data communication to a node by way of a communication channel.
Figure 19:
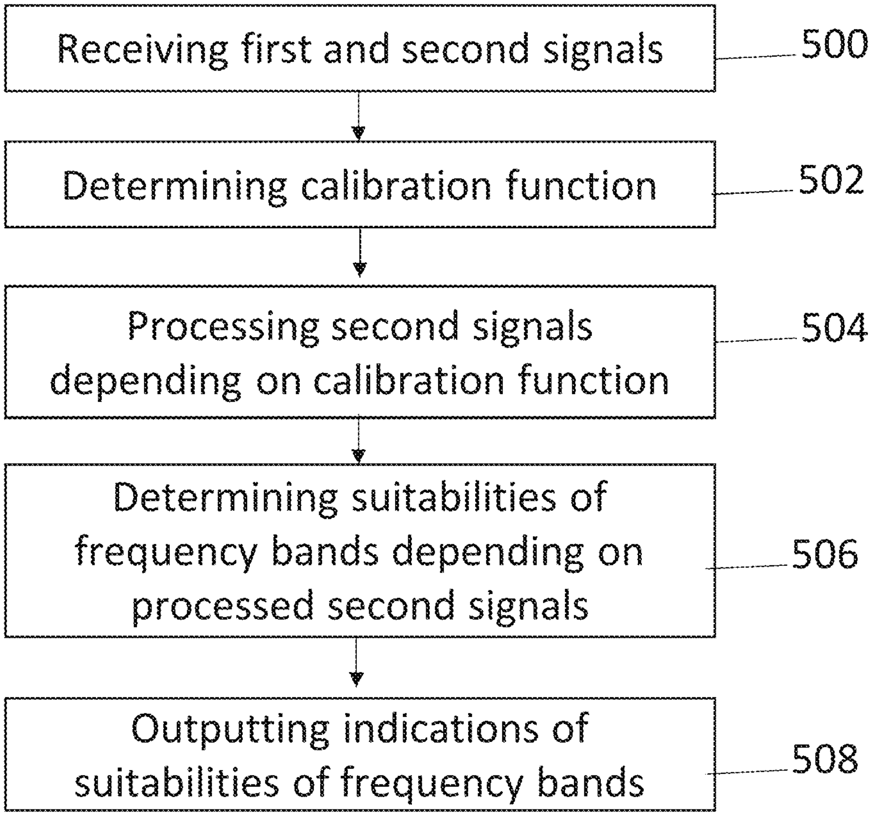
FIG. 19 illustrates a method of determining a suitability of a frequency band for data communication from a node by way of a communication channel.

FIGS. 18 and 19 illustrate methods of determining suitabilities of frequency bands for data communication by way of a communication channel between the first node 110 and the second node 112 of FIG. 1. At 400 of FIG. 18, the method may comprise transmitting for example from the first node 110 to the second node 112 (or vice versa), by way of the communication channel, for each of a plurality of frequency bands, corresponding first and second signals each comprising frequencies in the said frequency band. The first signals may comprise calibration signals which may be known to the second node 112, for example by way of reference data stored in memory of the second node 112, by way of which the second node 112 can determine the effects of the communication channel on signals transmitted from the first node 110 to the second node 112. The calibration signals may comprise chirp signals. The first signals in different frequency bands may be separated (e.g. discrete) from each other in time or they may be sent in parallel with each other. The second signals may be based on predetermined reference data known to the second node 112, for example, by way of reference data stored in memory of the second node 112. As will be described below in respect of FIG. 19, the second node 112 may determine based on the first and second signals the suitabilities of the frequency bands for data communication by way of the communication channel from the first node 110 to the second node 112. The second node 112 may be configured to transmit to the first node 110 indications of the suitabilities of the frequency bands for data communication by way of the communication channel from the first node 110 to the second node 112.

At 402, the method may comprise receiving, by the first node 110 from the second node 112 (or vice versa), indications of the suitabilities of the frequency bands for data communication by way of the communication channel from the first node 110 to the second node 112. The method may further comprise transmitting, by the first node 110 to the second node 112, by way of the communication channel, data signals from the first node 110 to the second node 112 selectively on one or more frequency bands indicated as suitable in the received indications for data communication by way of the communication channel.

By causing the first node 110 to transmit, for each of the said frequency bands, first and second signals each comprising frequencies in the said frequency band, the second node 112 can determine the suitability of the frequency band for data communication from the first node 110 to the second node 112 and transmit to the first node 110 the indication of the suitability of the frequency band for data communication with the first node 110. By receiving the said indication, the first node 110 can determine to selectively transmit payload data signals to the second node 112 on the frequency band if the indication is positive and to selectively not transmit payload data signals to the node on the frequency band if the indication is negative. It will be understood that 400 and 402 may be repeated in the other direction to determine and communicate to the second node 112 suitabilities of frequency bands for data communication from the second node 112 to the first node 110. It will also be understood that 400 and 402 may be repeated over time, in either or both directions, to determine updated suitable frequency bands. In this case, the method may further comprise transmitting payload data signals selectively on the updated suitable frequency bands.

The method of FIG. 19 may comprise at 500 receiving, by the second node 112 from the first node 110 (or vice versa), by way of the communication channel, in each (or at least one or more) of the said frequency bands, the first and second signals. At 502, the method may comprise determining, by the second node 112 from the received first signals, calibration functions for each of the said frequency bands, for example by correlating the first signals with known calibration signals to pulse compress the first signals, transforming the pulse compressed first signals into the frequency domain to obtain passband amplitude responses in the respective frequency bands and taking the reciprocal of the passband amplitude responses of the pulse compressed first signals to determine the respective calibration functions. At 504, the method may comprise processing, by the second node 112, the received second signals in dependence on the calibration functions, for example by decoding, e.g. pulse compressing, the second signals, for example by correlating the second signals by stored reference signals on which the second signal is based, and convolving the decoded, e.g. pulse compressed, second signals with the calibration functions.

At 506, the method may comprise determining, by the second node 112, the suitabilities of the frequency bands for data communication by way of the communication channel from the first node 110 to the second node 112. For example, the respective second signals may each be based on predetermined reference data and the second node 112 may determine the quality of predetermined reference data recovered from the received (e.g. decoded) second signals processed depending on the calibration functions based on comparison of the recovered predetermined reference data to stored predetermined reference data on which the second signal is based. The second node 112 may determine the suitabilities of the frequency bands for data communication from the first node 110 to the second node 112 by way of the communication channel depending on the determined qualities. At 508, the method may comprise outputting, by the second node, indications of the suitabilities of the frequency bands for data communication from the first node 110 to the second node 112 by way of the communication channel, for example to a memory of the second node 112 or directly to a transceiver of the second node 112 for transmission to the first node 112. The method may comprise transmitting, from the second node 112 to the first node 110, the indications of the suitabilities of the frequency bands for data communication from the first node 110 to the second node 112 by way of the communication channel. Depending on the determinations, the second node 112 may selectively process payload data signals from the first node 110 in one or more frequency bands determined to be suitable for data communication from the first node 110 to the second node 112. The second node 112 may selectively discard payload data signals from the first node 110 in frequency band(s) determined not to be suitable for data communication from the first node 110 to the second node 112. The first node 110 may selectively transmit data signals to the second node 112 on one or more frequency bands indicated to be suitable for data communication from the first node 110 to the second node 112 by way of the communication channel.

By determining the suitabilities of the frequency bands for data communication from the first node 110 to the second node 112 by way of the communication channel depending on the second signals comprising predetermined reference data processed depending on the calibration functions determined depending on the first signals, more accurate determinations of the suitabilities of the frequency bands for data communication can be determined at least because the qualities of the processed second signals provide an accurate indication of the qualities of the communications channel for data communication in the respective frequency bands. This in turn allows more reliable communication between the nodes and higher data rates to be achieved.

It will be understood that 500-508 may be repeated in the other direction to determine and communicate to the second node 112 suitabilities of frequency bands for data communication from the second node 112 to the first node 110. It will also be understood that 500-508 may be repeated over time, in either or both directions, to determine updated suitable frequency bands. In this case, the method may further comprise processing data signals selectively on one or more updated suitable frequency bands in dependence on the determined updated suitable frequency bands.

Although the methods of FIGS. 18, 19 are described above in respect of a plurality of frequency bands, the methods of FIGS. 18, 19 may alternatively be performed in respect of an individual or single frequency band. Although the methods of FIGS. 18, 19 are described above with respect to the communication direction from the first node 110 to the second node 112, it will be understood that the methods of FIGS. 18, 19 are equally applicable to the communication direction from the second node 112 to the first node 110.

Although the methods of FIGS. 18, 19 are described above in respect of first and second signals, it will be understood that calibration and payload data signals may be communicated between nodes in the ways set out with reference to 400 of FIG. 18 and 500-504 of FIG. 19. In this case, the processed data signals (which would take the place of the second signals) may be used for an operational purpose (e.g. related to drilling), or logged, for example, rather than being used to determine suitabilities of frequency bands for data communication between the nodes by way of the communication channel.

Although in the above description the example first, or calibration, signals are encoded based on chirp signals, it will be understood that this is not necessarily the case. For example, the calibration signals transmitted by the transmitting node may alternatively be encoded based on an alternative suitable code such as another type of spread spectrum code, such as a direct sequence spread spectrum chip code or a frequency hopping spread spectrum sequence. The spread spectrum codes may be known to the receiving node, for example by way of reference data stored in memory of the receiving node. The code may be time variant. Similarly, although the example second, predetermined reference data, or payload data signals may be encoded based on chirp signals, it will be understood that this is not necessarily the case. The second, predetermined reference data or payload data signals may comprise data encoded by any alternative suitable code such as another spread spectrum code, such as a direct sequence spread spectrum chip code or a frequency hopping spread spectrum sequence. It may be that the code is a time variant code. For example, the second or predetermined reference data signals transmitted by the transmitting nodes may comprise predetermined bit sequences encoded by an alternative suitable code such as another spread spectrum code, such as a direct sequence spread spectrum chip code or a frequency hopping spread spectrum sequence. It may be that the code is time variant. It may be that the codes are known to the receiving nodes.

As discussed above, in each of one or more of the frequency bands of the communication channel, the processing circuitry 140 of the first node 110 may cause the transceiver 142 thereof to transmit a first signal or calibration signal and a second signal, predetermined reference data signal or data signal to the second node 112. It may be that the first and second signals, or calibration and data signals, do not overlap each other in the time domain. The transceiver 142 of the second node 112 may receive the first and second or calibration and data signals. The processing circuitry 140 of the second node 112, which is in communication with the transceiver, may process the first or calibration signal to determine a calibration function and process the second or data signal in dependence on the calibration function. The calibration function may be dependent on the effects of the communication channel on the calibration signal. The first and second signals or calibration and data signals may be sent by the first node 110 at a similar time to each other (e.g. the calibration signal may be sent just before or just after the corresponding data signal) such that the transfer function of the communication channel is unlikely to have changed between propagation of the first and second signals or calibration and data signals over the communication channel, and the processing of the second or data signal in dependence on the calibration function generally takes into account the current characteristics of the transfer function of the communication channel between the first and second nodes 110, 112. Thus, the first and second or calibration and data signals may be transmitted or received within a time period such that the calibration functions derived from the calibration signals may take into account the characteristics of the transfer function of the communication channel between the first and second nodes 110, 112 as experienced by the second or data signals. In order to provide the calibration and data signals with greater immunity to the noise levels of the channel, it may be that the first and second or calibration and data signals depend on respective codes. For example, it may be that the first and second signals comprise calibration and predetermined reference data encoded depending on respective codes, or the calibration and data signals comprise calibration and payload data respectively encoded depending on respective codes. The calibration data encoded in the calibration signal may comprise data known to the receiving node. The calibration data encoded in the calibration signal may comprise a constant or time varying amplitude, which may be known to the receiving node. The payload data encoded in the data signal may comprise a bit sequence or a waveform, for example that may be understood by the receiving node. The codes on which the first and second or calibration and data signals depend may be time variant codes. The codes may be spread spectrum codes such as any of: chirp codes; linear chirp codes; non-linear chirp codes; direct sequence spread spectrum codes; frequency hopping spread spectrum sequences.

As discussed above, for each of the frequency bands, the respective first or calibration signal may comprise or consist of a plurality of signal frequencies within the frequency band. The first or calibration signal frequencies may span at least 70%, at least 80%, at least 90%, at least 95% or 100% of the respective frequency band. For example, the first or calibration signal may comprise a chirp signal such as an up-chirp or down-chirp which sweeps at least 70%, at least 80%, at least 90%, at least 95% or 100% of the respective frequency band. For each of the frequency bands, the second or data signal may comprise or consist of a plurality of signal frequencies within the respective frequency band. It may be that the second or data signal frequencies span at least 50%, at least 70%, at least 80%, at least 90%, at least 95% or 100% of the respective frequency band. It may be that, for each of the frequency bands, the second or data signal is based on one or more chirps which at least together sweep at least 50%, at least 70%, at least 80%, at least 90%, at least 95% or 100% of the respective frequency band. It may be that, for each of the said frequency bands, the frequency range spanned by the signal frequencies of the second or data signal at least partially overlaps the frequency range spanned by the corresponding signal frequencies of the first or calibration signal. It may be that, for each of the said frequency bands, the frequency range spanned by the second or data signal frequencies overlaps at least 50%, at least 70%, at least 80%, at least 90%, at least 95% or 100% of the respective frequency range spanned by corresponding first or calibration signal frequencies.

In the above described examples, the second signals, predetermined reference data signals and the payload data signals received by the receiving node may be processed or decoded based on codes stored in memory 144 of the receiving node, and the first signals and calibration signals may be processed or decoded based on predetermined calibration signal(s), or predetermined calibration data from which the predetermined calibration signal(s) are derivable, stored at a memory 144 of the receiving node. It may be that different codes and different respective predetermined calibration signals or data are stored for each of the respective frequency bands, for example to account for the respective calibration signals being in different frequency bands. This processing or decoding may remove the dependency of the processed calibration signal on its respective code, and may remove the dependency of the second or data signals on its respective code. The processing circuitry 140 of the second node 112 may determine a calibration function based on the processed or decoded received calibration signal, for example by obtaining an inverse of a frequency domain representation of the processed received calibration signal. The calibration function in this case does not depend on the code on which the calibration signal depends. The second node 112 may further process the processed received data signal in dependence on the calibration function determined for that band from the corresponding calibration signal to thereby take into account the effect of the communication channel on the data signal. This first approach thus requires that the second node 112 has knowledge of the codes on which the first and second or calibration and data signals transmitted by the first node 110 depend. However, in some circumstances, it can be advantageous for the first node 110 to modify the codes on which the first and second or calibration and data signals depend, for example to selectively pre-emphasise signals in particularly noisy or lossy frequency bands. This will be explained in more detail below. In those circumstances, by the above approach, the first node 110 would need to communicate the modified codes to the second node 112 to enable the second node 112 to process the first and second or calibration and data signals. This would require additional data signals to be successfully transmitted from the first node 110 to the second node 112 in order to communicate the modified codes used by the first node 110 to the second node 112. This is undesirable, particularly in a downhole communication environment, where computational resources and data rates are limited. Accordingly, the processing circuitry of the nodes 110, 112 may alternatively be configured to adopt an alternative approach as discussed below.

As above, in each of one or more of the frequency bands of the communication channel, the processing circuitry 140 of the first node 110 may cause the transceiver 142 thereof to transmit a first signal or a calibration signal and a second signal or a data signal such as a payload data signal to the second node 112. The following discussion will refer to first and second signals, but it will be understood that it is equally applicable to calibration and predetermined reference data signals or calibration and data (e.g. payload data) signals respectively.

The first and second signals may each depend on a common code (that is, the first and second signals may depend on a code in common with each other). It may be that the first and second signals are discrete from each other in the time domain. It may be that the first and second signals do not overlap each other in the time domain. The first signal may be encoded based on the common code. The second signal may be encoded based on the common code. The first signal may comprise calibration data encoded based on the common code; the second signal may comprise predetermined reference data (or payload data signals may comprise payload data) encoded based on the common code. The common code may be, for example, a spread spectrum code, such as any of: a chirp code; a linear chirp code; a non-linear chirp code; a direct sequence spread spectrum code; a frequency hopping spread spectrum sequence.

For example, the common code may comprise or consist of a chirp code sweeping at least a portion of the (or the entire) respective frequency band. As discussed above, the second signals or data signals may comprise a bit sequence generated by way of on/off keying. In this case, it may be that the chirp code represents a binary '1' in the encoded bit sequence of the encoded predetermined reference data (or a binary '1' in an encoded payload data bit sequence), and the absence of a (or that) chirp signal represents a binary '0' in the encoded predetermined bit sequence of the second signal. For each of the frequency bands, the chirps representing the binary '1's of the second signal may be offset from each other in the time domain, but they may (e.g. significantly) overlap each other in the time domain when transmitted. It may be that the first signal comprises the same chirp code, for example at a known constant or time-varying amplitude.

Figure 21:
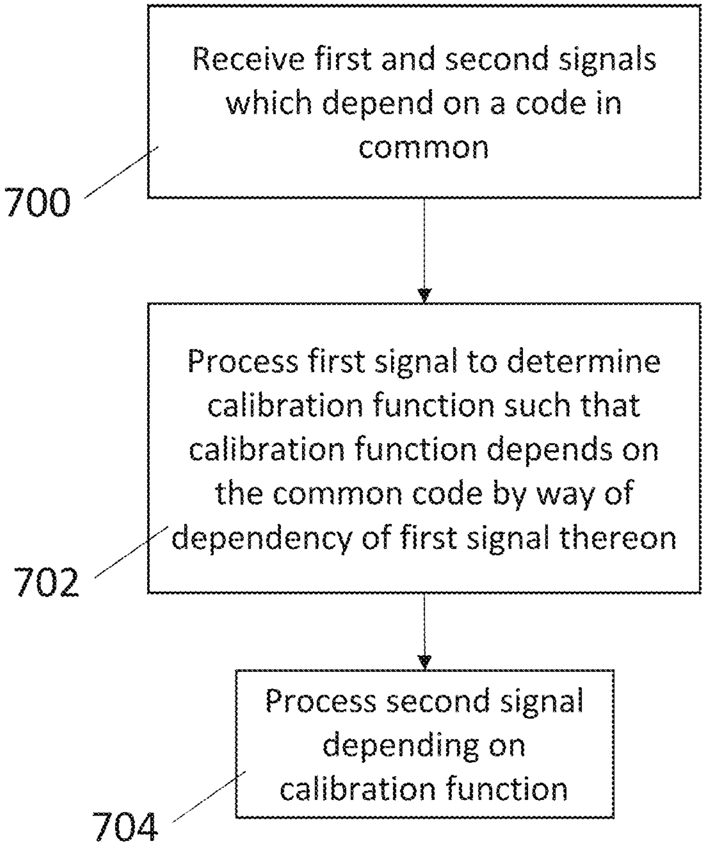
FIG. 21 shows a flow chart illustrating a method of receiving communications signals.

Referring to FIG. 21, at 700 the second node 112 may receive from the first node 110 by way of the communication channel, in each of one or more frequency bands of the communication channel, the respective first and second signals, for example at different times from each other (e.g. one just before the other). At 702, the processing circuitry 140 of the second node 112 may process, for each of the said frequency bands, the respective first signal to determine a respective calibration function. As mentioned above, the respective first signal may depend (e.g. may be encoded based) on a code in common with the corresponding second signal. It may be that the processing circuitry 140 of the second node 112 processes the respective first signal to determine the calibration function. It may be that the processing circuitry 140 of the second node 112 processes the respective first signal to determine the calibration function, such that the calibration function depends on the code by way of the dependency of the first signal thereon. It may be that the processing circuitry 140 of the second node 112 processes the respective first signal to determine the calibration function without removing the dependency of the received first signal on the common code, such that the calibration function depends on the code by way of the dependency of the first signal thereon. It may be that the calibration function is provided with information for decoding the second signal, such as information concerning the common code, by way of the first signal. It may be that the calibration function is implicitly provided with information concerning the common code for decoding the second signal by way of the first signal. The calibration function may be implicitly provided with the said information in the sense that the common code is not explicitly determined from the first signal, but that information concerning the common code is contained within the calibration function derived therefrom. Thus, the second signal can be decoded without prior knowledge of the common code by processing the second signal depending on the calibration function. For example, it may be that the processing circuitry 140 of the second node 112 determines the calibration function by converting the respective received first signal into the frequency domain without removing the dependency of the first signal on the common code and obtaining an inverse of the frequency domain representation of the received first signal. As above, as the first signal has propagated over the communication channel from the first node 110 to the second node 112, the calibration function obtained in this way also depends on the transfer function of the communication channel in the respective band. It may be that the calibration function comprises a convolution of the first signal, which is dependent on the common code, with the transfer function of the communication channel.

Figure 22:
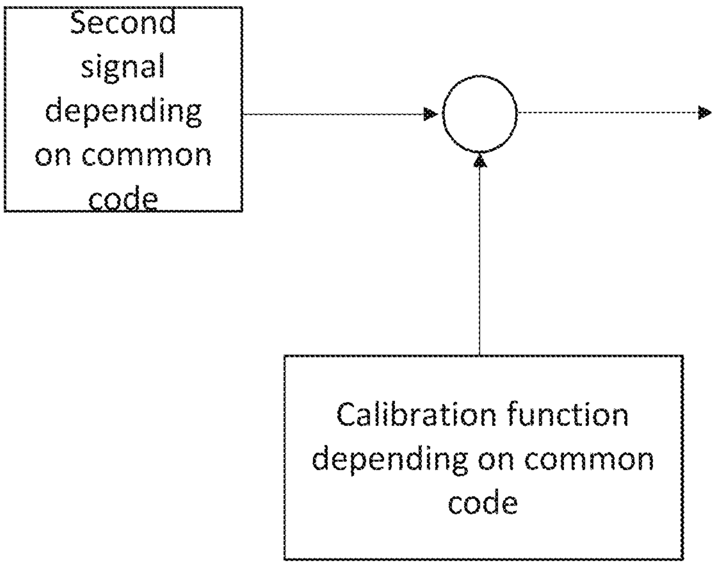
FIG. 22 further illustrates the method of FIG. 21.

At 704, and as also illustrated in FIG. 22, for each of the said frequency bands, the processing circuitry 140 of the second node 112 may process the respective received second signal, without first removing the dependency of the respective second signal on the common code, depending on the corresponding calibration function. For example, the processing circuitry 140 of the second node 112 may process the respective received second signal depending on the calibration function by convolving the respective received second signal with the corresponding calibration function (e.g. by frequency domain multiplication of the frequency domain calibration function with a frequency domain representation of the received second signal). As the calibration function itself depends on the common code, it may be that processing the second signal depending on the calibration function removes the dependency of the second signal on the common code. For example, it may be that processing the second signal depending on the calibration function decodes the second signal to recover the data which was encoded into the second signal by the transmitting node 110. Processing the second signal, which depends on the common code, depending on the calibration function, which also depends on the common code, results in a processed second signal which no longer depends on the common code. In addition, because the first signal also depends on the transfer function of the communication channel in the respective frequency band, processing the second signal depending on the calibration function also takes into account the effects of the communication channel on the second signal. Thus, processing the second signal depending on the calibration function may also equalise or whiten the effects of the communication channel on the second signal. This results in a more accurate recovery of the second signal.

It will be understood that, as mentioned above, the above approach is applicable for a number of different types of code, including spread spectrum codes such as chirp codes; linear chirp codes; non-linear chirp codes; direct sequence spread spectrum codes; frequency hopping spread spectrum sequences. For example, as described above, the dependency of a second signal on a chirp based code may be removed by correlating the second signal with the known chirp code to thereby pulse compress it. By convolving the received second signal with a calibration function which depends on the inverse of the code convolved with the transfer function, such a correlation may thereby be achieved whilst also equalising or whitening the effects of the communication channel on the second signal. Similar reasoning applies to other spread spectrum code such as direct sequence spread spectrum functions and frequency hopping spread spectrum functions.

This alternative approach is more computationally efficient because less processing is required at the second node 112. For example, the first and second signals do not have to be separately correlated with stored reference functions. That is, determining the calibration function does not require correlation operations. This reduces the number of correlation operations, thereby reducing the quantity of processing, performed at the second node 112. This is of particular benefit in a downhole telemetry system in which processing capabilities of the receiving node may be limited. In addition, any changes in the common code do not need to be communicated from the transmitting node to the receiving node for the receiving node to be able to decode the second signals. Therefore, the common code can be changed by the transmitting node without an increased communication overhead. This is also of particular benefit in a downhole telemetry system in which communication bandwidths are relatively low.

Figure 23:
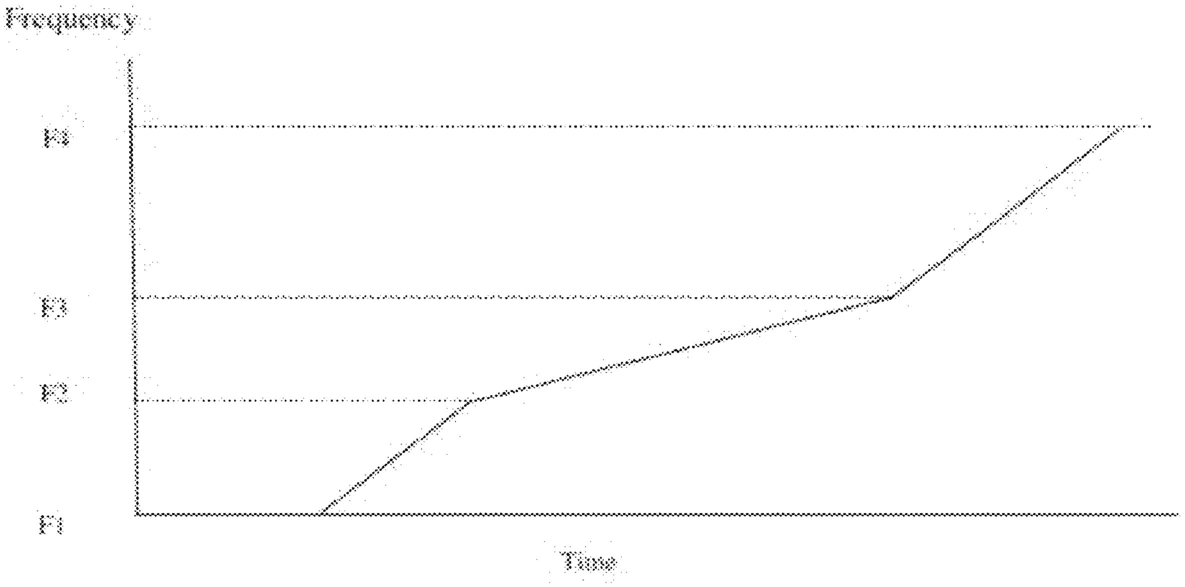
FIG. 23 illustrates an extension of a time bandwidth product of a chirp pulse.

It may be that first and second signals within different frequency bands and propagating along the communication channel may experience different levels of noise or attenuation from each other at a given time, for example due to the dynamically changing transfer function of the communication channel. To address this, the processing circuitry 140 of the first node 110 may selectively pre-emphasise first and second signals in frequency bands exposed to greater levels of noise, attenuation or noise and attenuation than other frequency bands, for example by selectively modifying the codes on which they depend, to improve the signal to noise ratios of signals in those bands at the receiving node 112. For example, in one or more frequency bands exposed to greater levels of noise, attenuation or noise and attenuation than other frequency bands, pre-emphasis may be selectively performed by selectively increasing the time bandwidth product of a code (e.g. a chirp function) on which the first and second signals in one or more bands depend. An example of a chirp with a pre-emphasised time bandwidth product in a particular frequency band (in this case in particular in the frequency band between F2 and F3) as compared to other frequency bands is shown in FIG. 23.

In the event that pre-emphasis is performed at the first node 110 to account for increased noise levels in a particular frequency band, this may be accounted for at the second node 112 by the processing circuitry 140 thereof correlating the received data signals with correspondingly de-emphasised reference signals. In this case, by the first approach discussed above, the second node 112 may require prior knowledge of the pre-emphasised code in order to be able to process the received signals based on a correspondingly de-emphasised reference signal.

It may be that the first node 110 is configured to determine whether first and second signals should be selectively pre-emphasised in any of the frequency bands of the communication channel, for example to increase signal to noise ratios in frequency bands more exposed to noise, attenuation or noise and attenuation than the others, for example as part of a calibration sequence such as part of a calibration sequence (e.g. a dedicated calibration sequence or a calibration based on predetermined reference data in a preamble, mid-amble or post-amble of a payload data signal) discussed above. For example, for a dedicated calibration sequence transmitted from the first node 110 to the second node 112, the second node 112 may be configured to determine qualities of the processed second signals in the respective bands. For example, the second node 112 may be configured to determine qualities of respective second signals processed depending on the corresponding calibration functions in the respective bands by determining respective signal to noise ratios of the processed second signals in the respective bands. As discussed above, the second node 112 may be configured to transmit indications of the suitabilities of the frequency bands for data communication from the first node 110 to the second node 112 by way of the communication channel. It may be that the indications of the said suitabilities of the respective bands comprise binary indications as to whether the respective bands are open for data communication from the first node 110 to the second node 112. Similarly, the second node 112 may be configured to output indications of the qualities of the respective frequency bands for data communication from the first node 110 to the second node 112 as determined by the second node 112, for example based on the determined signal to noise ratios in the respective bands.

It may be that the indications of the suitabilities and qualities of the respective frequency bands for data communication from the first node 110 to the second node 112 are communicated by way of a payload data signal comprising an encoded bit sequence to be transmitted by the second node 112 to the first node 110 by way of the communication channel. As above, the meaning of the bit sequence may be known to the first node 110 for example by way of reference data such as a lookup table stored in memory 144 of the first node 110. It may be that the indications of the suitabilities and qualities of the respective frequency bands for data communication from the first node 110 to the second node 112 are provided by way of a quality indication for each of the said bands, the quality indication being indicative of both the quality and the suitability of the frequency band for data communication from the first node 110 to the second node 112. Alternatively, discrete, encoded bit sequences may be transmitted by the second node 112 to the first node 110 in order to communicate the indications of the suitabilities and qualities of the frequency bands for data communication from the first node 110 to the second node 112 respectively. The encoded bit sequence(s) communicating from the second node 112 to the first node 110 the suitabilities and qualities of the frequency bands for data communication from the first node 110 to the second node 112 may be provided in payload data signals in each of the frequency bands of the communication channel, or in one or more frequency bands previously determined to be suitable for data communication from the second node 112 to the first node 110. The payload data signals may be preceded or followed by calibration signals in the corresponding frequency bands so that the effects of the communication channel can be equalised from the payload data signals by the first node 110.

The first node 110 may be configured to receive the indications of the quality and suitability of the frequency bands for data communication to the second node 112 based on the calibration sequence and to transmit a new calibration sequence comprising new first and second signals to the second node 112 in which first and second signals in one or more frequency bands indicated to be unsuitable for data communication by way of the communication channel from the first node 110 to the second node 112 are selectively pre-emphasised. As above, the first signal may comprise a calibration signal. The second signal may comprise a predetermined reference data signal comprising predetermined reference data. The quality indications may indicate one or more of the frequency bands which are more prone to noise or attenuation or to both noise and attenuation than others, and the first node 110 may be configured to selectively pre-emphasise first and second signals in those bands. It may be binary as to whether pre-emphasis is to be applied to first and second signals in a frequency band or not, or it may be that different levels of pre-emphasis may be applied (e.g. one or more intermediate pre-emphasis levels may be selectable between no pre-emphasis and a maximum level of pre-emphasis). In the former case, it may be that the indications are binary indications indicating whether the first and second signals in the respective frequency bands are to be pre-emphasised or not. In the latter case, it may be that the quality indications indicate which level of pre-emphasis is to be applied to the first and second signals for each of the said frequency bands (e.g. no pre-emphasis, an intermediate level of pre-emphasis or a maximum level of pre-emphasis). It may be that the first node 110 is configured to selectively pre-emphasise first and second signals in a frequency band depending on the signal to noise ratio determined in that band being less than a threshold signal to noise ratio, on the signal to noise ratio determined in that band being less than the signal to noise ratios in other bands, or on both the signal to noise ratio determined in that band being less than a threshold signal to noise ratio and less than the signal to noise ratios in the other bands.

The first and second signals in a frequency band may be pre-emphasised by adjusting a code (e.g. a common code) on which the first and second signals in that frequency band are to depend, for example by increasing (e.g. from a default value) the value of the time bandwidth product of the code on which the first and second signals in that frequency band are to depend. In the case that different levels of pre-emphasis may be applied, the time bandwidth product of the code on which the first and second signals in that frequency band are to depend may be increased to a different degree depending on the level of pre-emphasis to be applied. Thus, it may be that the code on which subsequent first and second signals depend may be dependent on the indications received from the second node 112 of the quality of the respective frequency band for data communication from the first node 110 to the second node 112 by way of the communication channel.

As indicated above, when pre-emphasis is applied to first and second signals in particular bands, or when the pre-emphasis applied to first and second signals in particular bands is changed, by modifying the code on which the first and second signals depend, it is advantageous to be able to calibrate the second signals using calibration functions derived from the first signals to equalise the effects of the communication channel on the second signals without having to communicate the modified codes between nodes. This is particularly true for downhole environments where available bit-rates are relatively low, and communication efficiency is therefore important.

Thus, the first node 110 can efficiently determine to selectively pre-emphasise first and second signals in different frequency bands depending on the received quality indications. This may lead to a different determination of frequency bands suitable for data communication from the first node 110 to the second node 112 by way of the communication channel and allow increased data rates. In this case, indications of suitabilities and qualities of the frequency bands for data communication from the first node 110 to the second node 112 by way of the communication channel based on the new calibration sequence may be transmitted from the second node 112 to the first node 110. The first node 110 may be configured to selectively transmit calibration and payload data signals to the second node 112 in one or more frequency bands depending on the suitability indications from the new calibration sequence and to selectively pre-emphasise calibration and payload data signals in one or more frequency bands (e.g. in one or more frequency bands indicated to be more prone to noise, attenuation or noise and attenuation than other bands) depending on the quality indications from the new calibration sequence.

Thus, it may be that the common code is a first common code. It may be that the transceiver 142 of the second node 112 is to receive further first and second signals by way of the communication channel, the further first and second signals being based on a second common code different from the first common code. It may be that the further first signal is encoded based on the second common code. It may be that the further second signal is encoded based on the second common code. The second common code may be a modified version of the first common code, for example by selectively modifying a time bandwidth product of the first code in respect of one or more frequency bands more exposed to noise, attenuation or noise and attenuation. The first common code may thus have a time bandwidth product of a first (e.g. non-zero) value and the second common code may thus have a time bandwidth product of a second (e.g. non-zero) value different from the first value. If the updated determination indicates a reduction in quality of the frequency band, it may be that the second value of the time bandwidth product is greater than the first value of the time bandwidth product, while if the updated determination indicates an increase in quality of the frequency band, it may be that the second value of the time bandwidth product is less than the first value of the time bandwidth product. As above, the processing circuitry 140 of the second node 112 may process the further first signal to determine a further calibration function such that the further calibration function depends on the second common code by the dependency of the received further first signal on the second common code, for example by determining the further calibration function based on the received further first signal without first removing the dependency of the further first signal on the second common code. As above, it may be that the further calibration function is provided with information for decoding the further second signal, such as information concerning the second common code, by way of the further first signal. It may be that the further calibration function is implicitly provided with information concerning the second common code for decoding the further second signal by way of the further first signal. The further calibration function may be implicitly provided with the said information in the sense that the second common code is not explicitly determined from the further first signal, but that information concerning the second common code is contained within the further calibration function derived therefrom. The processing circuitry 140 of the second node 112 may then process the received further second signal in dependence on the further calibration function as above, for example to thereby decode the further second signal and to equalise the effects of the communication channel on the further second signal. As discussed above there is no need to separately communicate the modification of the common code from the first node 110 to the second node 112 in this case. Thus, the further second signal can be decoded without prior knowledge of the second common code by processing the further second signal depending on the further calibration function.

Additionally or alternatively, at least for frequency band (s) determined to be suitable for data communication from the first node 110 to the second node 112 by the second node 112 by the calibration sequence, the second node 112 may be configured to determine qualities of the second signals processed in accordance with the corresponding calibration functions in the respective bands, for example by determining respective signal to noise ratios of the processed second signals in the respective bands. The second node 112 may be configured to transmit indications of qualities of the respective frequency bands to the first node 110, for example as part of the encoded bit sequence communicating the suitabilities of those bands to the first node 110 or in an encoded bit sequence discrete therefrom. As above, it may be that the indications of the suitabilities and qualities of the respective frequency bands for data communication from the first node 110 to the second node 112 are provided by way of a quality indication for each of the said bands, the quality indication being indicative of both the quality and the suitability of the frequency band for data communication from the first node 110 to the second node 112. As above, the first node 110 may receive from the second node 112 the indications of the suitabilities of the frequency bands for data communication by way of the communication channel from the first node 110 to the second node 112 and, at least for the frequency bands determined to be suitable for data communication from the first node 110 to the second node 112, the indications of the qualities of the frequency bands for data communication by way of the communication channel from the first node 110 to the second node 112. The first node 110 may selectively transmit calibration and payload data signals to the second node 112 on a frequency band if the indication of the suitability of the frequency band is positive and selectively not transmit data signals to the node on the frequency band if the indication of the suitability of the frequency band is negative. The second node 112 may be configured to selectively process signals in frequency bands indicated to be suitable, and not (e.g. it may selectively discard signals) in frequency bands not determined to be suitable. The first node 110 may be configured to selectively pre-emphasise calibration and payload data signals in one or more frequency bands depending on the received quality indications, for example by modifying the codes on which they depend. The quality indications may indicate one or more of the frequency bands which are more prone to noise or attenuation or to both noise and attenuation than others, and the first node 110 may be configured to selectively pre-emphasise calibration and payload data signals in those bands. It may be binary as to whether pre-emphasis is to be applied to a frequency band or not, or it may be that different levels of pre-emphasis may be applied (e.g. one or more intermediate pre-emphasis levels may be selectable between no pre-emphasis and a maximum level of pre-emphasis). In the former case, it may be that the quality indications are binary indications indicating whether the calibration and payload data signals in the respective frequency bands are to be pre-emphasised or not. In the latter case, it may be that the quality indications indicate which level of pre-emphasis is to be applied to the calibration and payload data signals for each of the said frequency bands (e.g. no pre-emphasis, an intermediate level of pre-emphasis or a maximum level of pre-emphasis). It may be that the first node 110 is configured to selectively pre-emphasise calibration and payload data signals in a frequency band depending on the signal to noise ratio determined in that band being less than a threshold signal to noise ratio, on the signal to noise ratio determined in that band being less than the signal to noise ratios in other bands, or on both the signal to noise ratio determined in that band being less than a threshold signal to noise ratio and less than the signal to noise ratios in the other bands.

As discussed above, the calibration and payload data signals in a frequency band may be selectively pre-emphasised by selectively adjusting a code (e.g. a common code) on which the calibration and payload data signals in that frequency band are to depend, for example by increasing (e.g. from a default value) the value of the time bandwidth product of the code on which the calibration and payload data signals in that frequency band are to depend. In the case that different levels of pre-emphasis may be applied, the time bandwidth product of the code on which the calibration and payload data signals in that frequency band are to depend may be increased to a different degree depending on the level of pre-emphasis to be applied. Thus, it may be that the code on which subsequent calibration and payload data signals depend may be dependent on the indications received from the second node 112 of the quality of the respective frequency band for data communication from the first node 110 to the second node 112 by way of the communication channel. Pre-emphasis (e.g. different levels of pre-emphasis) can be selectively applied by the first node 110 to the first and second signals in one or more frequency bands depending on the quality indications. This allows the signal to noise ratio of signals received by the second node 112 to be selectively increased where the quality indications indicate a quality of signal lower than a threshold or lower than other frequency bands of the communication channel.

It will be understood that, as above, the calibration may be repeated over time, for example periodically or in response to a determination that one or more frequency bands are no longer suitable for data communication from the first node 110 to the second node 112. For example, as discussed above, it may be that payload data transmitted from the first node 110 to the second node 112 comprises data such as a pre-amble, mid-amble, post-amble which comprises predetermined reference data (e.g. waveform or bit sequence) which the second node 112 can be configured to extract from the payload data and compare to corresponding pre-determined reference data stored at memory 144 of the second node 112. If the extracted predetermined reference data matches the stored pre-determined reference data, it may be determined that the frequency band remains suitable for data communication from the first node 110 to the second node 112, otherwise, it may be that the frequency band is no longer suitable for data communication from the first node 110 to the second node 112. It may be that different frequency bands become suitable and unsuitable for data communication from the first node 110 to the second node 112 over time. Additionally or alternatively, different quality indications may be received by the first node 110 in respect of the same frequency bands over time, indicating that for the same frequency band a different level of pre-emphasis should be applied to calibration and payload data signals, or that pre-emphasis should be removed from calibration and payload data signals which were previously pre-emphasised in that frequency band or that pre-emphasis should be applied to calibration and payload data signals in a frequency band in which they were not previously pre-emphasised. Thus it may be that the calibration sequence is repeated to provide the first node 110 with updated indications of suitabilities and qualities of frequency bands for data communication by way of the communication channel from the first node 110 to the second node 112. In this case, the first node 110 may be configured to transmit calibration and payload data signals selectively in one or more frequency bands depending on the updated suitability indications and to selectively pre-emphasise calibration and payload data signals in one or more frequency bands depending on the updated quality indications.

Thus, it may be that the processing circuitry 140 of the first node 110 is to determine a change in the quality of a frequency band for data communication from the first node 110 to the second node 112 (for example by receiving an updated indication of the quality of the frequency band for data communication from the first node 110 to the second node 112 from the second node 112) and to modify the first common code for that band accordingly, for example to remove, modify or apply pre-emphasis in that band by changing the time bandwidth product of the common code, to determine a second common code different from the first common code.

Thus, in the (likely) event that the transfer function of the communication channel changes, it may be that the pre-emphasis applied to calibration and payload data signals by the first node 110 is modified to account for the changes to the transfer function of the communication channel. For example, modified pre-emphasis may be applied to first and second signals in particular frequency bands from that applied previously, pre-emphasis may be removed from first and second signals in particular frequency bands which were previously pre-emphasised or pre-emphasis may be applied to first and second signals in particular frequency bands which previously were not pre-emphasised. The modified pre-emphasis may be applied to first and second signals transmitted by the first node 110 by way of modification of the codes on which they are based. For example, the time bandwidth products of codes (e.g. chirp functions) on which the respective signals in the different frequency bands are based may be modified.

In this case, the modified codes do not need to be communicated from the first node 110 to the second node 112 in order for the second node 112 to be able to process the received first and second or calibration and payload data signals. This is because the processing of the first and second or calibration and payload data signals in this case is not dependent on prior knowledge of the codes on which the first and second or calibration and payload data signals are based, so long as the respective first and second or calibration and payload data signals in each respective frequency band are based on a common code.

As above, it is advantageous to be able to calibrate second or payload data signals using calibration functions derived from calibration signals to equalise the effects of the communication channel on the data signals without having to communicate the updated codes between nodes.

This alternative approach thus may be more flexible and communicatively efficient. The first node 110 can modify the codes on which the respective first and second, calibration and predetermined reference data or calibration and payload data signals are based, for example to account for changes to the transfer function of the communication channel, without having to communicate that change to the second node 112. This is because, as described above, the calibration function can be determined by the second node 112 from the received first or calibration signal without prior knowledge of the common code, the calibration function being dependent on the common code by way of the dependency of the first or calibration signal thereon. This allows the second, predetermined reference data or payload data signal to be processed depending on the calibration function to thereby remove its dependency on the common code, again without prior knowledge of the code on which the second, predetermined reference or payload data signal depends. Thus, the second node 112 can process the first and second, calibration and predetermined reference data or calibration and payload data signals without having prior knowledge of the common code. This approach also allows the transmitting node to change the frequency band on which it is transmitting without having to communicate that information to the receiving node. Thus, a more flexible and communicatively efficient system can be provided because the first node 110 can modify the code on which the first and second, calibration and predetermined reference data or calibration and payload data signals are based, for example to account for changes in the transfer function of the communication channel, the frequency band(s) on which the first node 110 is transmitting, or both without having to communicate with the second node 112 to inform it about the modification to the code or the updated frequency bands. This is of particular benefit when communicating over a downhole communication channel in a downhole telemetry system because available transmission bandwidths and data rates are limited.

As discussed above, the second node 112 may additionally or alternatively transmit data to be received by the first node 110 by way of the communication channel. In this case, it may be that the second node 112 transmits the calibration and data signals, and the first node 110 receives and processes them as discussed above. Depending on which is the transmitting and receiving node, the processed data signal may thus, for example, comprise sensor data, command data, control data, monitoring data, request data or acknowledgement data, such as monitoring, sensor or acknowledgement data from downhole equipment to the surface (e.g. from the downhole equipment via the second node 112 to the first node 110) or command, control or request data from the surface to equipment downhole (e.g. from the first node 110 to the downhole equipment via the second node 112). As discussed above, it may be that the frequency bands suitable for data communication from the first node 110 to the second node 112 may be different from the frequency bands suitable for data communication from the second node 112 to the first node; similarly, it may be that the quality of a frequency band for data communication from the first node 110 to the second node 112 may be different from the quality of that frequency band for data communication from the second node 112 to the first node 110. Accordingly, it will be understood that the above calibration sequence may be repeated in the other direction (i.e. from the second node 112 to the first node 110) to determine and communicate to the second node 112 suitabilities of frequency bands for data communication from the second node 112 to the first node 110 and the qualities of the said bands. The second node 112 may then be configured to transmit selectively on frequency bands determined to be suitable for data communication from the second node 112 to the first node 110. The second node 112 may be configured to selectively pre-emphasise signals in one or more frequency bands depending on the quality indications. Depending on the determinations, the first node 110 may selectively process data signals from the second node 112 in one or more frequency bands determined to be suitable for data communication from the second node 112 to the first node 110. The first node 110 may selectively discard data signals from the second node 112 in frequency band(s) determined not to be suitable for data communication from the second node 112 to the first node 110.

It will also be understood that this calibration sequence may be repeated over time to provide the second node 112 with updated indications of suitabilities and qualities of frequency bands for data communication by way of the communication channel from the second node 112 to the first node 110. In this case, the second node 112 may be configured to transmit calibration and payload data signals selectively on one or more frequency bands depending on the updated suitability indications and to selectively pre-emphasise first and second or calibration and payload data signals in one or more frequency bands depending on the updated quality indications.

Figure 24:
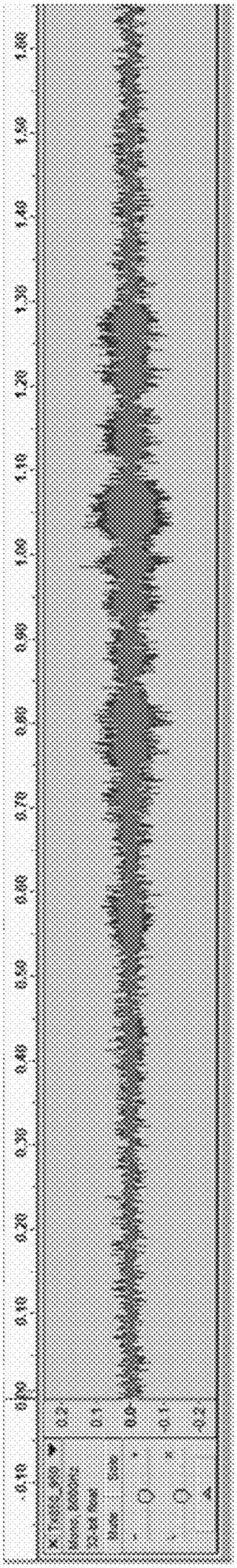
FIG. 24 is a time domain representation of a calibration signal based on a chirp function having propagated along a 1 km long communication channel.
Figure 25:
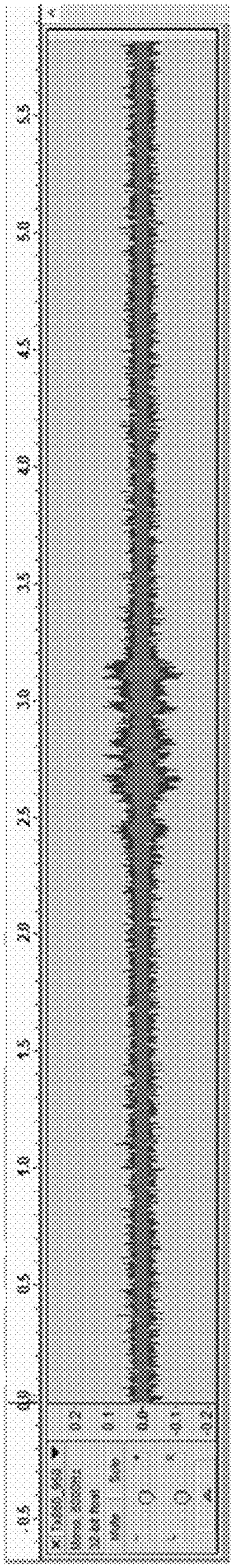
FIG. 25 is a time domain representation of a data signal based on a pair of time offset but overlapping chirp functions having propagated along the same 1 km long communication channel as the signal of FIG. 24.

An example comparison of the first and second approaches will now be described with reference to FIGS. 24 to 32. FIG. 24 shows an example calibration signal received by the second node 112 from the first node 110 by way of a communication channel, which in this case is an acoustic communication channel comprising a 1 km long pipe, the calibration signal being based on a linear chirp spanning a frequency band from 850 Hz to 950 Hz. FIG. 25 shows a data signal comprising a pair of time overlapping chirps, offset in time from each other, each spanning the 850 Hz to 950 Hz frequency band, each based on a chirp function in common with the calibration signal of FIG. 24.

Figure 26:
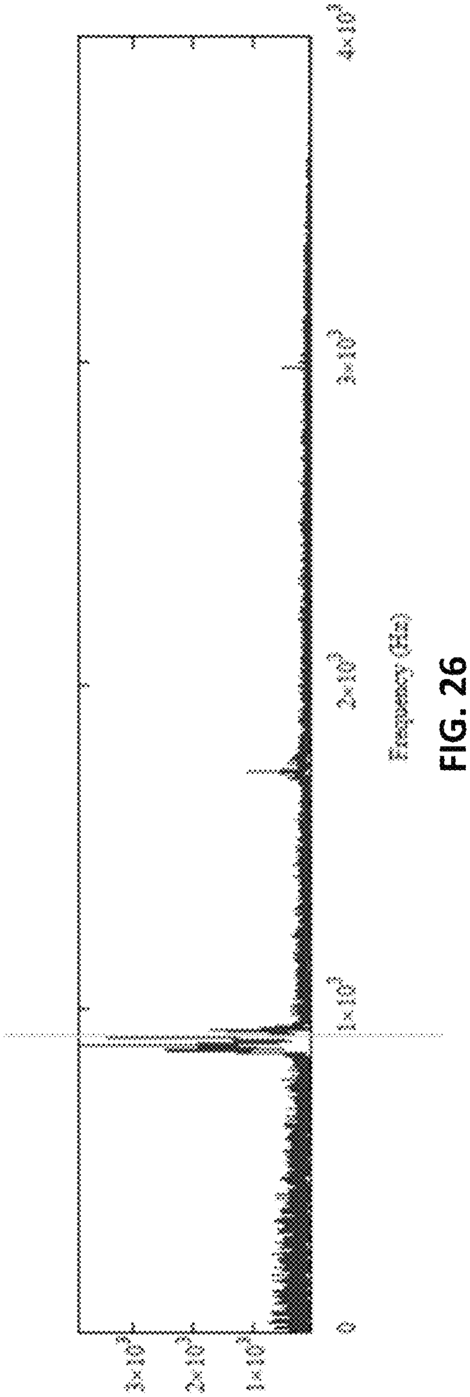
FIG. 26 is a frequency domain representation of the calibration signal of FIG. 24.
Figure 27:
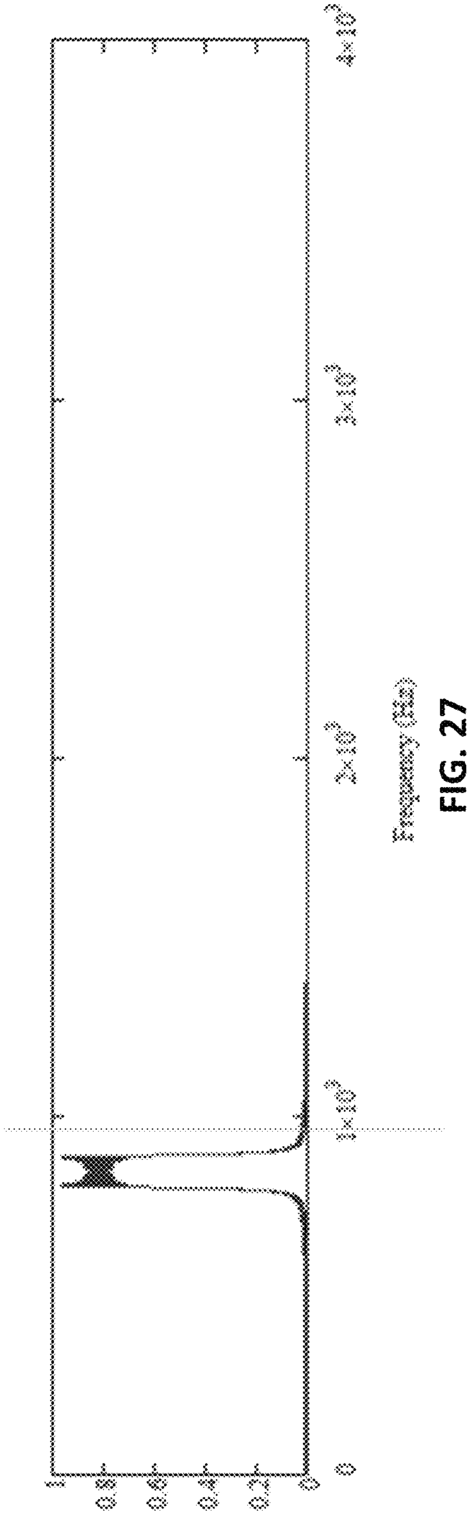
FIG. 27 is a frequency domain representation of a stored reference signal based on the same chirp function as the signal of FIG. 25.
Figure 28:
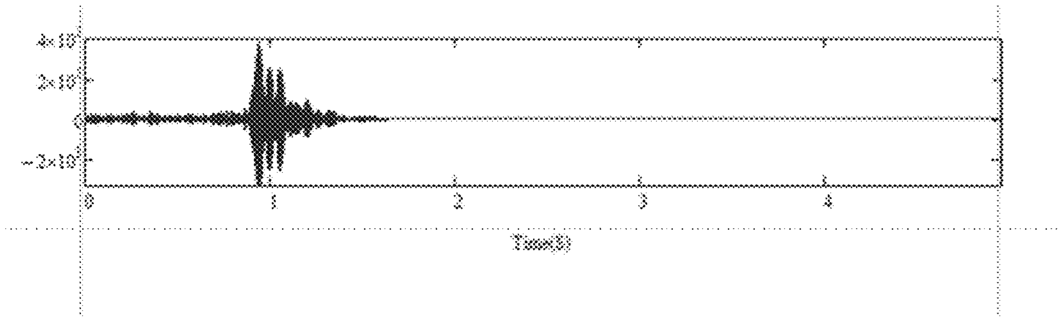
FIG. 28 is a time domain representation of the signal of FIG. 26 multiplied in the frequency domain by the signal of FIG. 27.
Figure 29:
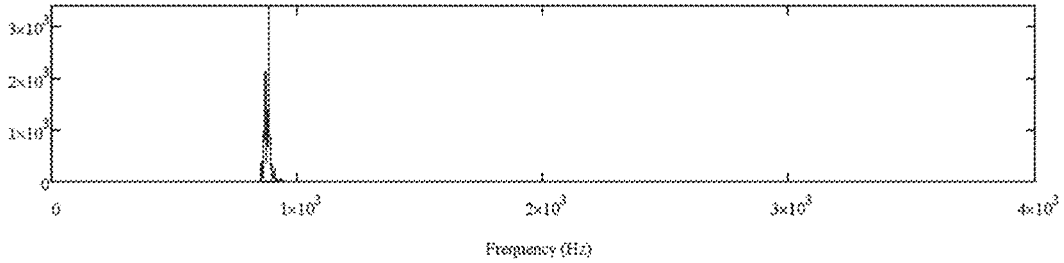
FIG. 29 is a frequency domain representation of the inverse of the complex conjugate of a frequency domain representation of the signal of FIG. 28.

By the first approach described above, the processing circuitry 140 of the second node 112 may convert the calibration signal of FIG. 24 received by the transceiver 142 thereof into the frequency domain (e.g. by performing a fast Fourier transform, FFT, thereon). The frequency domain representation of the calibration signal of FIG. 24 is shown in FIG. 26. The processing circuitry 140 of the second node 112 may then multiply the frequency domain representation of the calibration signal by the complex conjugate of the spectrum of a reference chirp pulse stored in memory 144 thereof, the reference chirp pulse being identical to the chirp pulse on which the calibration signal of FIG. 24 depends. The spectrum of the reference chirp pulse stored in memory 144 is shown in FIG. 27. This multiplication in the frequency domain of the frequency domain representation of the calibration signal and the complex conjugate of the spectrum of the reference chirp pulse is equivalent to correlation in the time domain. The output of the multiplication is a pulse compressed calibration signal illustrated in FIG. 28. The processing circuitry 140 of the second node 112 may then determine the calibration function by determining the inverse of the spectrum of the pulse compressed signal of FIG. 28, which may be provided in the form of a whitening spectrum as shown in FIG. 29. As the effects of the chirp have been removed, this calibration function can be used to whiten or equalise the effects of the communication channel on any signal which has passed through the communication channel.

Figure 30:
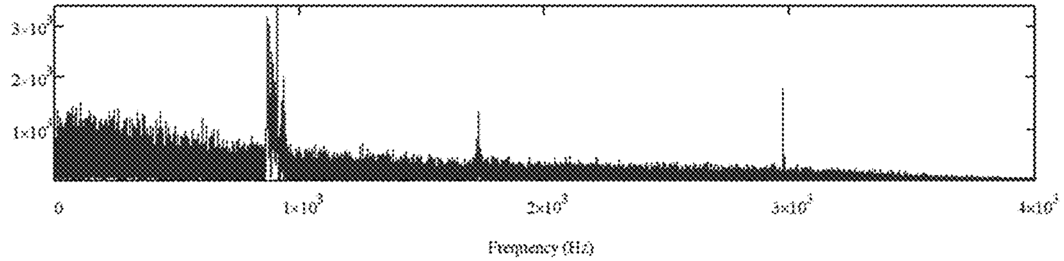
FIG. 30 is a frequency domain representation of the signal of FIG. 25.
Figure 31:
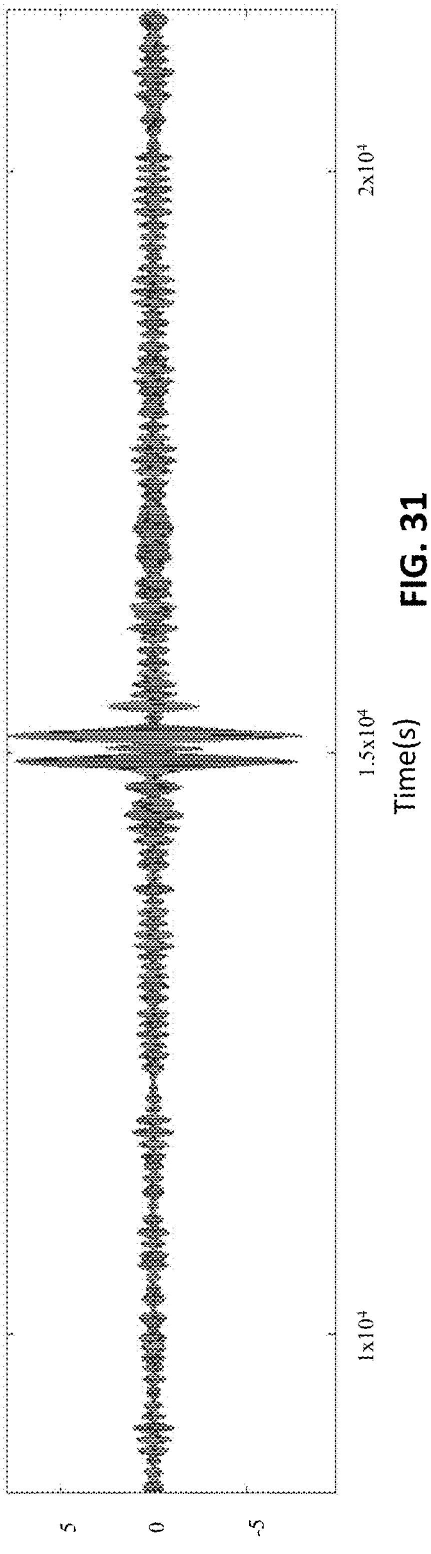
FIG. 31 is a time domain representation of the result of the frequency domain multiplication of the signal of FIG. 30 with the signal of FIG. 27 and the signal of FIG. 29.

Next, the processing circuitry 140 of the second node 112 may convert the received data signal of FIG. 25 into the frequency domain, again for example by performing a fast Fourier transform (FFT) thereon. The frequency domain representation of the received data signal is shown in FIG. 30. The processing circuitry 140 of the second node 112 may further process the frequency domain representation of the received data signal by multiplying it by the frequency domain calibration function of FIG. 29 (equivalent to convolution in the time domain) and by the complex conjugate of the spectrum of the above-mentioned reference chirp pulse stored in memory 144 thereof (equivalent to correlation of the received second signal by the reference chirp pulse in the time domain). The processed frequency domain representation of the received data signal may then be converted back into the time domain, for example by inverse fast Fourier transform (IFFT). The result of the IFFT is shown in FIG. 31. As shown in FIG. 31, the result of the IFFT comprises a pair of peaks corresponding to the pair of chirp signals of FIG. 25.

By the alternative approach discussed above, the processing circuitry 140 of the second node 112 may convert the received calibration signal of FIG. 24 into the frequency domain (e.g. by performing a fast Fourier transform, FFT, thereon) to obtain the signal shown in FIG. 26. The processing circuitry 140 of the second node 112 may then determine the calibration function by determining an inverse of the spectrum of the frequency domain representation of the received calibration signal, without first removing the dependency of the received calibration signal on the common code, such that the calibration function depends on the code by way of the dependency of the calibration signal thereon. As above, it may be that the calibration function is provided with information for decoding the data signal, such as information concerning the common code, by way of the calibration signal. It may be that the calibration function is implicitly provided with information concerning the common code for decoding the data signal by way of the calibration signal. As above, as the calibration signal has propagated over the communication channel, the calibration function may further depend on the transfer function of the communication channel. As above, the calibration function may be provided in the form of a whitening spectrum.

Figure 32:
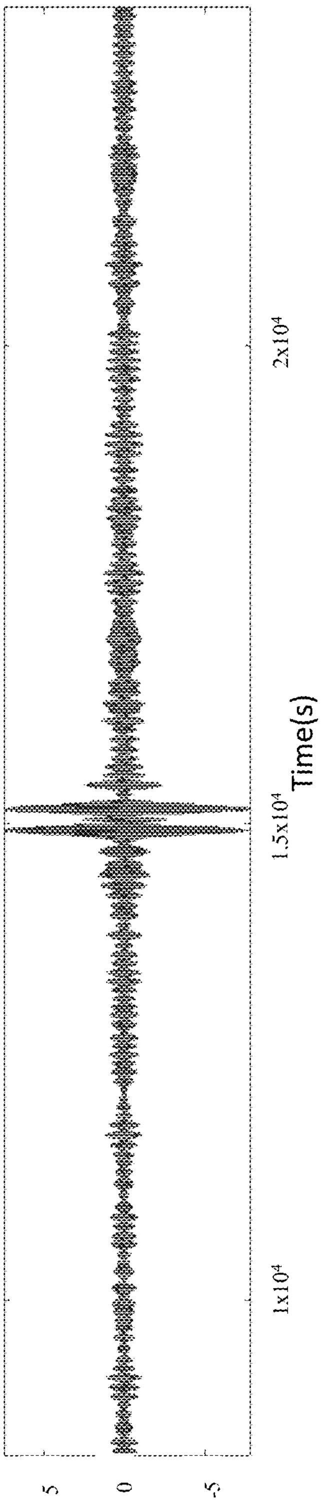
FIG. 32 is a time domain representation of the signal of FIG. 25 processed depending on a calibration function derived from the signal of FIG. 26 without first removing the dependency of the signal of FIG. 26 on the reference signal the spectrum of which is shown in FIG. 27.

Next, as above, the processing circuitry 140 of the second node 112 may convert the respective received data signal of FIG. 25 into the frequency domain, again for example by performing an FFT thereon, to obtain the frequency domain representation of the received data signal shown in FIG. 30. The processing circuitry 140 of the second node 112 may further process the frequency domain representation of the received data signal by multiplying it by the frequency domain calibration function (equivalent to convolution in the time domain). As the calibration function already depends on the common code, there is no separate processing of the respective received data signal depending on a stored code on which the data signal depends. The processed frequency domain representation of the received data signal may then be converted back into the time domain, for example by inverse fast Fourier transform (IFFT). The result of the IFFT is shown in FIG. 32. The signal of FIG. 32 compares favourably with the signal of FIG. 31 and, as with the signal of FIG. 31 comprises a pair of peaks corresponding to the pair of chirp signals of FIG. 25. Thus, the calibration function derived directly from the received calibration signal can be used to both whiten or equalise the effects of the communication channel on the received data signal and remove its dependency on the common code without prior knowledge of the common code at the second node 112. The functionality attributed to the first and second nodes 110, 112 may be performed by the processing circuitry 140 thereof, in combination with the memory 144 and the transceiver 142 thereof where appropriate.

Figure 20:
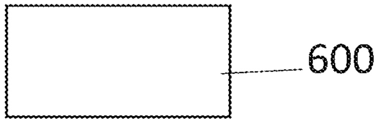
FIG. 20 schematically illustrates a non-transitory computer readable medium storing executable instructions.

As mentioned above, the functionality performed by the processing circuitry of the respective nodes may be implemented in computer software. Accordingly, as shown in FIG. 20, a non-transitory computer readable medium 600 may be provided which stores instructions which are executable by processing circuitry, such as computer processing circuitry, to perform the method of any of FIG. 18, 19, 21, 39 or 40.

Throughout the description and claims of this specification, the words "comprise" and "contain" and variations of them mean "including but not limited to", and they are not intended to (and do not) exclude other components, integers or operations. Throughout the description and claims of this specification, the singular encompasses the plural unless the context demands otherwise. In particular, where the indefinite article is used, the specification is to be understood as contemplating plurality as well as singularity, unless the context demands otherwise. All of the features disclosed in this specification (including any accompanying claims, abstract and drawings), and all of the elements of any method or process so disclosed, may be combined in any combination, except combinations where at least some of such features and/or operations are mutually exclusive. Implementations are not restricted to the details of any foregoing examples.

This disclosure also extends to the subject matter defined in the following numbered clauses.

1. Apparatus for receiving communication signals, the apparatus comprising: a receiver to receive calibration and data signals by way of a communication channel, the calibration and data signals depending on a common code; and processing circuitry communicatively coupled to the receiver, the processing circuitry to: process the received calibration signal to determine a calibration function such that the calibration function depends on the common code by way of the dependency of the received calibration signal on the common code; and process the received data signal in dependence on the calibration function.

2. The apparatus of clause 1 wherein the processing circuitry is to process the received data signal in dependence on the calibration function to thereby decode the received data signal and compensate for effects of the communication channel thereon.

3. The apparatus of clause 1 or clause 2 wherein the processing circuitry is to process the received data signal in dependence on the calibration function to thereby decode the received data signal and compensate for effects of the communication channel thereon without prior knowledge of the common code.

4. An apparatus according to any preceding clause wherein the common code comprises or consists of a spread spectrum code.

5. An apparatus according to clause 4 wherein the spread spectrum code comprises any of: a chirp function; a linear chirp function; a non-linear chirp function; a direct sequence spread spectrum function; a frequency hopping spread spectrum sequence.

6. An apparatus according to any preceding clause wherein the processing circuitry is to process the received calibration signal to determine the calibration function without removing the dependency of the received calibration signal on the common code.

7. An apparatus according to any preceding clause wherein the processing circuitry is to provide an output based on the processed received data signal.

8. An apparatus according to any preceding clause wherein the calibration and data signals are received from a node and have frequencies within a frequency band, wherein the apparatus is to determine a quality of the frequency band of the communication channel for data communication from the node and to transmit an indication of the said quality to the node, and wherein the common code is dependent on the said indication of the said quality.

9. An apparatus according to clause 8 wherein the receiver is configured to receive first and second signals from the node by way of the communication channel, the first and second signals having frequencies within the frequency band; and wherein the processing circuitry is configured to determine a calibration function depending on the first signal, process the second signal depending on the calibration function, determine the quality of the frequency band for data communication with the node by way of the communication channel depending on the processed second signal and cause transmission of the said indication of the said quality to the node.

10. An apparatus according to clause 9 wherein the processing circuitry is configured to determine the said quality by determining a signal to noise ratio of the processed second signal.

11. An apparatus according to clause 9 or clause 10, wherein the processing circuitry is configured to determine the suitability of the frequency band for data communication with the node depending on the processed second signal by comparison of the processed second signal to predetermined reference data.

12. An apparatus according to clause 11 wherein the processing circuitry is configured to determine the said quality depending on a determination that the frequency band is suitable for data communication with the node.

13. An apparatus according to any one preceding clause wherein the common code is a first common code, wherein the receiver is to receive second calibration and data signals by way of the communication channel, the second calibration and data signals being based on a second common code different from the first common code, and wherein the processing circuitry is to: process the second calibration signal to determine a second calibration function such that the second calibration function depends on the second common code by the dependency of the received second calibration signal on the second common code; and process the received second data signal in dependence on the second calibration function.

14. An apparatus according to clause 13 wherein the processing circuitry is to process the received second data signal in dependence on the second calibration function to thereby decode the received second data signal and compensate for effects of the communication channel thereon.

15. An apparatus according to clause 13 or clause 14 wherein the processing circuitry is to process the received second data signal in dependence on the second calibration function to thereby decode the received second data signal and compensate for effects of the communication channel thereon without prior knowledge of the second common code.

16. An apparatus according to any of clauses 13 to 15 wherein the first common code has a time bandwidth product of a first value for frequencies in a or the frequency band and wherein the second common code has a time bandwidth product of a second value different from the first value for frequencies in the frequency band.

17. An apparatus according to clause 16 wherein the first common code comprises a first chirp having a time bandwidth product of a first value for frequencies in the frequency band and wherein the second common code comprises a second chirp having a time bandwidth product of a second value different from the first value for frequencies in the frequency band.

18. An apparatus according to any one of clauses 13 to 17 wherein the value of the time bandwidth product of the first common code is dependent on the determined quality of the frequency band for data communication with the node.

19. An apparatus according to any one of clauses 13 to 18 wherein the apparatus is configured to determine an updated quality of the frequency band of the communication channel for data communication from the node and to transmit an indication of the said updated quality to the node, and wherein second common code is dependent on the said indication of the said updated quality.

20. An apparatus according to clause 19 wherein the value of the time bandwidth product of the second common code is dependent on the said indication of the said updated quality.

21. An apparatus according to any preceding clause wherein the signal frequencies of the calibration signal and the data signal, or wherein the signal frequencies of the second calibration signal and the second data signal, are within a common frequency band.

22. An apparatus according to any preceding clause wherein the receiver is to receive, for each of a plurality of frequency bands, calibration and data signals by way of a communication channel, the calibration and data signals depending on a common code and having signal frequencies in the respective frequency band; and wherein the processing circuitry is to, for each of the plurality of frequency bands: process the respective received calibration signal to determine a respective calibration function such that the respective calibration function depends on the common code by way of the dependency of the respective received calibration signal on the common code; and process the corresponding received data signal in dependence on the respective calibration function.

23. An apparatus according to clause 22 wherein the processing circuitry is to, for each of the plurality of frequency bands, process the corresponding received data signal in dependence on the respective calibration function to thereby decode the received data signal and compensate for effects of the communication channel thereon.

24. An apparatus according to clause 22 or 23 wherein the processing circuitry is to, for each of the plurality of frequency bands, process the corresponding received data signal in dependence on the respective calibration function to thereby decode the received data signal and compensate for effects of the communication channel thereon without prior knowledge of the common code.

25. A method of receiving communication signals, the method comprising: receiving calibration and data signals by way of a communication channel, the calibration and data signals depending on a common code; determining a calibration function based on the received calibration signal such that the calibration function depends on the common code by the dependency of the received calibration function on the common code; and processing the received data signal in dependence on the calibration function.

26. The method of clause 25 wherein processing the received data signal in dependence on the calibration function comprises processing the received data signal in dependence on the calibration function to thereby decode the received data signal and compensate for effects of the communication channel thereon.

27. The method of clause 25 or clause 26 wherein processing the received data signal in dependence on the calibration function comprises processing the received data signal in dependence on the calibration function to thereby decode the received data signal and compensate for effects of the communication channel thereon without prior knowledge of the common code.

28. A method according to any of clauses 25 to 27 comprising determining the calibration function based on the received calibration signal without removing the dependency of the received calibration signal on the common code.

29. A method according to any one of clauses 25 to 28 further comprising providing an output based on the processed received data signal.

30. A method according to any one of clauses 25 to 29 wherein the calibration and data signals are received from a node and have frequencies within a frequency band, wherein the method comprises determining a quality of the frequency band of the communication channel for data communication from the node and transmitting an indication of the said quality to the node, wherein the common code is dependent on the said indication of the said quality.

31. A method according to clause 30 comprising receiving first and second signals from the node by way of the communication channel, the first and second signals having frequencies within the frequency band; determining a calibration function depending on the first signal; processing the second signal depending on the calibration function; determining the quality of the frequency band for data communication with the node by way of the communication channel depending on the processed second signal; and causing transmission of the said indication of the said quality to the node.

32. A method according to clause 31 comprising determining the said quality by determining a signal to noise ratio of the processed second signal.

33. A method according to clause 31 or clause 32 comprising determining the suitability of the frequency band for data communication with the node depending on the processed second signal by comparison of the processed second signal to predetermined reference data.

34. A method according to clause 33 comprising determining the said quality depending on a determination that the frequency band is suitable for data communication with the node.

35. A method according to any one of clauses 25 to 34 wherein the common code is a first common code, wherein the method further comprises: receiving second calibration and data signals by way of the communication channel, the second calibration and data signals being based on a second common code different from the first common code; determining a second calibration function based on the received second calibration signal such that the second calibration function depends on the second common code by the dependency of the received second calibration signal on the second common code; and processing the received second data signal in dependence on the second calibration function.

36. The method of clause 35 wherein processing the received second data signal in dependence on the second calibration function comprises processing the received second data signal in dependence on the calibration function to thereby decode the received second data signal and compensate for effects of the communication channel thereon.

37. The method of clause 35 or clause 36 wherein processing the received second data signal in dependence on the second calibration function comprises processing the received second data signal in dependence on the second calibration function to thereby decode the received second data signal and compensate for effects of the communication channel thereon without prior knowledge of the second common code.

38. A method according to any of clauses 35 to 37 wherein the first common code has a time bandwidth product of a first value for frequencies in a first frequency band and wherein the second common code has a time bandwidth product of a second value different from the first value for frequencies in the first frequency band.

39. A method according to clause 38 wherein the value of the time bandwidth product of the first common code is dependent on the determined quality of the frequency band for data communication with the node.

40. A method according to any of clauses 35 to 39 comprising determining an updated quality of the frequency band of the communication channel for data communication from the node and to transmit an indication of the said updated quality to the node, and wherein second common code is dependent on the said indication of the said updated quality.

41. A method according to clause 40 wherein the value of the time bandwidth product of the second common code is dependent on the said indication of the said updated quality.

42. A method according to any of clauses 25 to 41 comprising, for each of a plurality of frequency bands: receiving calibration and data signals by way of the communication channel, the respective calibration and data signals depending on a common code and having signal frequencies in the respective frequency band; determining a respective calibration function based on the received calibration signal such that the respective calibration function depends on the common code by the dependency of the respective received calibration function on the common code; and processing the corresponding received data signal in dependence on the respective calibration function.

43. A method according to clause 42 wherein, for each of the plurality of frequency bands, processing the corresponding received data signal in dependence on the respective calibration function comprises processing the corresponding received data signal in dependence on the respective calibration function to thereby decode the received data signal and compensate for effects of the communication channel thereon.

44. A method according to clause 42 or 43 wherein, for each of the plurality of frequency bands, processing the corresponding received data signal in dependence on the respective calibration function comprises processing the corresponding received data signal in dependence on the respective calibration function to thereby decode the received data signal and compensate for effects of the communication channel thereon without prior knowledge of the common code.

45. A method of transmitting communication signals, the method comprising: transmitting calibration and data signals by way of a communication channel, the calibration and data signals depending on a common code.

46. Apparatus for transmitting communication signals, the apparatus comprising: a transmitter to transmit calibration and data signals by way of a communication channel; and processing circuitry communicatively coupled to the transmitter, the processing circuitry to: generate the calibration and data signals, the calibration and data signals depending on a common code; and cause transmission of the calibration and data signals by way of the communication channel by the transmitter.

47. An apparatus according to any one of clauses 1 to 24 or clause 46 or a method according to any one of clauses 25 to 45 wherein the communication channel is a downhole communication channel.

48. An apparatus according to any one of clauses 1 to 24 or clause 46 or clause 47 or a method according to any one of clauses 25 to 45 wherein the calibration and data signals are acoustic signals.

49. An apparatus according to any one of clauses 1 to 24 or any of clauses 46 to 48 or a method according to any one of clauses 25 to 45 wherein the calibration function comprises common code information for decoding the received data signal, the said common code information for decoding the received data signal being determined from the calibration signal.

50. An apparatus according to any one of clauses 1 to 24 or any of clauses 46 to 49 or a method according to any one of clauses 25 to 45 wherein the calibration function implicitly comprises common code information for decoding the received data signal, the said common code information for decoding the received data signal being implicitly derived from the calibration signal.

51. An apparatus according to any one of clauses 1 to 24 or any of clauses 46 to 50 or a method according to any one of clauses 25 to 45 wherein the calibration function is based on an inverse of the received calibration signal.

52. An apparatus according to any one of clauses 1 to 24 or any of clauses 46 to 51 or a method according to any one of clauses 25 to 45 wherein the calibration function is based on a reciprocal of the transfer function of the communication channel convolved with the common code.

53. A computer program product comprising computer program instructions for causing processing circuitry to perform in accordance with the processing circuitry of the apparatus according to any one of clauses 1 to 24 or any one of clauses 46 to 52 or to cause performance of the method of any one of clauses 25 to 45.

54. A non-transitory computer readable medium comprising executable instructions for causing processing circuitry to perform in accordance with the processing circuitry of the apparatus according to any one of clauses 1 to 24 or any one of clauses 46 to 52 or to cause performance of the method of any one of clauses 25 to 45.

55. A communication system comprising:

a first node having a transmitter and processing circuitry communicatively coupled to the transmitter, the processing circuitry to cause the transmitter to transmit, in each of one or more frequency bands, data and calibration signals which depend on a common code; and a second node having apparatus according to any of clauses 1 to 24 or any of clauses 46 to 52 as dependent thereon.

56. A communication system according to clause 55 wherein the signal frequencies of the calibration signal and the data signal are within a common frequency band, wherein the second node is to determine a quality of the frequency band of the communication channel for data communication from the first node and to transmit an indication of the said quality to the node, wherein the common code is dependent on the said indication.

57. Apparatus comprising: a receiver to receive a communication signal by way of a communication channel, the communication signal comprising a calibration signal encoded based on a first code and a data signal encoded based on a second code different from the first code, the encoded calibration and data signals at least partially overlapping each other in the frequency domain and at least partially overlapping each other in the time domain; and processing circuitry communicatively coupled to the receiver, the processing circuitry to: process the received communication signal depending on the first and second codes to thereby determine decoded calibration and data signals, the decoded calibration and data signals being discriminated from each other; process the decoded calibration signal to determine a calibration function relating to the communication channel; and process the decoded data signal depending on the calibration function.

58. Apparatus according to clause 57 wherein the processing circuitry is further to provide an output depending on the decoded data signal.

59. Apparatus comprising: a transmitter to transmit a communication signal by way of a communication channel; and processing circuitry communicatively coupled to the transmitter, the processing circuitry to: cause generation of the communication signal, the communication signal comprising a calibration signal encoded based on a first code and a data signal encoded based on a second code, the encoded calibration and data signals at least partially overlapping in the time domain and at least partially overlapping in the frequency domain; and cause transmission of the communication signal by the transmitter, wherein the first code is different from the second code such that the calibration and data signals can be discriminated from each other.

60. Apparatus according to clause 59 wherein the calibration signal is for a receiving node to determine a calibration function indicative of a transfer function of the communication channel so that the receiving node can equalise the effect of the transfer function on the data signal by way of the calibration function.

61. Apparatus according to clause 59 or clause 60 wherein the calibration signal is known to the receiving node.

62. Apparatus according to any of clauses 57 to 61 wherein the first and second codes are orthogonal to each other.

63. Apparatus according to clause 62 wherein the first and second codes are time variant codes, and wherein the first code is orthogonal to the second code based on the time variance of the first and second codes.

64. Apparatus according to any of clauses 57 to 63 wherein the first and second codes are respective spread spectrum codes.

65. Apparatus according to any clauses 57 to 64 wherein the communication channel has a dynamically varying transfer function.

66. Apparatus according to any of clauses 57 to 65 wherein the communication channel is a downhole communication channel.

67. Apparatus according to any of clauses 57 to 66 wherein the calibration and data signals comprise signal frequencies in a common predetermined frequency band.

68. A method of receiving a communication signal, the method comprising: receiving a communication signal by way of a communication channel, the communication signal comprising a calibration signal encoded based on a first code and a data signal encoded based on a second code different from the first code, the encoded calibration and data signals at least partially overlapping each other in the frequency domain and at least partially overlapping each other in the time domain; processing the received communication signal in dependence on the first and second codes to determine decoded calibration and data signals, the decoded calibration and data signals being discriminated from each other; processing the decoded calibration signal to determine a calibration function relating to the communication channel; and processing the decoded data signal depending on the calibration function.

69. The method of clause 68 further comprising providing an output depending on the decoded data signal.

70. A method of transmitting a communication signal, the method comprising: causing generation of a communication signal comprising a calibration signal encoded based on a first code and a data signal encoded based on a second code, the encoded calibration and data signals at least partially overlapping each other in the time domain and at least partially overlapping each other in the frequency domain; and causing transmission of the communication signal, wherein the first code is different from the second code such that the calibration and data signals can be discriminated from each other.

71. A method according to clause 70 wherein the calibration signal is for a receiving node to determine a calibration function indicative of a transfer function of the communication channel so that the receiving node can equalise the effect of the transfer function on the data signal by way of the calibration function.

72. A method according to clause 70 or clause 71 wherein the calibration signal is known to the receiving node.

73. A method according to any of clauses 68 to 72 wherein the first and second codes are orthogonal to each other.

74. A method according to clause 73 wherein the first and second codes are time variant codes, and wherein the first code is orthogonal to the second code based on the time variance of the first and second codes.

75. A method according to any of clauses 68 to 74 wherein the first and second codes are spread spectrum codes.

76. A method according to any of clauses 68 to 75 wherein the communication channel has a dynamically varying transfer function.

77. A method according to any of clauses 68 to 76 wherein the communication channel is a downhole communication channel.

78. A method according to any of clauses 68 to 77 wherein the calibration and data signals comprise signal frequencies in a common predetermined frequency band.

79. A communication system comprising apparatus according to clause 57 or according to any preceding clause dependent thereon and an apparatus according to clause 59 or according to any preceding clause dependent thereon.

80. A computer program product comprising computer program instructions for causing processing circuitry to perform in accordance with the processing circuitry of the apparatus according to any one of clauses 57 to 67 or to cause performance of the method of any one of clauses 68 to 78.

81. One or more non-transitory computer readable media comprising executable instructions for causing processing circuitry to perform in accordance with the processing circuitry of the apparatus according to any one of clauses 57 to 67 or to cause performance of the method of any one of clauses 68 to 78.

The invention claimed is:

1. Apparatus for receiving acoustic communication signals from a communication node, the apparatus comprising: a receiver to directly receive acoustic calibration and data signals transmitted by the communication node by way of a same downhole communication channel directly between the receiver and the communication node, the calibration and data signals transmitted by the communication node having been encoded based on a common code; and processing circuitry communicatively coupled to the receiver, the processing circuitry to: process the received calibration signal to determine a calibration function such that the calibration function depends on the common code by way of the dependency of the received calibration signal on the common code; and process the directly received data signal in dependence on the calibration function, wherein the calibration function implicitly comprises common code information for decoding the directly received data signal, the said common code information for decoding the directly received data signal being implicitly derived from the calibration signal, the calibration function further comprising information regarding the effects of said same downhole communication channel on the calibration signal, wherein the processing circuitry is to process the directly received data signal in dependence on the calibration function to thereby decode the directly received data signal by way of said common code information therein and compensate for effects of said same downhole communication channel directly between the receiver and the communication node thereon by way of said information regarding the effects of said same downhole communication channel on the calibration signal therein.

2. An apparatus according to claim 1 wherein the common code comprises or consists of a spread spectrum code.

3. An apparatus according to claim 2 wherein the spread spectrum code comprises any of: a chirp function; a linear chirp function; a non-linear chirp function; a direct sequence spread spectrum function; and a frequency hopping spread spectrum sequence.

4. An apparatus according to claim 1 wherein the processing circuitry is to process the received calibration signal to determine the calibration function without removing the dependency of the received calibration signal on the common code.

5. An apparatus according to claim 1 wherein the calibration and data signals are received from the node and have frequencies within a frequency band, wherein the apparatus is to determine a quality of the frequency band of the communication channel for data communication from the node and to transmit an indication of the said quality to the node, and wherein the common code is dependent on the said indication of the said quality.

6. An apparatus according to claim 5 wherein the receiver is configured to receive first and second signals from the node by way of the communication channel, the first and second signals having frequencies within the frequency band; and wherein the processing circuitry is configured to determine a calibration function depending on the first signal, process the second signal depending on the calibration function, determine the quality of the frequency band for data communication with the node by way of the communication channel depending on the processed second signal and cause transmission of the said indication of the said quality to the node.

7. An apparatus according to claim 1 wherein the common code is a first common code, wherein the receiver is to receive second calibration and data signals by way of the communication channel, the second calibration and data signals being based on a second common code different from the first common code, and wherein the processing circuitry is to: process the second calibration signal to determine a second calibration function such that the second calibration function depends on the second common code by the dependency of the received second calibration signal on the second common code; and process the received second data signal in dependence on the second calibration function.

8. An apparatus according to claim 7 wherein the first common code has a time bandwidth product of a first value for frequencies in a or the frequency band and wherein the second common code has a time bandwidth product of a second value different from the first value for frequencies in the frequency band.

9. A method of receiving acoustic communication signals from a communication node, the method comprising: directly receiving by a receiver acoustic calibration and data signals transmitted by the communication node by way of a same downhole communication channel directly between the receiver and the communication node, the calibration and data signals transmitted by the communication node having been encoded based on a common code; determining a calibration function based on the received calibration signal such that the calibration function depends on the common code by the dependency of the received calibration signal on the common code; and processing the directly received data signal in dependence on the calibration function, wherein the calibration function implicitly comprises common code information for decoding the directly received data signal, the said common code information for decoding the directly received data signal being implicitly derived from the calibration signal, the calibration function further comprising information regarding the effects of said same downhole communication channel on the calibration signal, wherein processing the directly received data signal in dependence on the calibration function comprises decoding the directly received data signal by way of said common code information therein and compensating for effects of said same downhole communication channel directly between the receiver and the communication node thereon by way of said information regarding the effects of said same downhole communication channel on the calibration signal therein.

10. A method according to claim 9 wherein the calibration and data signals are received from the node and have frequencies within a frequency band, wherein the method comprises determining a quality of the frequency band of the communication channel for data communication from the node and transmitting an indication of the said quality to the node, wherein the common code is dependent on the said indication of the said quality.

11. An apparatus according to claim 1 wherein the calibration function is based on an inverse of the received calibration signal.

12. A non-transitory computer readable medium comprising executable instructions for causing processing circuitry to perform in accordance with the processing circuitry of the apparatus according to claim 1.

13. Apparatus for receiving acoustic communication signals, the apparatus comprising: a receiver to directly receive acoustic calibration and data signals by way of a same downhole communication channel directly between the receiver and a communication node transmitting the calibration and data signals, the calibration and data signals depending on a common code; and processing circuitry communicatively coupled to the receiver, the processing circuitry to: process the received calibration signal to determine a calibration function such that the calibration function depends on the common code by way of the dependency of the received calibration signal on the common code; and process the directly received data signal in dependence on the calibration function, wherein the calibration function comprises common code information for decoding the directly received data signal, the said common code information for decoding the directly received data signal being derived from the calibration signal, wherein the calibration and data signals are received from the node and have frequencies within a frequency band, wherein the apparatus is to determine a quality of the frequency band of said same downhole communication channel for data communication from the node and to transmit an indication of the said quality to the node, and wherein the common code is dependent on the said indication of the said quality, and wherein the receiver is configured to receive first and second signals from the node by way of said same downhole communication channel, the first and second signals having frequencies within the frequency band; and wherein the processing circuitry is configured to determine a calibration function depending on the first signal, process the second signal depending on the calibration function, determine the quality of the frequency band for data communication with the node by way of said same downhole communication channel depending on the processed second signal and cause transmission of the said indication of the said quality to the node.

* * * * *